(12) United States Patent
Kaloust

(10) Patent No.: US 6,246,929 B1
(45) Date of Patent: Jun. 12, 2001

(54) ENHANCED STALL AND RECOVERY CONTROL SYSTEM

(75) Inventor: Joseph H. Kaloust, Grand Prairie, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/376,104

(22) Filed: Aug. 17, 1999

Related U.S. Application Data

(60) Provisional application No. 60/139,412, filed on Jun. 16, 1999.

(51) Int. Cl.$^7$ .................................................. B64C 13/18
(52) U.S. Cl. .............................. 701/11; 244/178; 701/5; 701/6
(58) Field of Search .................. 701/3, 4, 5, 6, 701/7, 8, 9, 10, 11, 38; 244/178, 181, 182; 340/967, 966

(56) References Cited

U.S. PATENT DOCUMENTS

| | | | |
|---|---|---|---|
| 4,027,839 | 6/1977 | Quinlivan | 244/195 |
| 4,326,253 | 4/1982 | Cooper et al. | 364/435 |
| 4,347,572 | 8/1982 | Berwick, Jr. et al. | 364/433 |
| 4,586,140 | 4/1986 | Millen | 364/433 |
| 4,590,475 | 5/1986 | Brown | 340/966 |
| 4,644,538 * | 2/1987 | Cooper et al. | 701/11 |
| 4,758,958 | 7/1988 | von Gersdorff | 364/434 |
| 4,908,619 | 3/1990 | Bala et al. | 340/966 |
| 5,000,404 | 3/1991 | Martorella | 244/188 |
| 5,016,177 | 5/1991 | Lambregts | 364/424.06 |
| 5,083,279 | 1/1992 | Burdoin | 364/435 |
| 5,089,968 | 2/1992 | Orgun et al. | 364/435 |
| 5,225,829 | 7/1993 | Bateman | 340/967 |
| 5,301,112 | 4/1994 | Gold et al. | 364/434 |
| 5,424,950 | 6/1995 | Jackson | 364/434 |
| 5,446,666 | 8/1995 | Bauer | 364/434 |
| 5,553,812 | 9/1996 | Gold et al. | 244/76 R |
| 5,615,119 | 3/1997 | Vos | 364/424.013 |
| 5,730,394 * | 3/1998 | Cotton et al. | 701/11 |
| 5,746,392 | 5/1998 | Gast | 244/76 B |
| 5,796,612 | 8/1998 | Palmer | 364/424.013 |
| 5,803,408 | 9/1998 | Gast | 244/178 |
| 5,819,188 | 10/1998 | Vos | 701/4 |
| 5,836,546 | 11/1998 | Gast | 244/76 B |
| 6,044,311 * | 3/2000 | Larramendy et al. | 701/11 |

FOREIGN PATENT DOCUMENTS

224279 * 6/1977 (EP) .................................... 701/11

OTHER PUBLICATIONS

Bernard ETKIN, General Equations of Unsteady Motion; *Dynamics of Flight—Stability and Control;* pp. 84–127, John Wiley & Sons; 1982.

* cited by examiner

*Primary Examiner*—Richard M. Camby
(74) *Attorney, Agent, or Firm*—Sidley & Austin; Stephen S. Sadacca

(57) ABSTRACT

An autopilot controller, for controlling a vehicle traveling in a fluid medium, designed for controlling the vehicle in any one of pre stall, stall and post stall regions. The autopilot controller provides an approach for one-to-one mapping between a target command which is received and control surface deflections for effecting the command based on vehicle normal force and vehicle moment response characteristics. In one embodiment, the autopilot controller determines linear functions representative of the vehicle dynamic response for the current operating conditions in order to determine a direction of change of fin deflection for effecting the command. In another embodiment, the autopilot controller controls transverse vehicle accelerations by controlling a body pitch moment generated by a control surface.

34 Claims, 42 Drawing Sheets

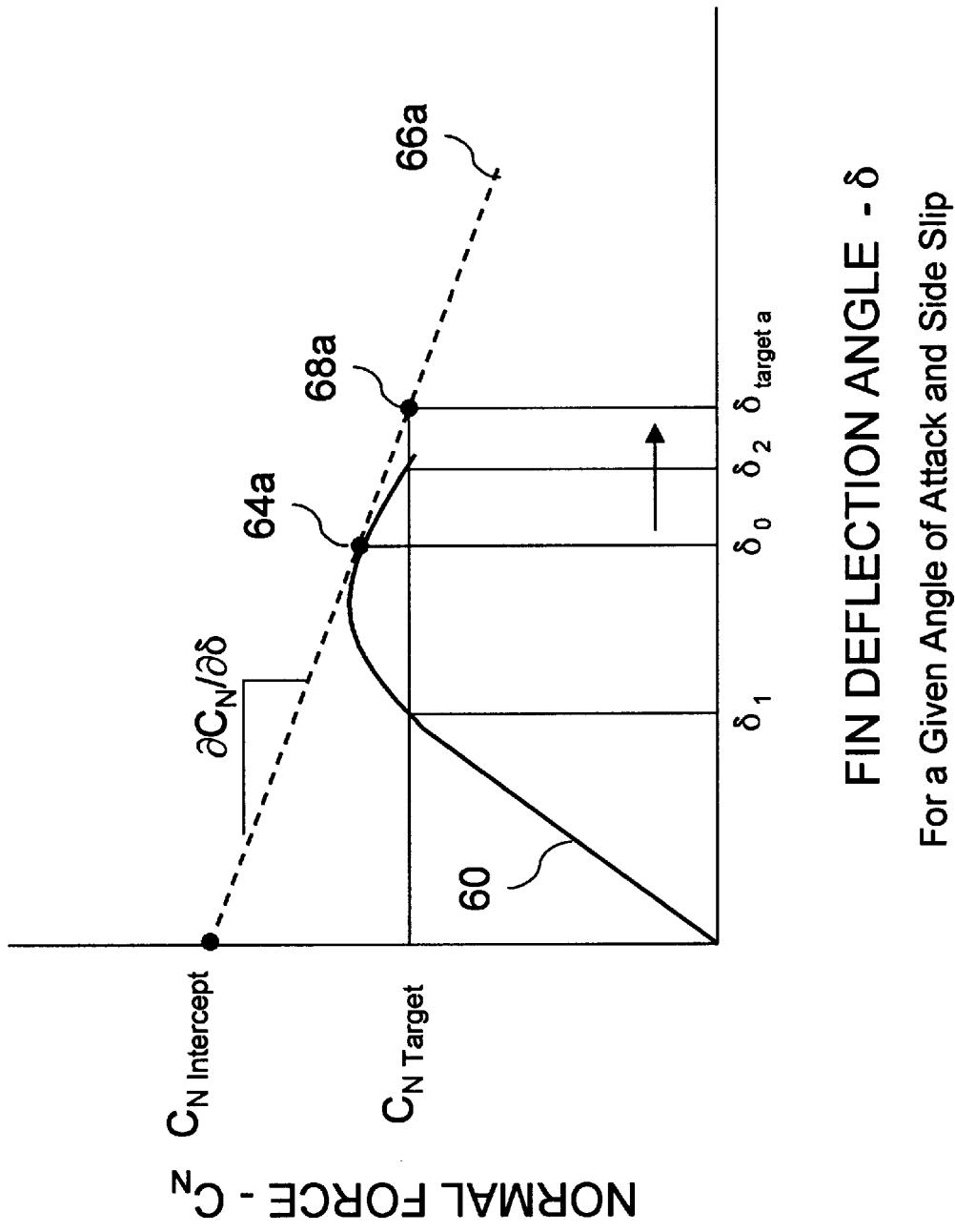

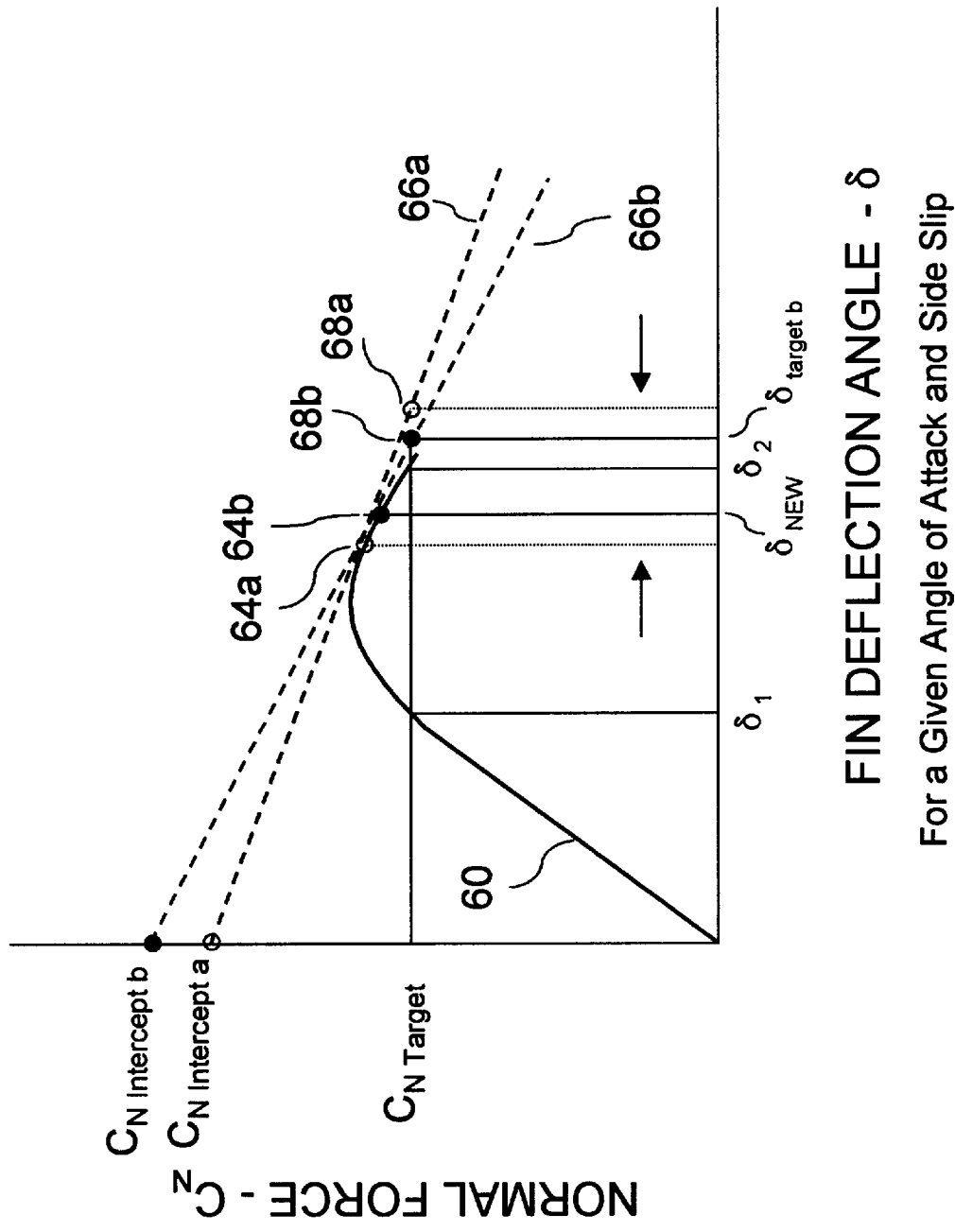

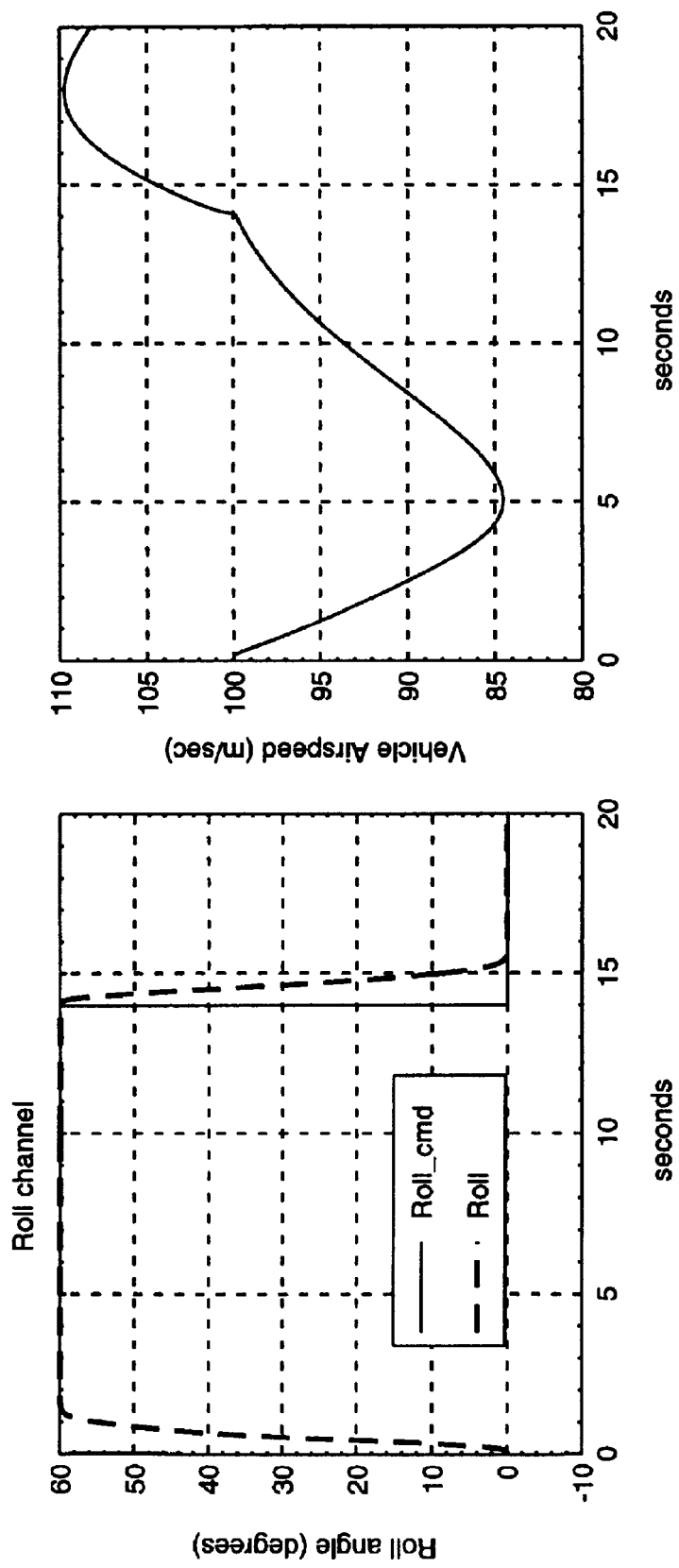

ENHANCED STALL AND RECOVERY CONTROL SYSTEM

RELATED APPLICATIONS

This application is related to U.S. Provisional Patent Application Ser. No. 60/139,412 filed Jun. 16, 1999.

FIELD OF THE INVENTION

The present invention relates to an autopilot controller, and to a method, for controlling a vehicle, and more particularly, an autopilot controller for controlling a vehicle traveling in a fluid medium, in any one of pre-stall, stall and post stall regions.

BACKGROUND OF THE INVENTION

Vehicles such as aircraft, missiles, drones, etc. (hereafter referred to as "aircraft" or "vehicles") are generally provided with a flight control system so that the orientation of the vehicle during flight can be controlled along the three principle axes, namely, yaw, pitch, and roll. The pitch axis, which in an aircraft extends along the wingspan, defines a degree to which the nose of the vehicle is pointed above or below the horizon. The roll axis extends along the length of the aircraft and defines the degree to which the wings of the aircraft are banked. The yaw axis is perpendicular to both the pitch axis and the roll axis.

The control system provides a means for varying the orientation of the aircraft during flight so that, for instance, the wings can be banked to change a direction of flight, or the nose can be raised or lowered to change the altitude. In one type of conventionally configured aircraft, the control system can include: ailerons for controlling the roll angle (bank) of the aircraft in response to a rotation of a control wheel; an elevator for controlling the pitch angle of the aircraft in response to a pushing or pulling on the control yoke; and a rudder for controlling the yaw angle of the aircraft in response to an input to the control pedals.

Other aircraft and other types of vehicles can employ different control devices such as canards, rotatable fins or wings, spoilers, moveable tail surfaces, etc., to affect the orientation of the vehicle.

While aircraft can be controlled via the control system by a human pilot (often referred to as "man-in-the-loop"), aircraft can also be controlled for a portion of a flight, or for an entire flight, by an autopilot system. In the autopilot situation, the autopilot—as opposed to a human pilot— manipulates the control surfaces in order to control the orientation of the vehicle in response to an established or inputted command. Examples of an inputted signal include, but are not limited to: a course guidance signal inputted to an autopilot, so that the autopilot can control the direction of flight so as to follow the heading or course set; an altitude hold/altitude capture input, so that the autopilot can control the altitude and/or the rate of change of the altitude of the vehicle; and a turn rate command, so that the autopilot will initiate a turn at a requested rate or acceleration amount.

Aircraft can also be controlled in a manner which is not purely manual or purely automatic but where a flight director is used. Where a flight director is used, the flight director receives a command signal from the autopilot which would normally be used to control the flight control elements. However, instead of controlling the flight control elements, the command signal controls the position of a flight director indicator on the pilot's attitude indicator or multi function display, which tells the pilot how to manipulate the flight control elements so that the aircraft flies according to a desired flight profile.

In the cases where an autopilot is used, the autopilot must interpret an inputted guidance or altitude command and, based on that inputted command, output a command for manipulating the flight control elements which is suitable for achieving the desired result. For instance, in response to a guidance command which requests a left turn at a 2 g rate, the autopilot must output a command for a particular control surface—or combination of control surfaces—instructing a direction and amount of control surface movement which is appropriate for achieving the requested 2 g left turn.

The autopilot will generally be implemented with some type of feedback which provides information pertaining to the operating status of the vehicle relative to the guidance command, so that the autopilot can determine when the desired result has been achieved or whether additional flight control manipulation is required to achieve or maintain the desired result.

FIG. 1 is a conceptual block diagram of an autopilot which is implemented as a control system with feedback. As shown, a guidance command is inputted to the autopilot controller 10, which interprets the command and outputs a control surface actuation or deflection command $\delta$. The control surface actuation or deflection command $\delta$ is received by a device 12 such as a control surface servo or actuator, which in turn moves the control surface 14. Generally, the control surface 14 or the control surface actuator 12 will be equipped with a device, such as an encoder (not shown) which outputs the current position of the control surface. The output from the encoder is fed back to the autopilot controller 10 so that the autopilot controller 10 can determine the control surface/actuator deflection output $\delta$ based on the current position of the control surface 14.

The autopilot controller 10 determines the control surface response which is needed to accomplish the inputted command based, in part, on vehicle condition information which is fed back from, for insance, a sensor 16 on the vehicle. A difference, generally referred to as an error signal, between the feedback signal and the guidance command, is evaluated in order to determine the control surface response which is needed to accomplish the inputted command. Because both the actuation of the control surface as well as the response of the vehicle to the control surface actuation occur over a period of time, the error signal is continually monitored as the control surface is moved so that the autopilot controller can determine when the guidance command has been successfully performed. The autopilot controller determines that a guidance command has been successfully performed when the error signal goes to zero. So long as a non-zero error signal is received, that indicates a situation where the guidance commandei request has not yet been accomplished and/or where further control surface actuation may be required.

As an example, this general autopilot system can be described in the context of an autopilot for controlling the altitude of a vehicle where information from an altimeter (sensor 16) would be fed back to the autopilot controller 10. Thus, if a guidance command is inputted which requires a change in the altitude, a non-zero error signal will be generated so long as the current altitude is different from the requested altitude, and the autopilot controller 10 will output control surface commands to change the altitude of the vehicle. When the current altitude of the vehicle matches the commanded altitude, i.e., when the error signal becomes zero, the autopilot controller 10 will cease to output control surface commands or will output control surface commands appropriate to maintain the commanded altitude.

While the example above addresses only one aspect of the vehicle (altitude), it should also be appreciated that the autopilot can control pitch, roll, yaw, or other aspects. Additionally, a multi-axis autopilot can be employed where several of the aspects of the vehicle are simultaneously controlled.

Because, for a given command, the autopilot must output flight control commands which are appropriate for the vehicle on which it operates, each autopilot must, to some degree, be designed for, or tailored to, the specific vehicle for which it is intended.

In designing or tailoring the autopilot, not only must the types of control surfaces which are provided on the vehicle (and the aspect of the vehicle orientation which they effect) be comprehended, but also the vehicle response to varying degrees of control surface deflection need to be addressed so that the autopilot can respond to more or less aggressive maneuvers and so that the autopilot can limit the control outputs to those which will not over stress the vehicle. More sophisticated autopilots can also respond to an inputted command in different manners depending on the operating status of the vehicle at the time of the command. Specifically, depending on the airspeed, angle-of-attack, etc., the output from an autopilot can vary for a given input.

Thus, in order to design or tailor an autopilot for a vehicle, information about the dynamic behavior of the vehicle is generally required. One aspect of particular importance is the relationship between the angle of attack of the aircraft wing (or moveable fin or other type of control surface) and the amount of lift created. For a given airspeed, the lift created by an aircraft wing increases with an increasing angle of attack. A typical relationship between the amount of lift created as a function of the angle of attack is illustrated as curve 20 in FIG. 2. As can be seen from FIG. 2, from a zero angle of attack to some finite value, the lift coefficient versus the angle of attack is at least approximately linear (dashed line 22). For angles of attack beyond this finite value, the lift coefficient no longer increases linearly and at some point flattens and then begins to decrease. At the point where the lift coefficient curve reaches its maximum value, the angle of attack is so great that the airflow no longer conforms to the surface of the wing, thereby destroying, or substantially reducing, lift in a condition known as stall. In FIG. 2, the stall point is where the slope of the lift curve declines to zero and is designated the critical angle of attack $\alpha_C$. As can also be seen, any further increase in the angle of attack beyond the critical angle of attack $\alpha_C$ results in a reduction in the lift coefficient and a negative slope for the portion of the lift curve.

For convenience, FIG. 2 plots lift coefficient $C_L$ which is related to the amount of lift produced by the wing or control surface. Specifically, the lift coefficient $C_L$ for a given aircraft is normally defined as the ratio of the lift force (or weight of the aircraft) divided by the dynamic pressure Q times the wing reference areas. The dynamic pressure, in turn, is a product of the air density and the velocity.

When a wing stalls, not only is lift lost, which can result in the aircraft losing altitude and/or deviating from a desired direction, but also the associated control surface may cease to be effective for controlling the orientation of the vehicle. Thus, in the event of a stall, the altitude of the aircraft may drop and the orientation of the aircraft may be partially or wholly uncontrollable for the duration of the stall.

In some situations, a pilot may be able to reduce the angle of attack of the wing and recover from the stall; however, in other situations, such as where the aircraft is near to the ground, stall recovery cannot be accomplished before the aircraft impacts the ground. Accordingly, for both man-in-the-loop as well as autopilot based operations, there has been a general objective in the prior art of avoiding stall.

Avoidance of stall in practice can be difficult because the precise point at which the wing stalls is not only a function of the angle of attack, but also the airspeed, the load factor, and other variables. Furthermore, the angle of attack is the angle between the chord of the wing (i.e., a line from the leading edge to the trailing edge) and the wing's flight path. Accordingly, the angle of incidence of a wing can be affected by a change in the relative direction of the airflow, such as may occur due to turbulence or wind shear. Accordingly, when a wing is operating near its maximum lift, turbulence or wind shear may cause the critical angle of attack to be inadvertently exceeded with a stall unintentionally resulting. As a result, for both man-in-the-loop and autopilot base systems, stall is avoided not only by not purposefully exceeding the maximum angle of attack but by also maintaining an angle of attack safety margin so that turbulence or wind shear or other factors do not unexpectedly cause a stall.

While the lift versus angle of attack relationship as described above has been known, conventional autopilots have typically been able to control the vehicle only for the portion of the lift versus angle of attack region prior to the point of stall. Additionally, because the relationship between lift and angle of attack is nearly linear for a large portion of the angles of attack approaching the stall point, conventional autopilots often are based on the simplifying assumption that the relationship between lift and angle of attack is linear for all angles of attack.

The conventional autopilot assumption that the relationship between lift and angle of attack is linear for all angles of attack can result in controllability problems if stall should occur and can also result in improper control commands being generated during stall. Specifically, when stall occurs in the conventional autopilot feedback control approach, the force generated by the lifting surface decreases. However, in the case where the autopilot is attempting to command a control surface deflection for generating a greater force than the stalled lifting surface, the error signal will increase after stall and the autopilot will further increase the angle of attack of the lifting surface. While a further increase in the angle of attack would yield an increase in the force generated if the lifting surface were not stalled, if the lifting surface is stalled the further increase the angle of attack of the lifing surface actually worsens the stall condition by further reducing the lift generated. Further, as the autopilot inadvertently worsens the stall situation while attempting to increase the force generated, the resulting error signal will continue to grow larger, which suggests to the autopilot that a still greater angle of attack is required.

At least one known autopilot attempts to address the situation of stall by monitoring or estimating the angle of attack of the vehicle and for angles of attack where the coefficient of lift goes to zero or goes negative, a pseudo lift signal is generated and supplied to the autopilot control loop. The pseudo lift signal tracks the actual coefficient of lift characteristics of the vehicle over the angle of attack region where the response is linear. For the region of angle of attack where the lift rate goes to zero or goes negative, the pseudo signal continues to increase linearly. As a result, the autopilot feedback loop does not see the reduced lift signal from the sensor, and thus does not try to further increase the angle of attack in order to achieve the guidance command input. As a result, the control loop is prevented from inadvertently driving the vehicle further into a stall.

While the approach above tends to avoid stall, and prevents the control loop from inadvertently driving the vehicle further into a stall, this approach does not allow the vehicle to be effectively controlled near or at the point of stall.

On the other hand, because the amount of lift generated by the wing increases with increasing angle of attack, the maximum lift of the wing, and hence the maximum performance of the aircraft, is achieved when the wing is very near the point of stall. Operating a wing near the point of maximum lift results in vehicle performance benefits such as shorter takeoff distance, greater load carrying capability, and higher climb rate. Further, operating the control surfaces near the point of maximum lift results in faster, more aggressive turning capability and greater overall maneuverability. As a result, there has been an increasing interest in systems which will allow aircraft and other vehicles to be operated very near to the point of stall. Additionally, because turbulence or wind shear may cause the critical angle of attack to be inadvertently exceeded for a vehicle that is operating very near to the point of stall, there exists a need for an autopilot controller which can operate near the point of stall and also properly control the vehicle at and after the point of stall.

SUMMARY OF THE INVENTION

In view of the shortcomings of present autopilots, and in view of the desirability of operating a vehicle close to the point of stall, it is an object of the present invention to provide an autopilot controller which comprehends the non-linear vehicle aerodynamic response across the pre-stall, stall and post-stall regions so that correct control surface deflections can be commanded even where the wing or control surface is at or beyond the critical angle of attack.

It is another object of the present invention to provide an autopilot controller which comprehends the multi-axis, coupled, non-linear, vehicle aerodynamic response across the pre-stall, stall, and post-stall regions so that correct control surface deflections can be commanded even where the wing or control surface is at or beyond the critical angle of attack.

It is another object of the present invention to provide an autopilot controller which provides for a one-to-one mapping between a desired force command input and a corresponding wing or control surface deflection/angle-of-attack output.

It is another object of the present invention to provide an autopilot controller which controls vehicle aerodynamic response by controlling the moments which operate on the vehicle as a result of control surface actuations.

It is another object of the present invention to provide an autopilot controller which provides for a one-to-one mapping between a desired moment and a corresponding wing or control surface deflection/angle-of-attack output.

It is another object of the present invention to provide an autopilot controller which controls vehicle aerodynamic response for a portion of the flight envelope near the stall point by controlling the moments which operate on the vehicle as a result of control surface actuations, and which controls vehicle aerodynamic response for those portions of the flight envelope not near the stall point by controlling resulting normal forces operating on the vehicle as a result of control surface actuations.

It is also an object of the present invention to provide an autopilot which is capable of determining a pre-stall, a stall, and a post stall condition of the vehicle and of outputting appropriate vehicle control commands in response to the stall condition determination.

In order to achieve the above objects, one autopilot controller in accordance with the present invention includes a storage device for storing vehicle response data which is representative of the vehicle response across the pre-stall, stall, and post-stall regions. Input devices are provided for receiving current vehicle operating condition signals and a portion of the autopilot controller calculates an error signal which is indicative of a difference between the inputted command and the current vehicle operating condition. In outputting a control command for a given control surface in accordance with the error signal and the current vehicle operating condition, in the case where any one of several different control surface deflections for the given control surface, would be suitable to effect the commanded maneuver, the autopilot controller outputs only one control surface deflection for the given control surface.

In order to achieve the above objects, another aspect of the present invention provides an autopilot controller and a storage device for storing vehicle response data which is representative of the vehicle response across the pre-stall, stall, and post-stall regions. The data representative of the vehicle response includes data of the form of ($\partial C/\partial \delta$, $C_{intercept}$) pairs which are a function of the vehicle operating conditions. A computing device computes a control surface deflection output in response to a commanded maneuver in accordance with a vehicle response characteristic of the form $C=(\partial C/\partial \delta)\cdot \delta + C_{intercept}$ where $\partial C/\partial \delta$ is a rate of change, with respect to control surface deflection, of a force generated at the center of gravity of the vehicle at a current vehicle operating condition and $C_{intercept}$ is a normal force intercept for a linear function which is tangent to a C force function at the current vehicle operating condition and which has a slope equal to $\partial C/\partial \delta$.

In order to achieve the above objects, another aspect of the present invention provides an autopilot controller and a storage device for storing vehicle response data which is representative of the vehicle response across the pre-stall, stall and post-stall regions. The data representative of the vehicle response includes data of the form of ($\partial C/\partial \delta$, $C_{intercept}$) pairs which are a function of the vehicle operating condition. A computing device computes a control surface deflection output in response to a commanded maneuver in accordance with a vehicle response characteristic of the form $C=(\partial C/\partial \delta)\cdot \delta + C_{intercept}$ where $\partial C/\partial \delta$ is a rate of change, with respect to control surface deflection, of a moment generated about the center of gravity of the vehicle at a current vehicle operating condition and $C_{intercept}$ is a moment intercept for a linear function which is tangent to a C moment function at the current vehicle operating condition and which has a slope equal $\partial C/\partial \delta$.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers.

FIG. 11A is a chart illustrating a linear function which is tangent to the normal force curve at current vehicle operating conditions.

FIG. 11B is a chart illustrating a second linear function which is determined during a second iteration of the fin deflection amount determining procedure.

FIGS. 15A–15F illustrate the simulated response of a particular vehicle to a commanded bank-to-turn maneuver.

DETAILED DESCRIPTION OF THE PREFERRED EMBODIMENTS

It will be useful to the understanding of the nature of the problem and the solution proposed by the present invention to first describe a coordinate system defined relative to the vehicle and the various forces, moments and velocities which may be necessary to address in order to define the motion and orientation of the vehicle during flight and in response to the commands from the autopilot controller of the present invention.

Figure 3A:
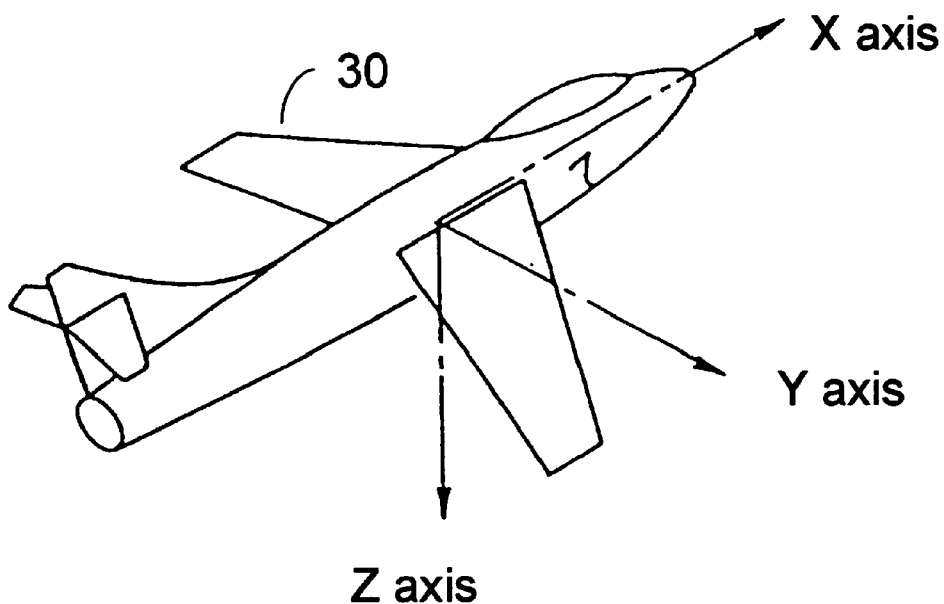
FIG. 3A is an illustration of a vehicle and of a coordinate system defined relative thereto.

FIG. 3A illustrates a typical coordinate system which is defined relative to the vehicle. As noted previously, the orientation of an aircraft is typically defined in terms of the three principle axes, namely, yaw, pitch, and roll. The pitch axis extends along the wingspan of aircraft and is shown as the Y axis in the figure. The roll axis extends along the length of the aircraft and is shown as the X axis in the figure. The yaw axis is perpendicular to both the pitch axis and roll axis and is shown as the Z axis in the figure.

Figure 3B:
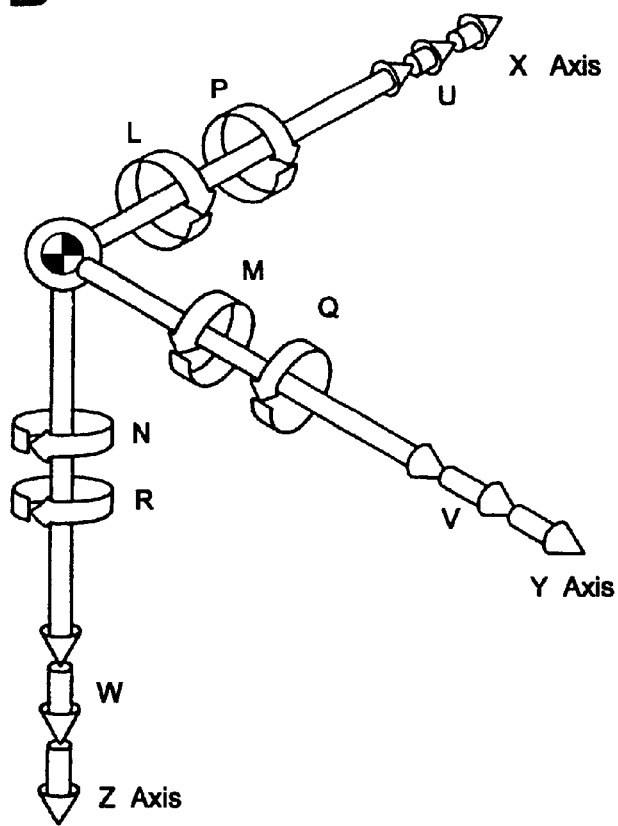
FIG. 3B is an illustration of a coordinate system depicting various forces, velocities and moments that may act on the vehicle in terms of the coordinate system.

FIG. 3B illustrates various velocities and moments which apply to the vehicle in terms of the coordinate system depicted in FIG. 3A. In regard to the X axis, U refers to the velocity of the vehicle along the X direction, P refers to a roll rate of the vehicle rotating around the X axis, and L refers to a moment acting about the X axis. Similarly, in regard to the Y axis, V refers to the velocity of the vehicle along the Y direction, Q refers to a pitch rate of the vehicle rotating around the Y axis, and M refers to a moment acting about the Y axis. Similarly, in regard to the Z axis, W refers to the velocity of the vehicle along the Z direction, R refers to a yaw rate of the vehicle rotating around the Z axis, and N refers to a moment acting about the Z axis.

While not designated with labels, the vehicle can also experience a transverse acceleration along one or more of the X, Y and Z axes and can also experience a rotational acceleration about one or more of the X, Y, and Z axes.

1.0 First Embodiment of Present Invention 1.1 Autopilot Controller

Figure 4A:
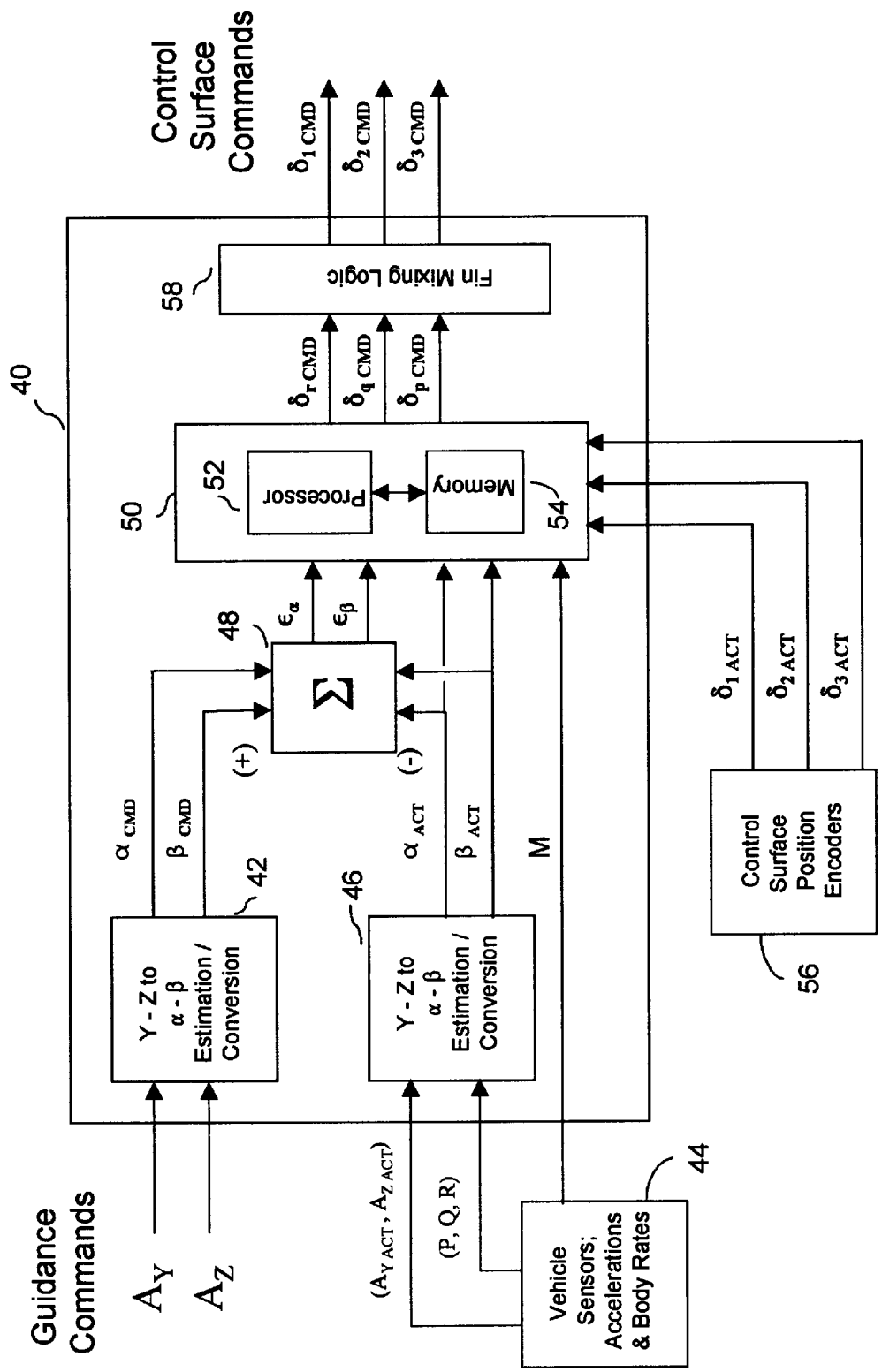
FIG. 4A is a functional block diagram of an autopilot controller according to the present invention.

A first embodiment of the present invention will be described with regard to FIGS. 4A and 4B. FIG. 4A is a functional block diagram of an autopilot controller according to the present invention. While the prior explanations of autopilot function were mostly in terms of an autopilot for controlling a single aspect of the vehicle, and while the present invention is also suitable for a single axis implementation, the preferred embodiment of the present invention as shown in FIG. 4A is in a three axis implementation.

As shown in FIG. 4A, guidance commands, such as acceleration commands $A_Y$ and $A_Z$, are inputted to the autopilot controller 40. While the autopilot controller 40, can employ the acceleration commands $A_Y$ and $A_Z$ internally, these signals can also be transformed to angle of attack $\alpha_{CMD}$ and side slip $\beta_{CMD}$ commands by the Y-Z to $\alpha$-$\beta$ converter 42 for processing in the autopilot controller 40. Signals from sensors 44 on the vehicle, which can include current vehicle acceleration data $A_{YACT}$ and $A_{ZACT}$, as well as current vehicle body rate data P, Q and R, are also inputted to the autopilot controller 40 where they are also transformed to angle of attack $\alpha_{ACT}$ and side slip $\beta_{ACT}$ measurements by the Y-Z to $\alpha$-$\beta$ converter 46. The commanded signals $\alpha_{CMD}$ and $\beta_{CMD}$, and the signals corresponding to the current vehicle operating conditions $\alpha_{ACT}$ and $\beta_{ACT}$ are compared in differencing device 48, and error signals $\epsilon_\alpha$ and $\epsilon_\beta$ are generated corresponding to the differences between the current operating conditions of the vehicle $\alpha_{ACT}$, $\beta_{ACT}$ and the inputted commands $\alpha_{CMD}$, $\beta_{CMD}$.

The error signals $\epsilon_\alpha$ and $\epsilon_\beta$ are inputted to a processing unit 50 which may include a processing unit 52 and a memory device 54. Also inputted to the processing unit 50 are the current positions of the various control surfaces $\delta_{1\,ACT}$, $\delta_{2\,ACT}$, and $\delta_{3\,ACT}$ which are obtained from encoding devices 56 on the respective control surfaces. While three control surfaces are suggested by the present discussion and the illustration in FIG. 4A, the present invention is not limited to precisely three, and greater or fewer numbers of control surfaces can be presented on varying types of vehicles with the present principles applied thereto. Finally, additional sensor information, such as mach M data, as well as current vehicle condition information such as $\alpha_{ACT}$ and $\beta_{ACT}$, can be inputted to the processing unit 50.

The processing unit 50, in a manner which will be more fully described later, interprets the current vehicle operating conditions and the presently measured amounts of the current error signals, and, based on stored information representing the vehicle aerodynamic responses and other factors, computes control deflections $\delta_{r\,CMD}$, $\delta_{q\,CMD}$, and $\delta_{p\,CMD}$ appropriate for effecting the inputted commands $A_Y$ and $A_Z$.

While the operation of the autopilot controller is described more filly later, for the present it should be noted, in regard to control deflections $\delta_{q\,CMD}$, $\delta_{p\,CMD}$ and $\delta_{r\,CMD}$ appropriate for effecting the inputted commands Ay and Az, that the suitable control deflections $\delta_{q\,CMD}$, $\delta_{p\,CMD}$ and $\delta_{r\,CMD}$ are evaluated at a point in time and that the suitable control deflections can change over a period of time. This is because the autopilot controller operates in an iterative manner where the error signal is continually monitored and where control deflection commands are continually outputted so as to drive the error signal to zero.

While some vehicles will have one control surface which generally corresponds to changes in each of roll, pitch, and yaw, for other vehicles it is necessary to operate two or more control surfaces in concert to achieve a change in any one of roll, pitch and yaw. Accordingly, for this case, the autopilot controller 40 is also equipped with a fin mixing logic device 58, which can be implemented in software, which transforms the control deflections $\delta_{r\,CMD}$, $\delta_{q\,CMD}$, and $\delta_{p\,CMD}$ to control deflections corresponding to each of the controls on the vehicle control deflections $\delta_{1\,CMD}$, $\delta_{2\,CMD}$ and $\delta_{3\,CMD}$.

While the autopilot controller 40 illustrated in FIG. 4A is depicted as having a plurality of internal components, all of the functions may also be implemented in software running on a single (or a plurality of) processing devices. Thus, the present invention can also be implemented as shown in FIG. 4B.

Figure 4B:
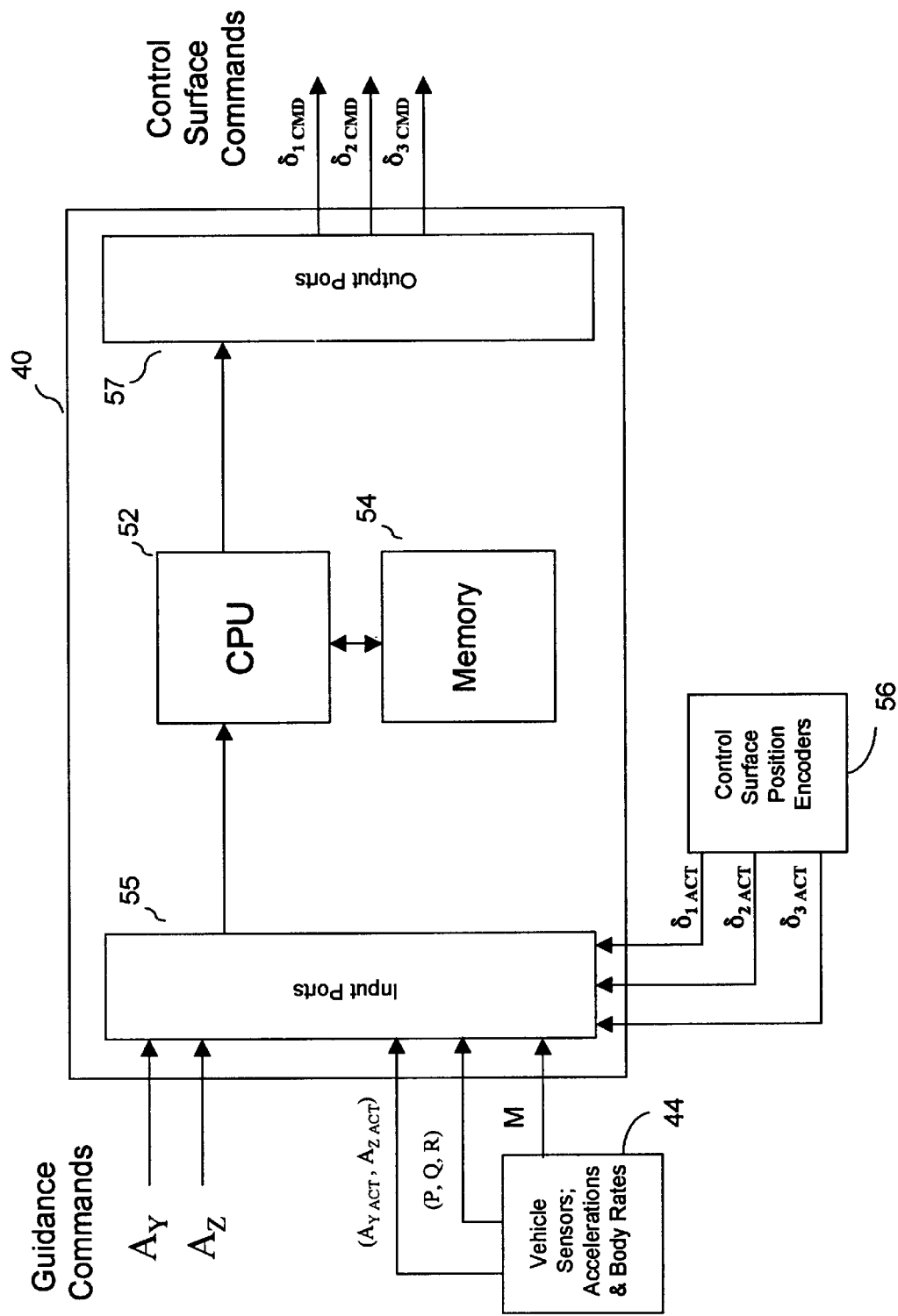
FIG. 4B is a block diagram of an autopilot controller according to the present invention.

In FIG. 4B, the autopilot controller 40 is shown implemented by a CPU 52 in conjunction with a memory 54, input ports 55, and output ports 57. While the memory 54 is shown as a separate block from the CPU 52, the memory 54 can optionally be separate from CPU 52 or can actually be located on the same integrated circuit chip. Similarly, input ports 55 and output ports 57 can also be part of, or separate from, the CPU 52. The CPU 52 can be any one of a variety of standard or custom processing devices, such as microcontrollers, microprocessors, or digital signal processors, so long as the processing throughput and speed are adequate to calculate the necessary control surface deflections on a real time basis. The speed at which control surface deflection commands are required to be generated to control a given vehicle is a function of the time constant of the vehicle, the stability (or instability) of the vehicle, and other factors.

Figure 5:
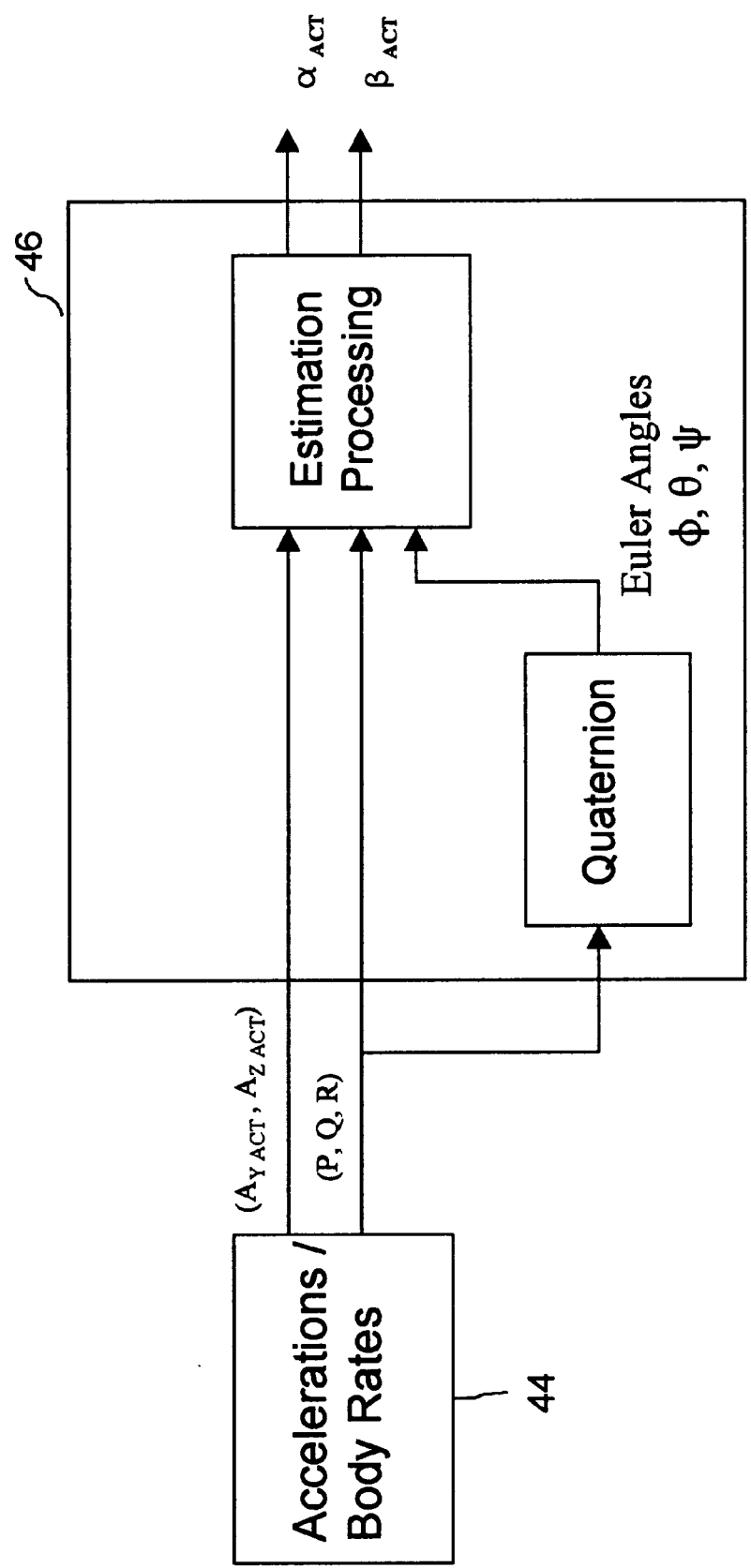
FIG. 5 is a hardware diagram illustrating the transform of normal acceleration data to angle of attack and side slip angle data.

The first embodiment shown in FIG. 4A illustrates a data transform between normal accelerations $A_Y$ and $A_Z$, as well as current vehicle body rate data P, Q and R, to angle of attack $\alpha$ and side slip $\beta$ by Y-Z to $\alpha$-$\beta$ converter 46. While the present invention is not limited to such an implementation, the preferred embodiment of the invention preferably uses angle of attack $\alpha$ and side slip $\beta$ data internally for convenience. Apparatus suitable for performing the transform, is illustrated in greater detail in FIG. 5. As shown in FIG. 5, $A_{YACT}$ and $A_{ZACT}$ signals from sensors 44 on the vehicle, as well as current vehicle body rate data P, Q and R, are inputted to the autopilot controller where they are also transformed to angle of attack $\alpha$ ACT and side slip $\beta_{ACT}$ signals by the Y-Z to $\beta$-$\beta$ converter 46. The Y-Z to $\alpha$-$\beta$ converter 46 calculates the Euler angles ($\phi$, $\theta$, $\psi$) using quaternions with body rates. Then, using both the Euler angles as well as the original sensor data, the angle of attack $\alpha$ and the side slip $\beta$ are estimated by integrating the following equations:

$$d\alpha/dt = A_Z/U + Q - P\beta + (g/V_T)\cos(\theta)\cos(\phi) + (F_X/(m \cdot V_T))\alpha \qquad (1a)$$

$$d\beta/dt = A_Y/U - R + P\alpha + (g/V_T)\cos(\theta)\sin(\phi) + (F_X/(m \cdot V_T))\alpha \qquad (1b)$$

where U is the vehicle airspeed, g is the gravitational constant, m is the mass of the vehicle, $F_X$ is the net force action along the X-axis, and $V_T$ is the total velocity of the vehicle.

Figure 1:
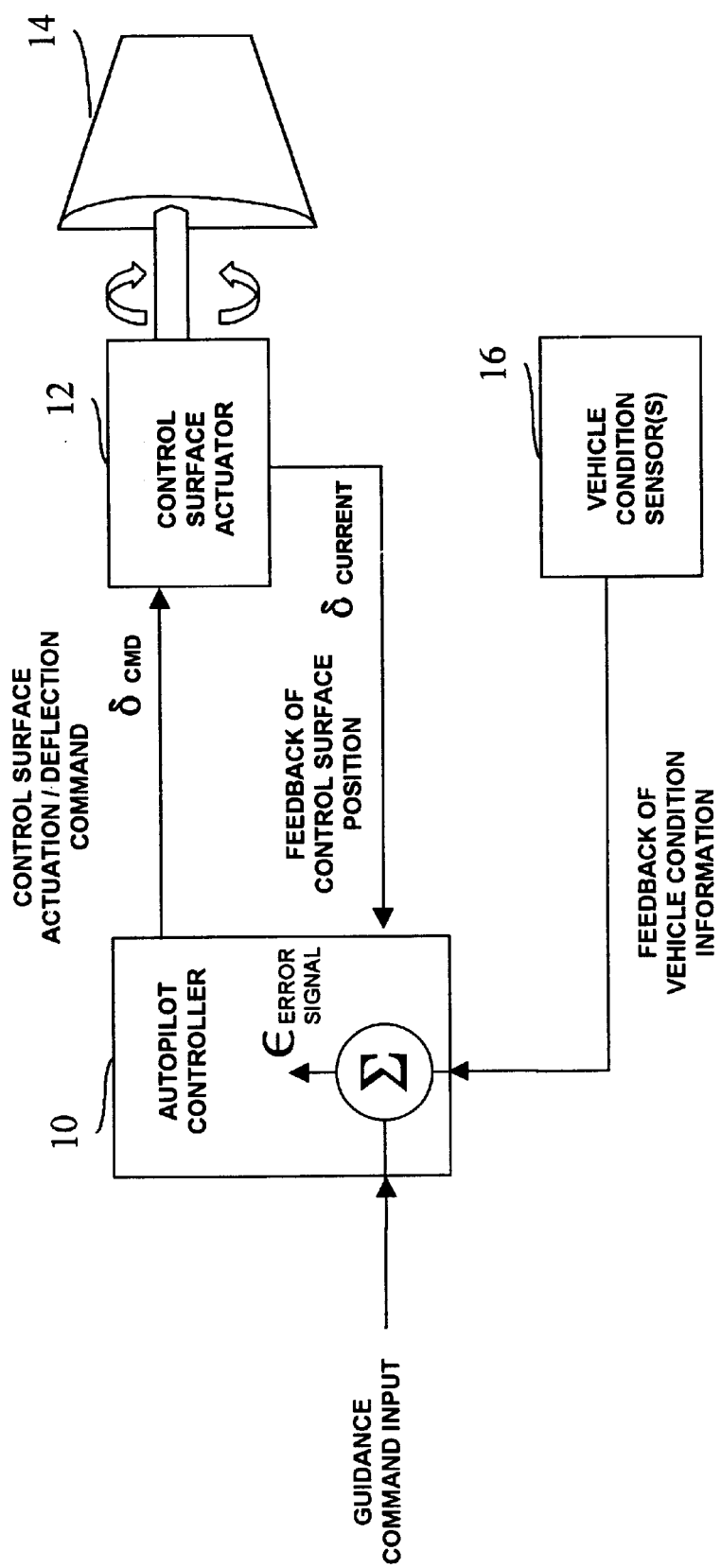
FIG. 1 is a conceptual block diagram of an autopilot which is implemented as a control system with feedback.
Figure 2:
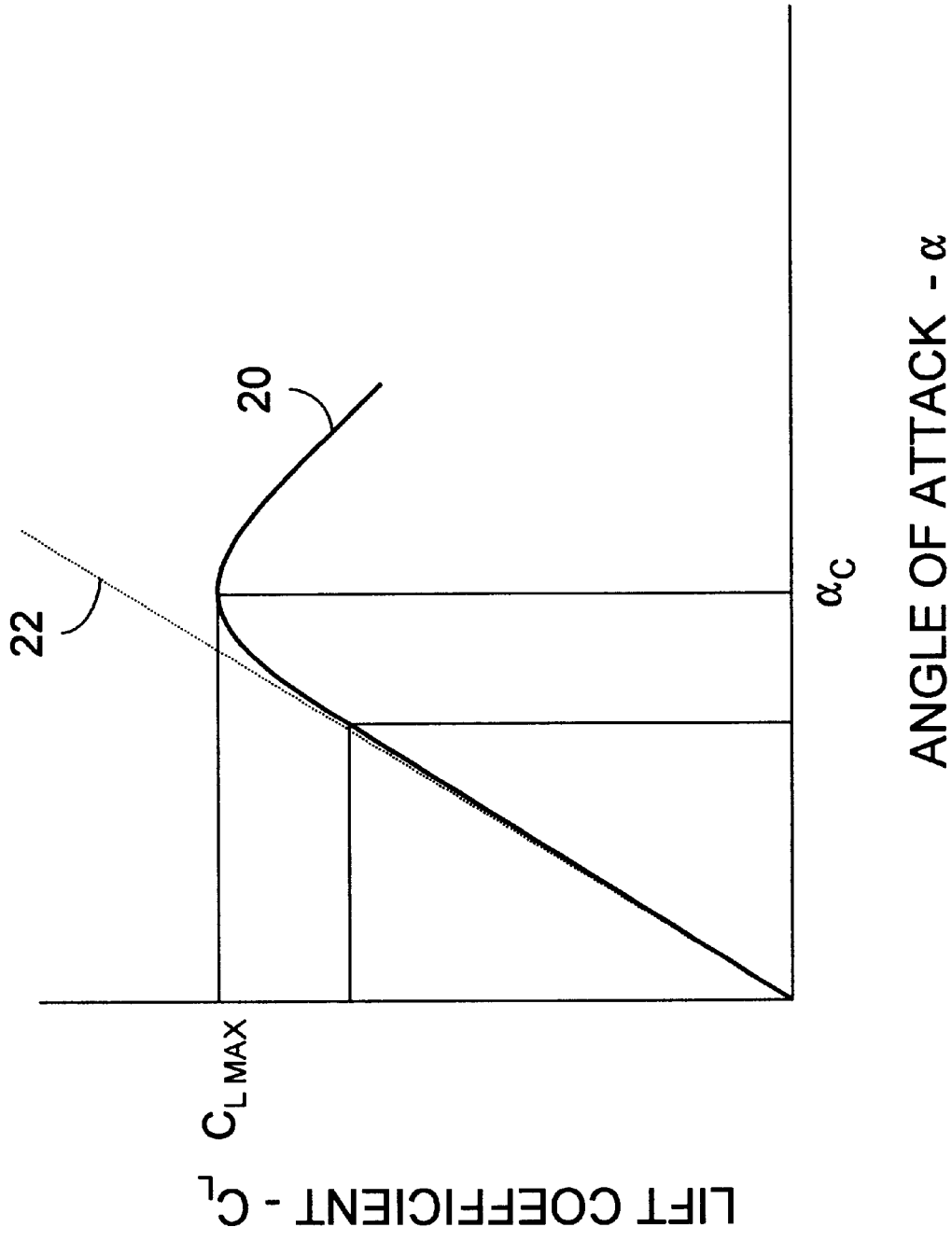
FIG. 2 is a chart illustrating a relationship between the lift generated by a wing, for a given airspeed, as a function of angle of attack.

While the performance of a wing or a control surface can be easily described in terms of the lift coefficient of the wing versus the angle of attack as previously discussed and as shown in FIG. 2, the overall effect from a control surface on the vehicle can be conveniently described in terms of a force acting at the center of gravity of the vehicle as a result of the operation of the control surface, or alternatively as a moment acting about the center of gravity as a result of the operation of the control surface.

Figure 6:
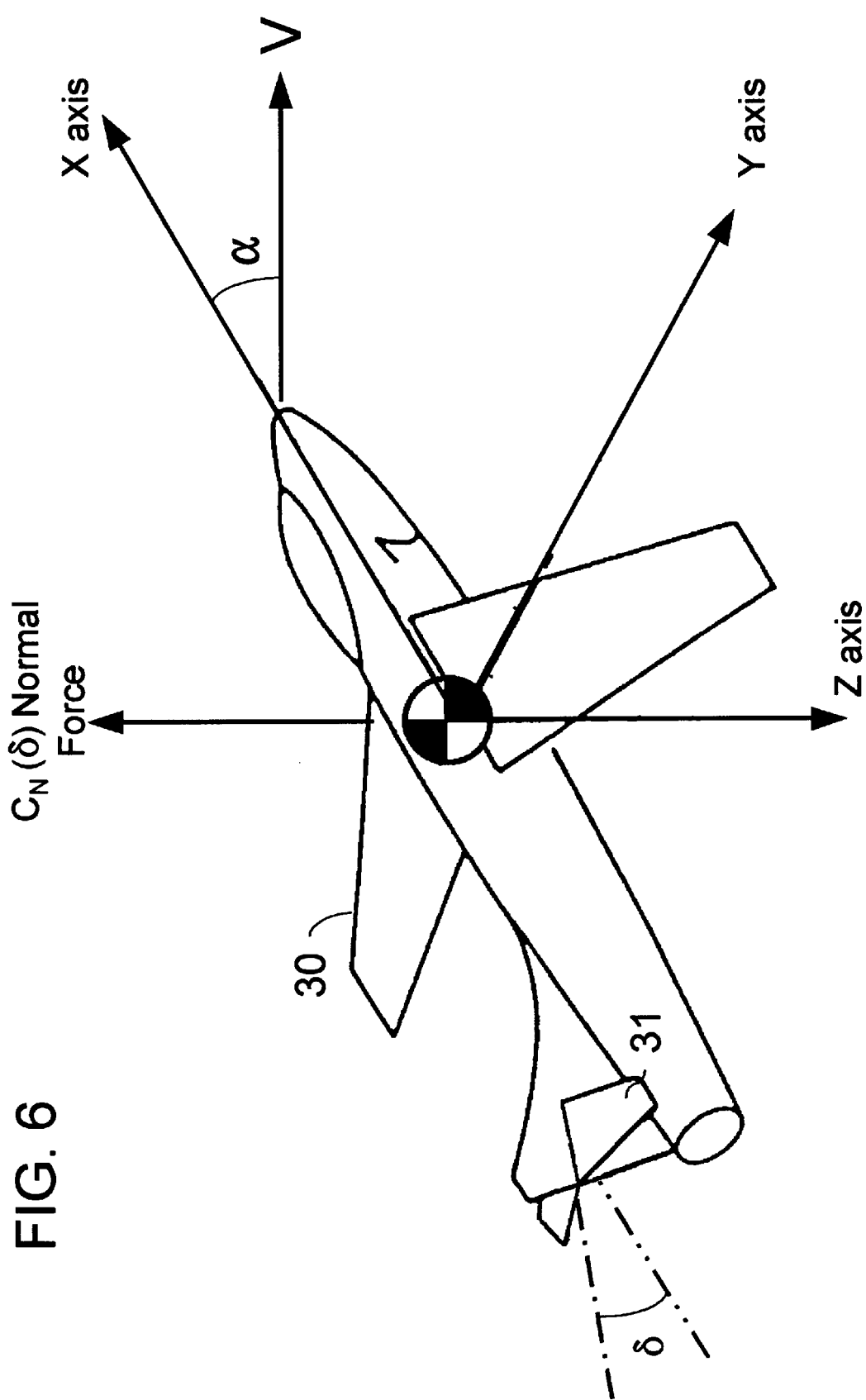
FIG. 6 is a diagram relating fin deflection angle to the angle of attack of a vehicle.

Also, in the case of a control fin which is rotatably mounted on the vehicle, the angle of attack of the control fin is a function of both the angle of attack $\alpha$ of the vehicle and of the angle of deflection $\delta$ of the control fin. FIG. 6 illustrates a vehicle 30 having a rotatable control fin 31. The angle of attack α of the vehicle is defined as the angle between the longitudinal axis (axis) of the vehicle and the velocity vector of the vehicle V. The angle of deflection δ of the control fin is defined as the angle of deflection of the control fin relative to the longitudinal axis (axis) of the vehicle. As a result, the angle of attack of the control fin is equal to the sum of the vehicle angle of attack α and the angle of deflection δ of the control fin.

As noted above, the overall effect from a control surface on the vehicle can be described in terms of a force acting at the center of gravity of the vehicle or as a moment acting about the center of gravity of the vehicle. In order to fully describe the three dimensional aerodynamic effects on a vehicle, using this approach, the following force and moment functions are identified:

$C_N$=Normal force;

$C_Y$=Lateral force;

$C_A$=Drag force;

$C_m$=Body pitch moment;

$C_l$=Body roll moment; and $C_{yn}$=Body yaw moment.

Figure 7:
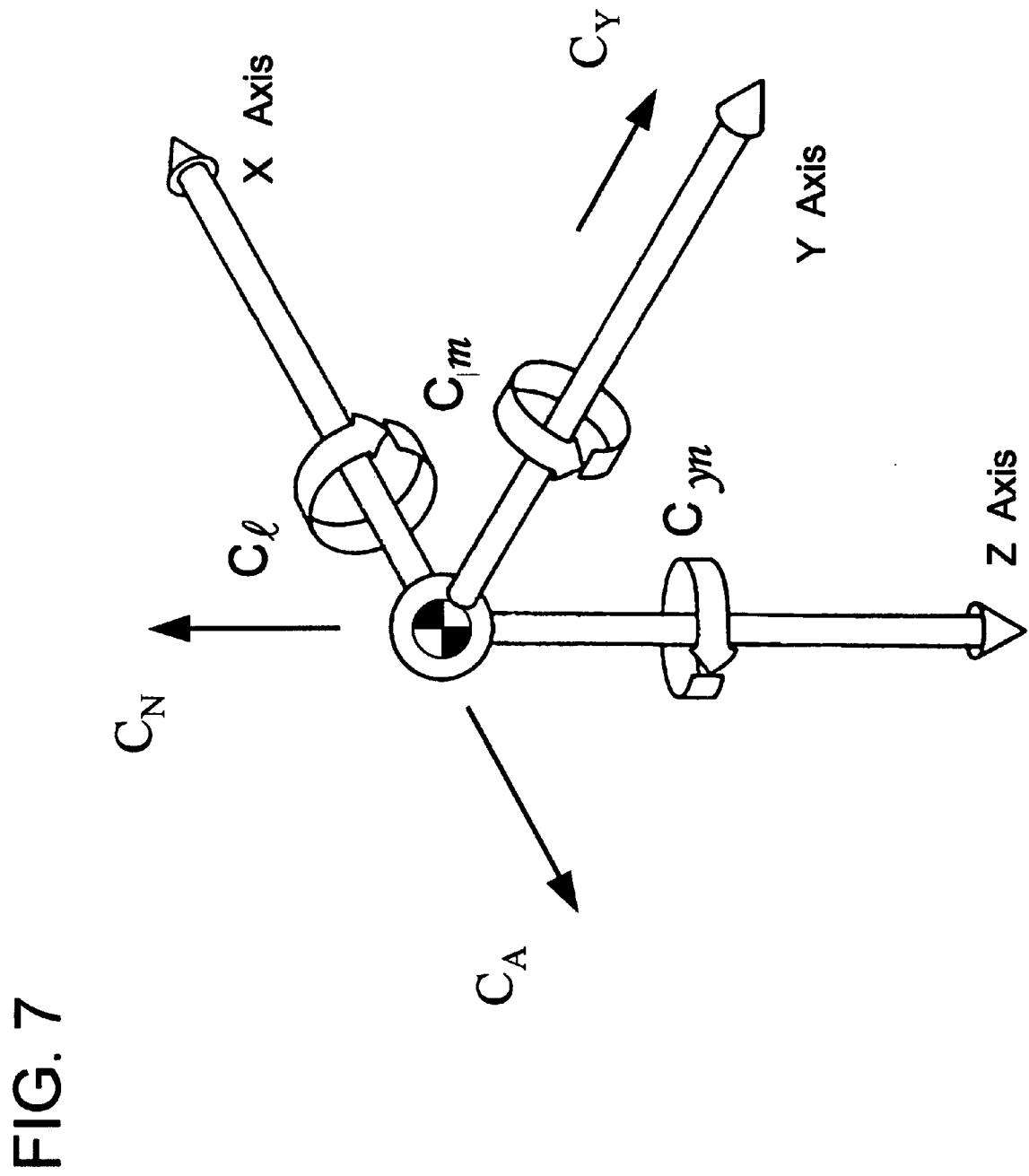
FIG. 7 is a diagram illustrating the nature and orientation of the vehicle dynamic response functions.
Figure 8:
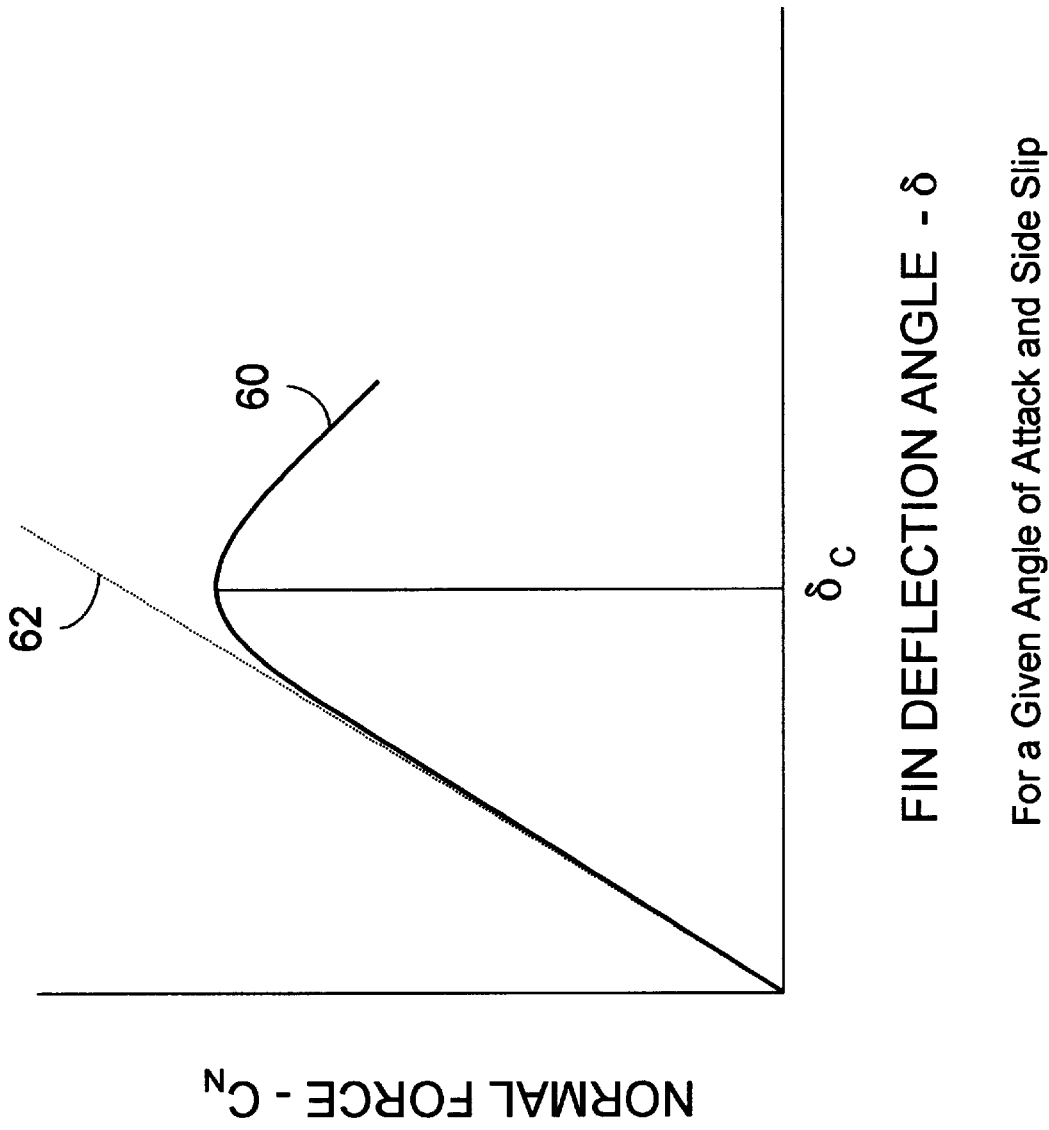
FIG. 8 is a chart illustrating a relationship between the normal force generated by a fin, for a given angle of attack and side slip angle, as a function of the angle of deflection of the fin.

The orientation of each of the above force and moment functions is illustrated in FIG. 7 relative to the previously defined coordinate system. As shown in FIG. 7, each of the force functions is illustrated as acting at the center of gravity of the vehicle. Similarly, each one of the moment functions acts about one of the axes. The amount of force or moment generated will generally be a function of the vehicle physical characteristics, including the position of the fin relative to the center of gravity, and will also be a function of several flight-condition variables which can include, the angle of attack of the vehicle α, the angle of deflection of the control fin δ, the vehicle mach M, and the vehicle side slip angle β, as well as possibly other factors. As an example, FIG. 8 illustrates a force $C_N$ acting at the center of gravity in a negative Z direction as a result of a deflection δ of fin 31. While, for a given vehicle, the amount of force $C_N$ generated at the center of gravity of the vehicle is a function of several variables, for a given angle of attack of the vehicle α, vehicle mach M, and vehicle side slip angle β, the force $C_N$ can be plotted as a function of the angle of deflection δ of the control fin in a manner similar to the plot of the coefficient of lift versus the angle of attack which was previously discussed and which is shown in FIG. 2. While each force and moment can be written so as to expressly indicate that it is a function of a plurality of variables, such as $C_N(α,β,M,δ)$, for simplicity of expression, each force and moment function is generally written herein without the variables expressly recited. Additionally, as will be addressed more fully later, the force and moment functions are coupled, which is to say that actions and reactions in one function affect other functions.

In FIG. 8 curve 60 is a plot, for a given vehicle, of the normal force $C_N$ generated at the center of gravity of a vehicle as a function of the angle of deflection δ of the control fin, for a given angle of attack of the vehicle α, vehicle mach M, and vehicle side slip angle β. Like the plot of coefficient of lift versus angle of attack, the normal force $C_N$ generated versus angle of fin deflection is at least approximately linear (dashed line 62) from zero fin deflection angle to some finite value less than stall. For fin deflection angles beyond this value, the normal force $C_N$ no longer increases linearly and at some point flattens out and then begins to decrease. At the point where the normal force $C_N$ curve reaches its maximum value, the angle of attack of the fin is so great that the airflow no longer conforms to the surface of the wing and stall occurs. In FIG. 8, the stall point is where the slope of the normal force $C_N$ curve is zero and is designated the critical fin deflection angle $δ_C$. Any further increase in the fin deflection angle δ beyond the critical fin deflection angle $δ_C$ results in a reduction of the normal force $C_N$ and in a negative slope of the normal force $C_N$ curve. Because FIG. 8 illustrates the normal force $C_N$ acting at the center of gravity of a vehicle, the point of stall on curve 60 can also be referred to as "body stall." In contrast, because the curve illustrated in FIG. 2 depicts the coefficient $C_L$ for a control surface (and not for the vehicle), the point of stall on curve 20 can also be referred to as "fin stall."

The preferred embodiment of the present invention uses data corresponding to, or representative of, the $C_N$, $C_Y$, $C_A$, $C_m$, $C_l$, and $C_{yn}$ force and moment functions as a basis for determining control force outputs appropriate for achieving a given inputted control command. Specifically, for a given vehicle, a database of vehicle response is developed by determining values for each of the $C_N$, $C_Y$, $C_A$, $C_m$, $C_l$, and $C_{yn}$ force and moment functions across a range of possible operating conditions including the angle of attack of the vehicle α, the vehicle mach M, the vehicle side slip angle β, and the angle of deflection δ of the control fin(s). The database can be developed empirically, for example through wind tunnel testing, or analytically, for example by use of computational fluid dynamics.

Figure 9:
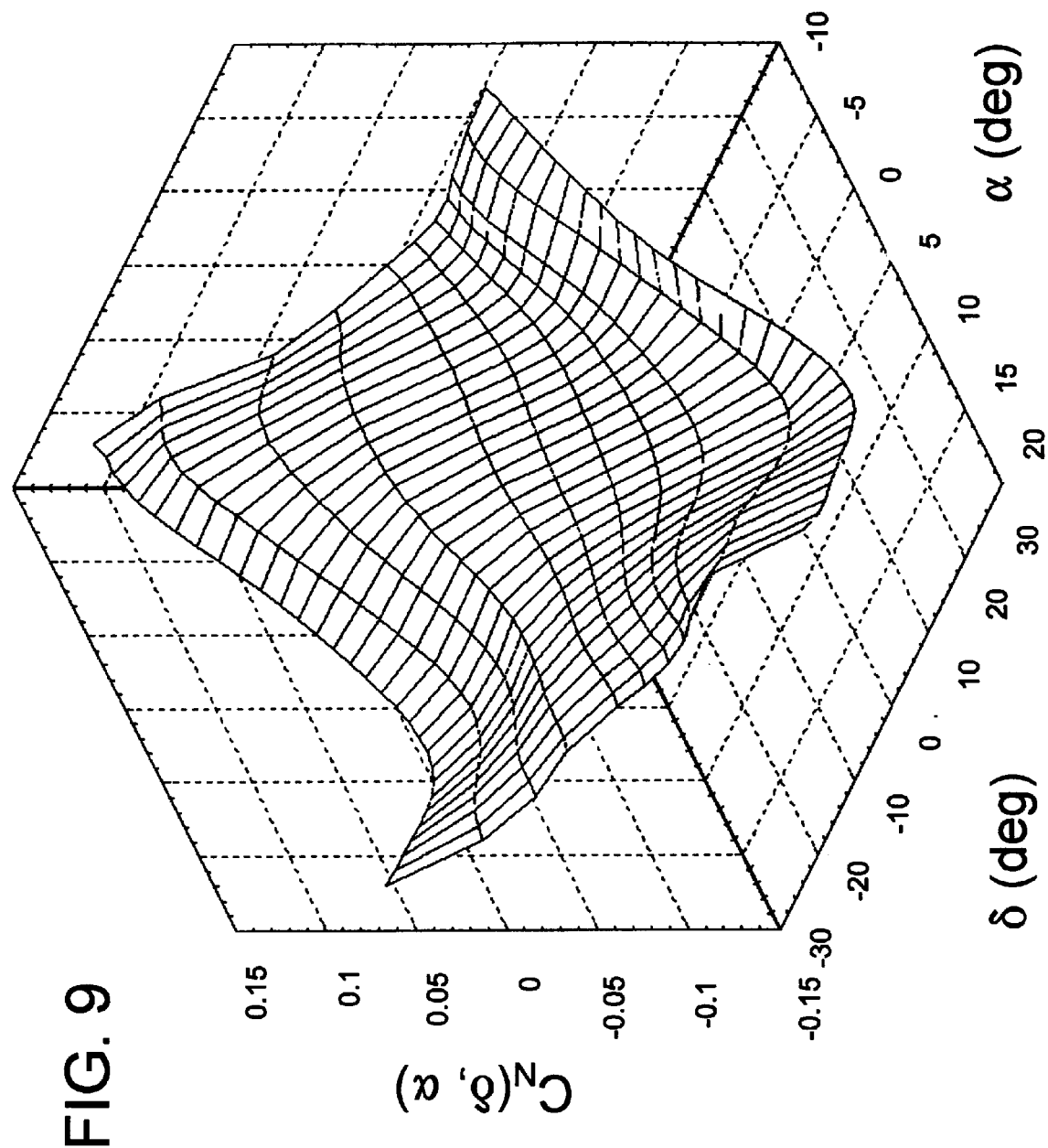
FIG. 9 is a graphic representation of a multidimensional data surface representing normal force as a function of the angle of deflection of a fin and as a function of the angle of attack of the vehicle for a given side slip angle and a given mach number.

An example of the results of the database development is illustrated graphically in FIG. 9. Specifically, for the example of the normal force function $C_N$, a multi-dimensional surface is defined which represents the normal force that results from various operating ranges of the fin deflection δ and of the vehicle angle of attack α. The normal force function is also a function of the vehicle mach M and the vehicle side slip angle β; however a five-dimensional plot is not conveniently illustrated. Thus, the plot in FIG. 9 corresponds to the normal force $C_N$ as a function of fin deflection δ and of vehicle angle of attack α for a given value of vehicle mach M and a given value of the vehicle side slip angle β. The complete database development results in a plurality of aerodynamic "surfaces" which define the vehicle response for each of the $C_N$, $C_Y$, $C_A$, $C_m$, $C_l$, and $C_{yn}$ force and moment functions across a range of operating conditions. Here, the term aerodynamic "surface" refers to the three dimensional data representation of the force or moment function.

While the preferred embodiment of the present invention contemplates the development of a database of vehicle response for each of the $C_N$, $C_Y$, $C_A$, $C_m$, $C_l$, and $C_{yn}$ force and moment functions across a range of operating conditions, a simplified vehicle model can be used for a one or two axis controller where fewer force and moment functions will be required for the vehicle response database.

Figure 10:
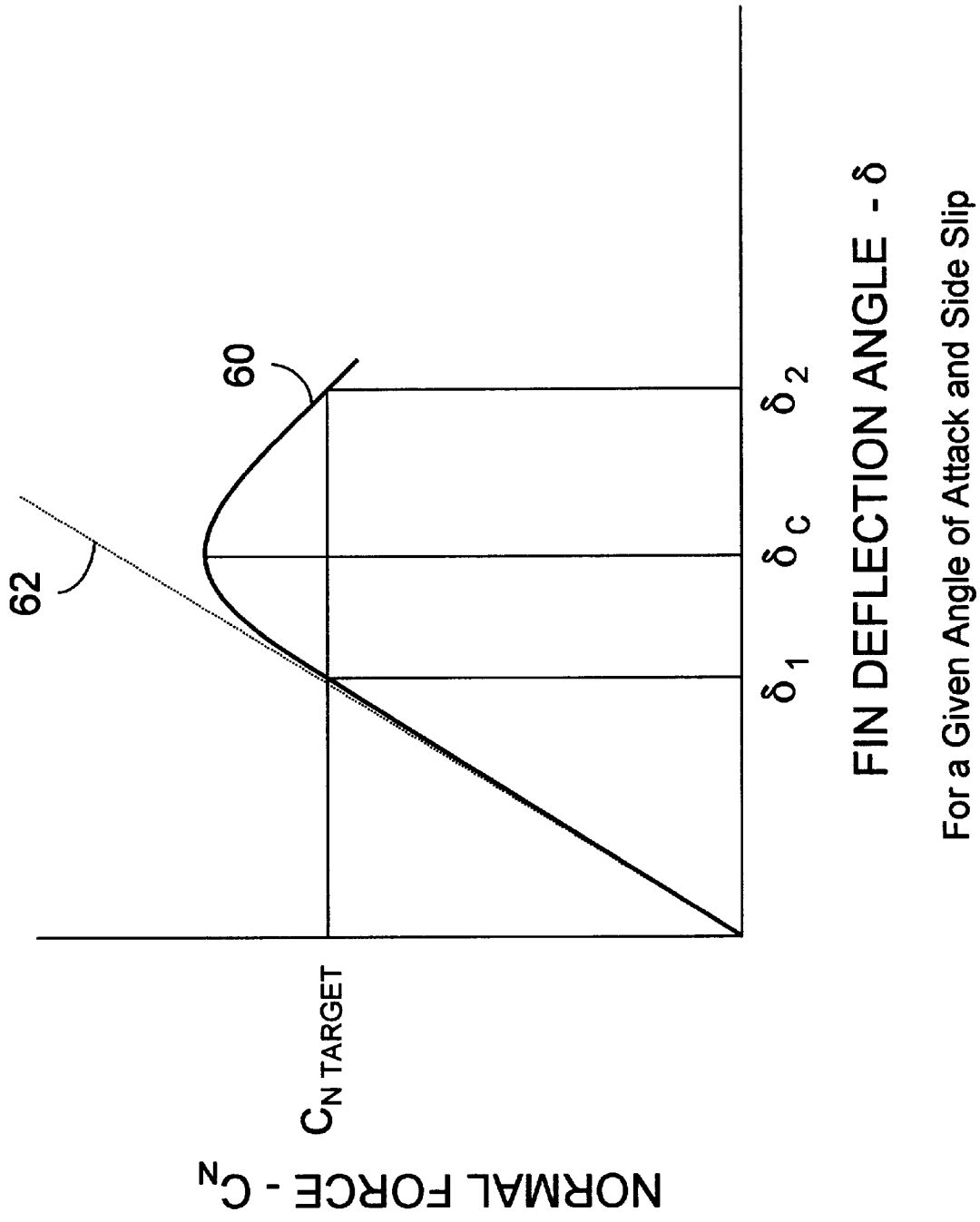
FIG. 10 is chart illustrating a relationship between a target normal force to be generated by a fin, and the plurality of fin deflection angles which are suitable for generating the target normal force.

A problem that has been recognized by the present inventor in controlling a vehicle across both pre stall and post stall regions, and which is addressed by the present invention, is described next in reference to FIG. 10. FIG. 10 is a normal force $C_N$ versus fin deflection angle δ diagram for a given vehicle angle of attack α, mach M, and vehicle side slip angle β. Referring to FIG. 10, while the normal force generated by the fin reaches a maximum value at the critical fin deflection angle $δ_C$, the fin also continues to produce a normal force beyond the critical fin deflection angle $δ_C$. In controlling the vehicle in response to an inputted command, the autopilot controller 40 may receive, for instance, a command to increase normal acceleration $A_Z$, i.e., a pull-up command. To accomplish the requested increase in normal acceleration $A_Z$, the autopilot controller 40 must output fin commands suitable to induce a normal force $C_{N\ TARGET}$ having a value representative of the requested normal acceleration $A_Z$. However, as shown in FIG. 10, if both the pre stall and post stall regions are considered, there are two different fin deflection values for a given amount of normal force which may be desired. More specifically, in the case where a desired normal force $C_{N\ TARGET}$ is to be obtained, fin deflection angle $\delta_1$ and fin deflection angle $\delta_2$ are each suitable for producing the target normal force $C_{N\ TARGET}$. While either fin deflection angle $\delta_1$ or $\delta_2$ would yield the desired normal force $C_{N\ TARGET}$, the fin deflection angle $\delta_1$ corresponds to an unstalled condition of the fin while the fin deflection angle $\delta_2$ corresponds to a situation where the fin is past the point of stall, i.e., in the post stall region.

The stall condition of the fin at each deflection angle can be determined in reference to FIG. 10 by observing that the fin deflection angle $\delta_1$ corresponds to a rising portion on curve 60 at an angle of deflection less than the critical fin deflection angle $\delta_C$, while the fin deflection angle $\delta_2$ corresponds to a falling portion on curve 60 at an angle of deflection greater than the critical fin deflection angle $\delta_C$.

FIG. 10 shows a curve 60 which rises to a maximum value at the critical fin deflection angle $\delta_C$ and then falls off for greater fin deflection angles so that two fin deflection angles correspond to the target normal force $C_{N\ TARGET}$. For some vehicles, however, the force or moment function for a given control surface may be more complicated than that shown in FIG. 10 and may have more than two fin deflection angles which correspond to a target value of the function $C_N$.

In order to control the vehicle in response to an inputted command, the autopilot controller 40 must output a fin deflection angle which is suitable for effecting the inputted command. Thus, in the context of the example shown in FIG. 10, where more than one fin deflection angle would be suitable for effecting the inputted command, because only one fin deflection command can be outputted, the autopilot controller must have some mechanism for determining which one of the plurality of fin deflection angles which are suitable for producing the target normal force $C_{N\ TARGET}$ should be outputted.

In operation the present autopilot continually monitors the error signal as the control surface is moved and continually updates the outputted fin deflection necessary for achieving the inputted command, i.e., for driving the error signal to zero. Accordingly, even though a particular fin deflection suitable for effecting the commanded maneuver may be outputted upon the initial receipt of the inputted command, as the vehicle responds to the fin deflection, and as the magnitude of the error signal or other operating conditions of the vehicle change, the outputted fin deflection may be updated. Thus, it should be understood in regard to the following discussion, that the operation of the present embodiment can be described in terms of the operation within a single iteration, while the overall control of the vehicle over time is achieved by a continual series of updates.

1.2 One-to-One Mapping 1.2.1 Slope Intercept Method of One-to-One Mapping

As noted above, in the situation where more than one fin deflection angle would be suitable for effecting the inputted command, the autopilot controller must have some mechanism for determining which one of the plurality of potentially suitable fin deflection angles should be outputted. Thus, the present inventor has recognized a need for a device or process in the autopilot controller to establish a one-to-one mapping between any force or moment received as an inputted command and a corresponding fin deflection which should be outputted for achieving the desired force or moment.

In a first aspect of the present invention, a one-to-one mapping is achieved by use of the database of vehicle response for at least a portion of the $C_N$, $C_Y$, $C_A$, $C_m$, $C_l$, and $C_{yn}$ force and moment functions, and in particular by evaluating the local slope of the functions at the current vehicle operating conditions and determining a fin deflection in accordance with the determined slope.

Figure 11C:
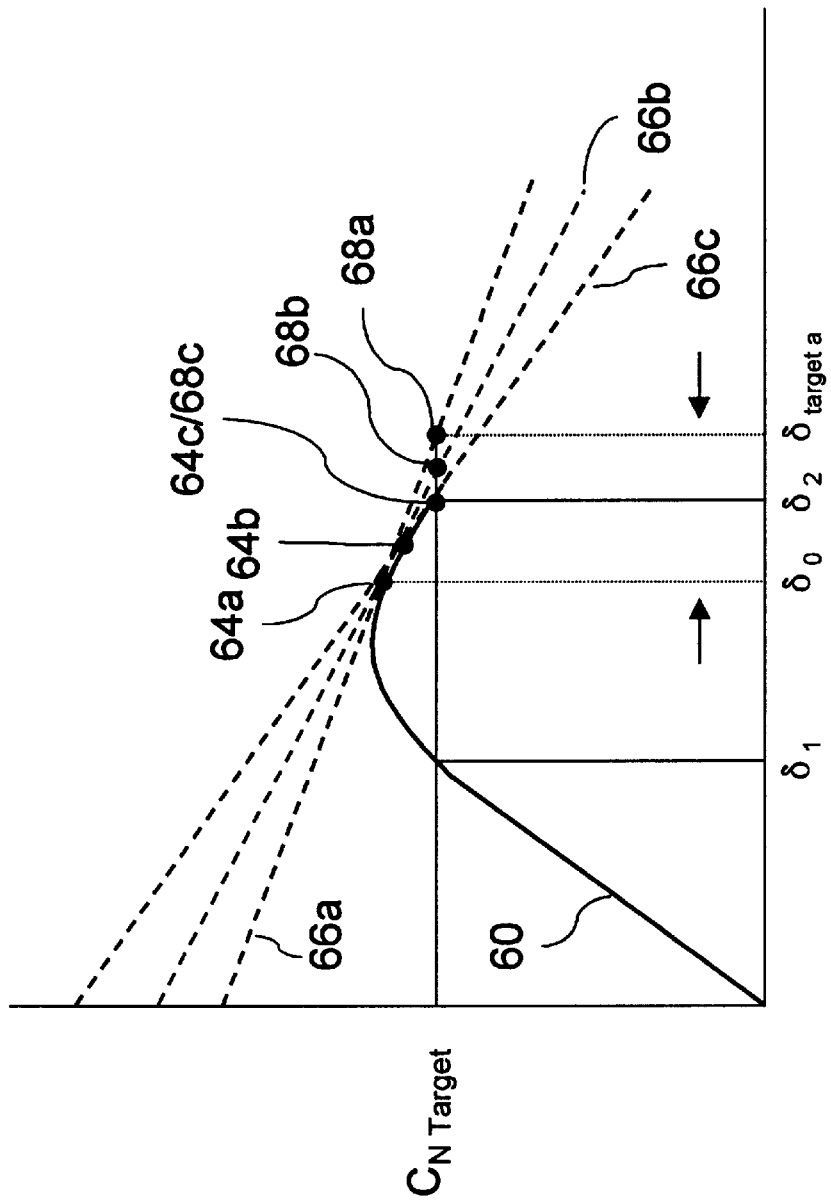
FIG. 11C is a chart illustrating a convergence of target fin deflection amount to actual fin deflection amount.

This approach is illustrated graphically in FIGS. 11A–11C. FIG. 11A is a normal force $C_N$ versus fin deflection angle $\delta$ diagram for a given vehicle angle of attack $\alpha$, a given mach M, and a given vehicle side slip angle $\beta$. The vehicle angle of attack $\alpha$, mach M, and vehicle side slip angle $\beta$ correspond to the current operating conditions of the vehicle at the time that the inputted command is received. As discussed earlier with reference to FIG. 4, the vehicle angle of attack $\alpha$, the mach M and the vehicle side slip angle $\beta$ are determined by a combination of on-vehicle sensors 44 in conjunction with the Y-Z to $\alpha$-$\beta$ converter 46. Also shown in FIG. 11A is a target normal force $C_{N\ TARGET}$, corresponding to an inputted command, for which two fin deflections, $\delta_1$ and $\delta_2$, would be suitable to achieve the target normal force $C_{N\ TARGET}$.

According to the present approach, given the current vehicle operating conditions, the present amount of deflection of the fin $\delta_0$ can be determined on the vehicle response curve 60 (point 64a) at the time that a inputted command is received. The autopilot controller, by use of the vehicle response characteristic functions C, determines a linear function 66a which is tangent to the $C_N$ curve at the current operating point 64a which has a slope equal to the slope of the $C_N$ curve at the current operating point 64a. The slope of the $C_N$ curve at the current operating point 64a can be determined from the vehicle response functions C by taking the partial derivative of the C function with respect to fin deflection and then evaluating the derivative function at the current operating point, i.e., $\partial C/\partial \delta$. The linear function 66a is of the form of:

$$C=(\partial C/\partial \delta)\cdot \delta + C_{intercept} \tag{2}$$

where $\partial C/\partial \delta$ is the slope of the C function at the current vehicle operating condition and $C_{intercept}$ is the point where the linear function 66a crosses the vertical axis. It should be noted that in Equation (2), as well as in other portions of this description, where any one of the $C_N$, $C_Y$, $C_A$, $C_m$, $C_l$, and $C_{yn}$ force and moment functions can apply, the function is expressed as C without any subscript character.

Having determined the linear function at the current operating conditions, the linear function is then used to determine the fin deflection to be outputted which is appropriate for effecting the inputted command. As will be explained further, the determined fin deflection to be outputted can be both a direction of change of fin deflection (i.e., increase or decrease) as well as an amount of change of fin deflection.

Alternatively, the determined fin deflection to be outputted can be only a direction of change of fin deflection (i.e., increase or decrease) relative to the present amount of deflection of the fin $\delta_0$.

As shown in FIG. 11A, when the linear function is used, for any $C_{N\ TARGET}$ there is only one fin deflection angle $\delta_{target\ a}$ which is appropriate for effecting the inputted command (see point 68a). Thus, in the example in FIG. 11A, given the current operating condition (point 64a), the autopilot controller would indicate an increase in fin deflection towards fin deflection angle $\delta_{target\ a}$ in order to effect the inputted command. As noted above, however, the present autopilot continually monitors the error signal and continually updates the outputted fin deflection as necessary for achieving the inputted command, i.e., for driving the error signal to zero. Accordingly, in the example in FIG. 11A, while the autopilot controller can initially indicate an increase of fin deflection toward deflection angle $\delta_{target\ a}$, even as the fin deflection angle is being changed, the autopilot controller will continually reevaluate the necessary fin deflection for achieving the inputted command.

A subsequent iteration for determining the necessary fin deflection is shown in FIG. 11B. In FIG. 11B, after the autopilot controller has initially indicated an increase of fin deflection toward angle $\delta_{target\ a}$, but prior to the fin reaching that deflection angle, the autopilot controller reevaluates the necessary fin deflection to achieve the inputted command. As shown in FIG. 11B, the current operating condition of the vehicle will have changed to $\delta_{NEW}$ (point 64b). Accordingly, in order to determine an appropriate fin deflection to effect the inputted command, given the new current condition of the vehicle, a new linear function 66b is determined. New linear function 66b is tangent to the $C_N$ curve at the new current operating point 64b and has a slope equal to the slope of the $C_N$ curve at the new current operating point. Then, as previously described in regard to the first iteration, the linear function 66b is then used to determine the fin deflection to be outputted which will be appropriate for effecting the inputted command. As shown in FIG. 11B, when the linear function 66b is used, for the given $C_{N\ TARGET}$ there is only one fin deflection angle $\delta_{target\ b}$ which is appropriate for effecting the inputted command (see point 68b). Thus, given the new current operating condition (point 64b), the autopilot controller would now indicate an updated change of fin deflection towards fin deflection angle $\delta_{target\ b}$ to effect the inputted command. The iterative process is continued until the current operating condition of the vehicle and the inputted command are the same (i.e., until the error signal is zero).

As shown by the inwardly pointing arrows in FIG. 11B, the effect of the iterative process is to cause the current operating condition and the target fin deflection to converge towards the fin deflection $\delta_2$ which is on the curve 60 and which is appropriate for effecting the commanded maneuver. The convergence over time of the current vehicle operating condition and the fin deflection necessary for effecting the commanded maneuver is further shown in FIG. 11C. In FIG. 11C the initial vehicle operating condition at the time the inputted command is originally received is shown as $\delta_0$ which corresponds to point 64a on curve 60. Three iterations of the above described process are shown which result in linear functions 66a, 66b and 66c. For each of the iterations, the evaluation of the linear function indicates that a then current amount of fin deflection must be increased in order to effect the commanded maneuver. As the fin deflection is increased, the current vehicle condition moves from original point 64a to point 64b and finally to point 64c. At point 64c, the current vehicle operating condition and the target normal force $C_{N\ TARGET}$ corresponding to an inputted command are equivalent and no further fin deflection is required to achieve the inputted command.

As noted above, the fin deflection command which is outputted as a result of the above described process can be both a direction of change of fin deflection (i.e., increase or decrease) as well as an amount of fin deflection, or alternatively, the fin deflection command can be only a direction of change of fin deflection (i.e., increase or decrease) relative to the present amount of deflection of the fin $\delta_0$. These alternatives are explained next in reference to FIG. 11A. Referring to FIG. 11A, given the target normal force $C_{N\ TARGET}$ and the current fin deflection $\delta_0$, the use of the linear function 66a which is tangent to the $C_N$ curve at the current vehicle operating condition, can determine a target fin deflection appropriate for effecting the inputted command is determined to be $\delta_{target\ a}$. The determined fin deflection $\delta_{target\ a}$ is greater than the present fin deflection $\delta_0$ by an amount $\Delta\delta = \delta_{target\ a} - \delta_0$. Thus, one approach is for the autopilot controller to output a fin deflection command to increase the fin deflection by a $\Delta\delta$ amount. Thus, this command approach includes both a direction of change and an amount of change.

As an alternative, because changing the fin deflection takes a finite amount of time, and because the fin deflection for achieving the inputted command is iteratively updated, it is also possible to output only a direction of change of fin deflection (i.e., increase or decrease) without also outputting an amount of change. In this approach, the control surface actuator 12 responds to an outputted command by beginning a change of fin deflection in the commanded direction at a given rate of change. The nature of the command signal and the actuator are arranged so that the actuator continues to change the fin deflection at the given rate until the outputted command from the autopilot controller changes. Thus, at each iteration, the outputted command from the autopilot controller indicates whether the control surface actuator 12 should continue to change the fin deflection in the present direction, reverse the direction of change of fin deflection, or stop changing the fin deflection. Thus, in this approach, the outputted fin command indicates whether to increase, decrease, or stop changing the fin deflection amount so as to drive the error signal to zero. In order to avoid excessive oscillation, the stop condition can be achieved when the error signal is less than a threshold value in either direction.

As a variation on the above second alternative, the autopilot controller can be configured to output a direction of change of fin deflection (i.e., increase or decrease) together with a rate of change of fin deflection. Thus, for instance for large error signals, the speed at which the fin deflection is changed can be made a function of the error signal. Like the second alternative above, this approach does not require that an amount of change of fin deflection be outputted because the fin deflection will be either increased or decreased as necessary until the error signal is driven to zero. In order to avoid excessive oscillation, the stop condition can be achieved when the error signal is less than a threshold value in either direction.

As a variation on the first alternative, the autopilot controller can be configured to output a direction of change of fin deflection, an amount of fin deflection as well as a rate of change of fin deflection.

As will be appreciated from reviewing the above alternatives, each alternative requires at least that the direction of change of fin deflection (i.e., increase or decrease) relative to the present amount of deflection of the fin $\delta_0$ be outputted.

As can be seen from FIG. 11C, while this iterative approach drives the error signal to zero by converging to one of the two fin deflections, $\delta_1$ and $\delta_2$ which are suitable for effecting the inputted command, it should be noted that according to the present approach, during each iteration there is only one fin deflection target amount determined. Accordingly, the problem previously presented of having two or more suitable fin deflection amounts without a means to choose among them is overcome by the present approach.

It should be noted that the above described approach is suitable when temporary or extended operation of the vehicle in a post stall region is not undesirable. As will be described in Section 4.0 of the present description, in the case where operation of the vehicle in the post stall region is considered undesirable, an additional embodiment of the present invention includes a stall detection and recovery device so that in the event of a stall, the outputted fin deflection commands will act so as to return the vehicle to the pre stall region.

As indicated above, the autopilot controller, by use of the vehicle response characteristic functions C, determines the linear function 66 in the form of $C=(\partial C/\partial \delta)\cdot \delta + C_{intercept}$. Accordingly, the autopilot controller must be supplied with data corresponding to at least a portion of the $C_N$, $C_Y$, $C_A$, $C_m$, $C_l$, and $C_{yn}$ force and moment functions so that the partial derivative of the C function with respect to fin deflection can be determined as needed.

In a first approach, data corresponding to the vehicle response functions are stored in the autopilot memory 54 so that the derivative of the C function with respect to fin deflection can be calculated as needed. In a second, and preferred, approach, data of the form of $(\partial C/\partial \delta, C_{intercept})$, pairs, which are a function of the vehicle operating conditions, are stored in the memory for use as needed. In this approach, because the autopilot controller of the present embodiment does not use the C function data directly, storing only the $(\partial C/\partial \delta, C_{intercept})$ pairs eliminates the need to calculate the derivative data as it is needed, thereby conserving processing capacity and additionally eliminating the need to store the C function data altogether. Thus, for a given vehicle operating condition including current fin deflection amount, the corresponding $(\partial C/\partial \delta, C_{intercept})$ pair is read from the memory 54, and the linear function which is appropriate for the current operating conditions can be determined directly from the $(\partial C/\partial \delta, C_{intercept})$ pair.

Figure 12:
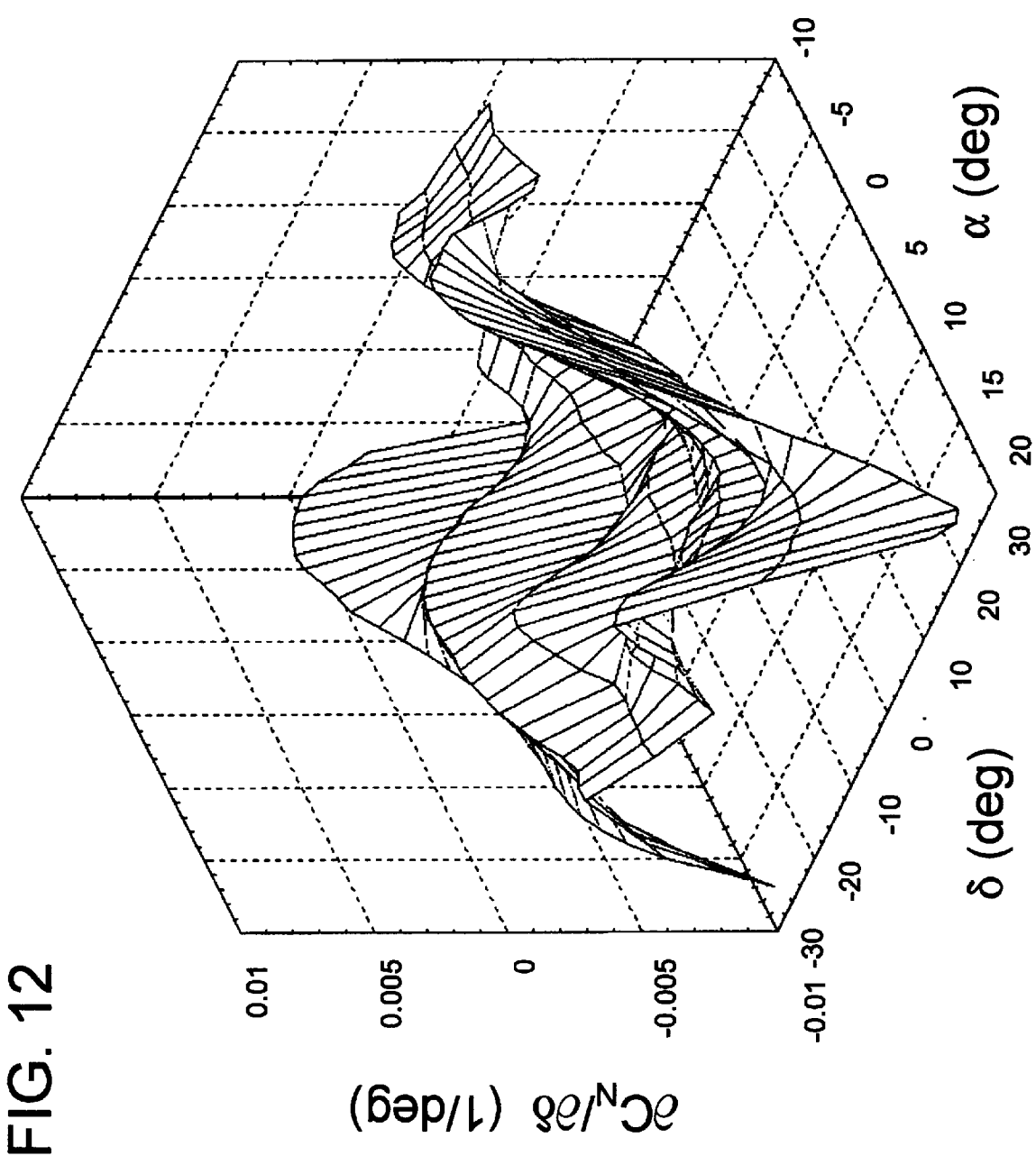
FIG. 12 is graphic representation of a multidimensional data surface representing the derivative of the normal force function versus the angle of deflection of the fin and versus the angle of attack of the vehicle for a given side slip angle and a given mach number.
Figure 13:
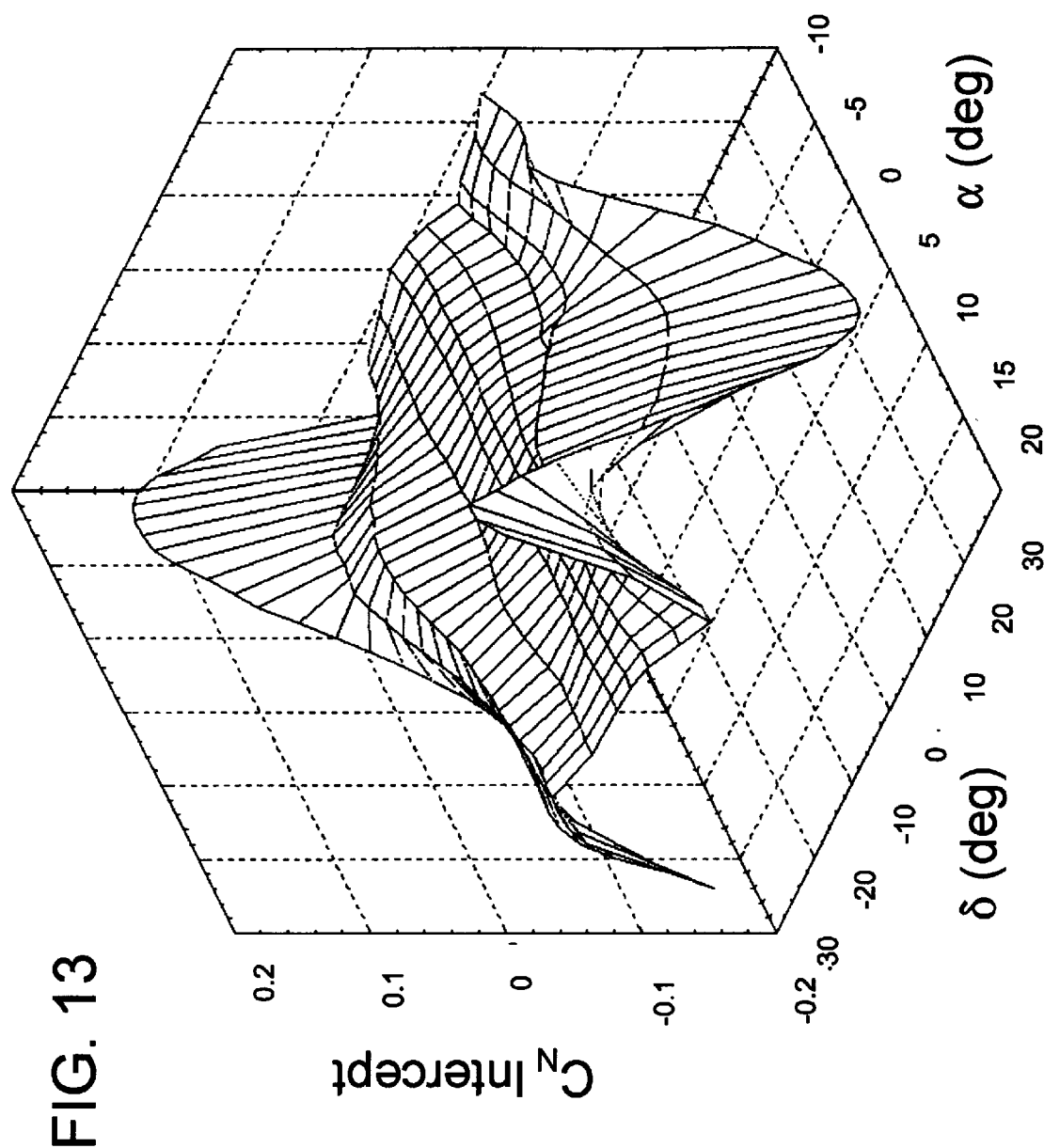
FIG. 13 is graphic representation of a multidimensional data surface representing the normal force intercept versus the angle of deflection of the fin and versus the angle of attack of the vehicle for a given side slip angle and a given mach number.

Whether data corresponding to the vehicle response functions is stored in the autopilot memory 54, so that the derivative of the C function with respect to fin deflection can be calculated as needed, or data of the form of $(\partial C/\partial \delta, C_{intercept})$ pairs are stored in the autopilot memory 54, the data are processed by the processor 52 in conjunction with the various vehicle condition data, in order to determine the appropriate fin deflection to be outputted. In the case where data corresponding to $\partial C/\partial \delta$ and to $C_{intercept}$, as a function of the vehicle operating conditions are stored in the memory for use in the above described system, these data can be represented as multidimensional surfaces in a manner similar to the representation of the $C_N(\delta,\alpha)$ surface shown in FIG. 9. Specifically, FIGS. 12 and 13 illustrate the $\partial C_N/\partial \delta$ and $C_{N\ intercept}$ multidimensional surfaces, respectively, which correspond to the $C_N(\delta,\alpha)$ surface shown in FIG. 9.

Figure 14:
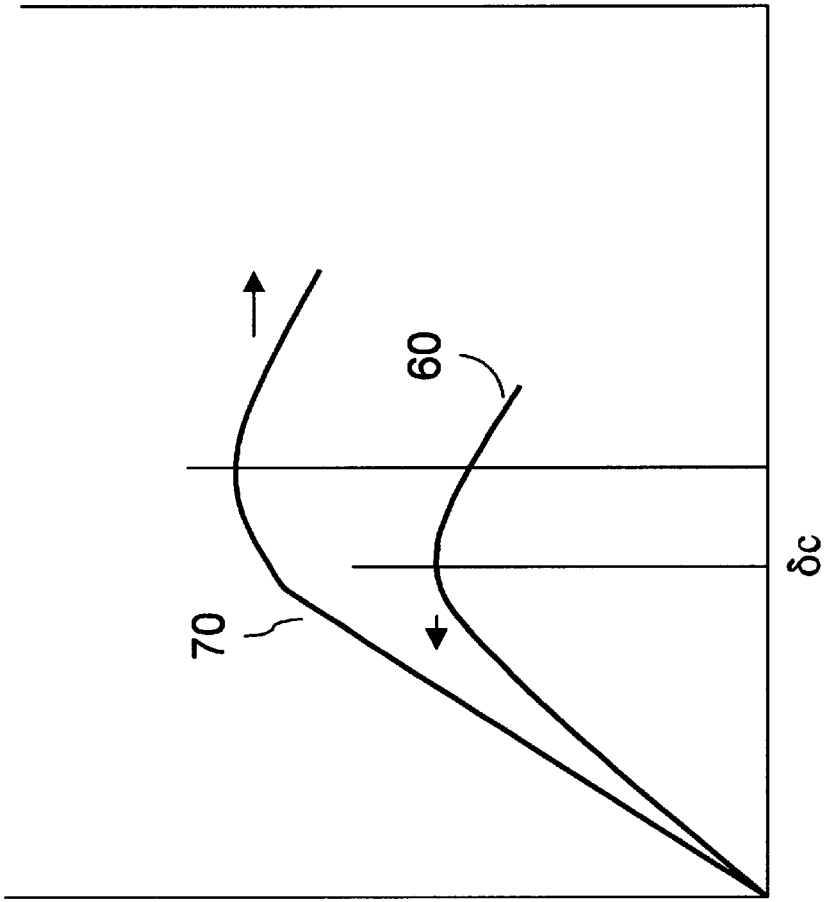
FIG. 14 is a chart illustrating the relationship between the normal force function and the body pitch moment function versus angle of deflection of the fin.
Figure 15B:
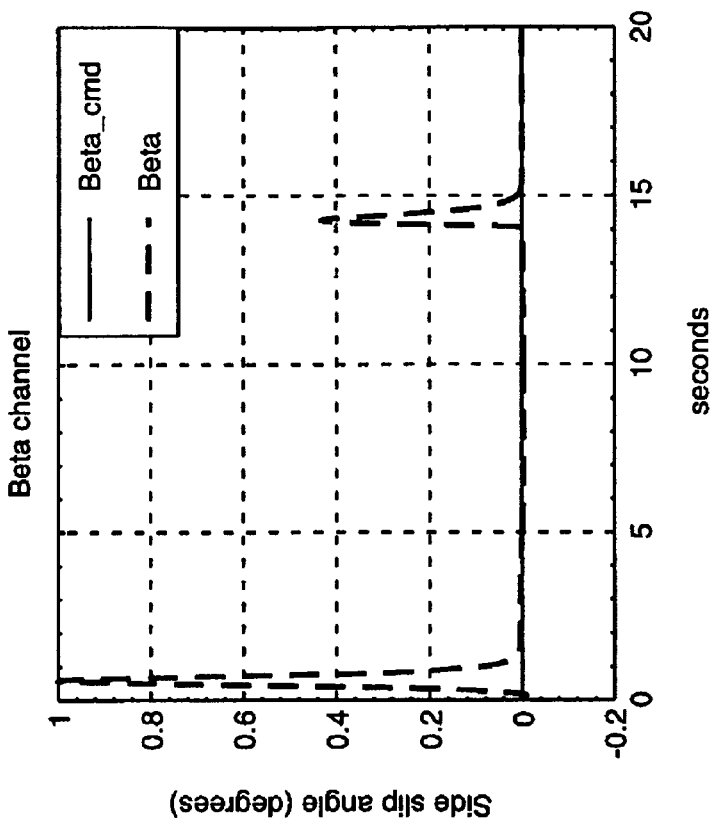
Figure 15A:
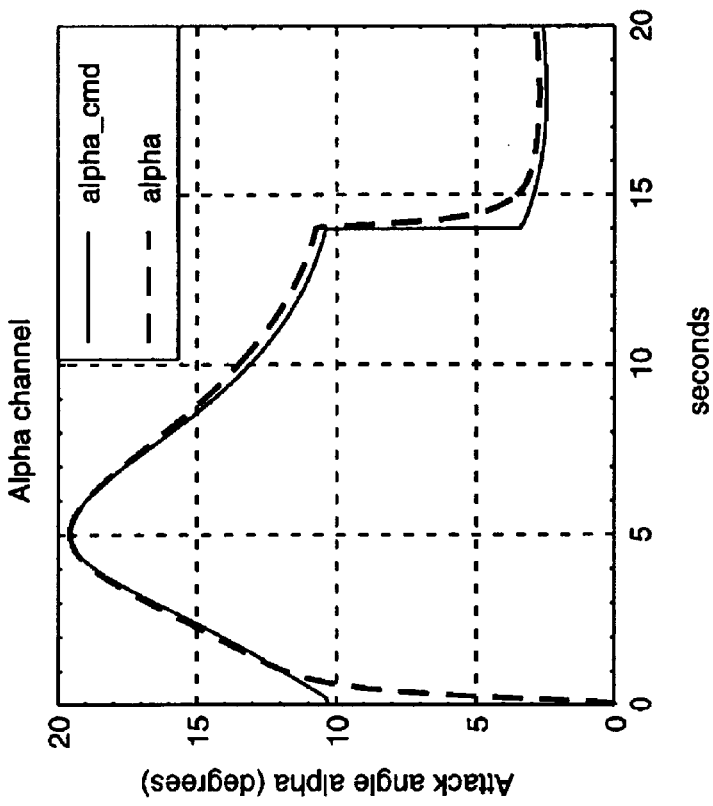
Figure 15F:
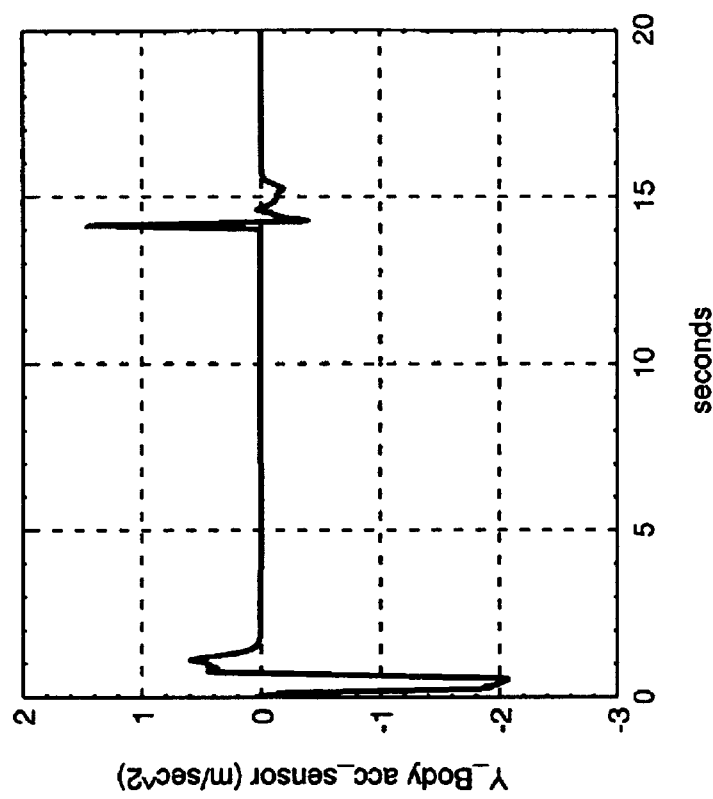
Figure 15E:
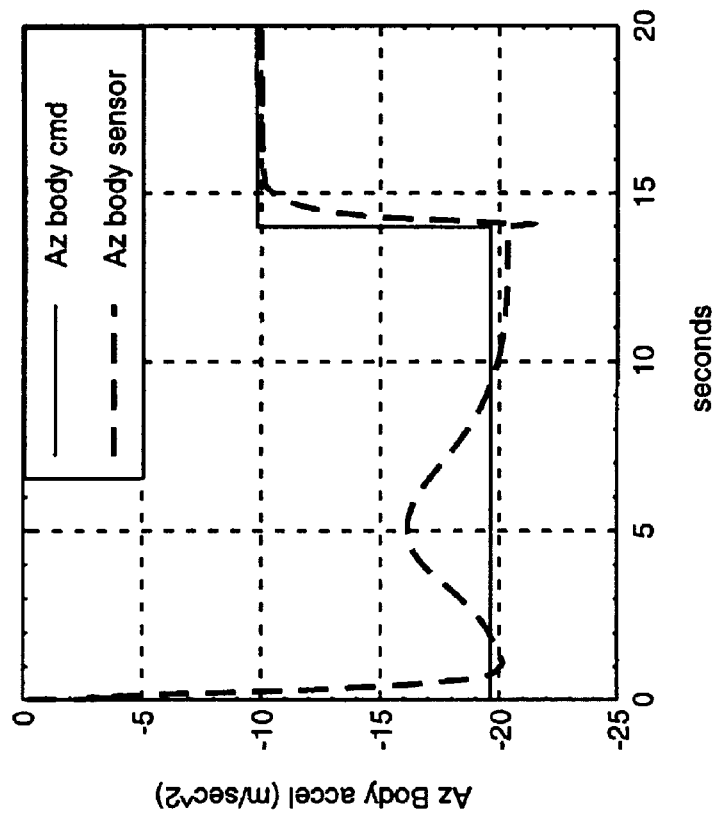

One issue with the above approach occurs at the point of stall where $\partial C_N/\partial \delta$ is zero. There, a singularity occurs in the vehicle dynamic response function. As will be described more fully later, according to a second aspect of the current invention, the vehicle can be controlled at, and near, the stall point by controlling the normal force $C_N$ generated using calculations based on the body pitch moment $C_m$ thereby avoiding the singularity in the $C_N$ function at the stall point. As shown in FIG. 14, for a given angle of attack of the vehicle $\alpha$, a given vehicle mach M, and a given vehicle side slip angle $\beta$, the body pitch moment $C_m$ 70, in addition to the normal force $C_N$ 60, can be plotted as a function of the angle of deflection $\delta$ of the control fin. It should be noted from FIG. 14 that while the normal force $C_N$ curve 60 reaches a maximum at the critical angle of deflection $\delta_C$—which corresponds to the point of stall—the body pitch moment $C_m$ 70 curve does not reach a maximum until after the point of stall. Thus, the derivative of the body pitch moment $C_m$ 70 curve with respect to fin deflection $\delta$ is not zero until well after the stall point.

Also as described more fully below, the vehicle can also be controlled based on a combination of the normal force $C_N$ and the body pitch moment $C_m$. Specifically, for vehicle operating conditions which are not near the stall point, the vehicle can be controlled based on the normal force $C_N$. When the vehicle is near the stall point the basis of control can be switched and the vehicle can be controlled based on the body pitch moment $C_m$.

In regard to FIG. 14, the sign (polarity) of the normal force $C_N$ and the body pitch moment $C_m$ are conventionally in opposite directions. However, FIG. 14 is shown with the $C_N$ and $C_m$ curves, that is curves 60 and 70 respectively, with the same sign so that the position of the zero slope point of each curve can be more easily compared.

1.2.2 Transform Method of One-to-One Mapping

As an alternative to the slope-intercept method of providing one-to-one mapping, it is also possible to obtain one-to-one mapping by applying different types of mathematical transformation to the force function. Specifically, what is needed is to transform the force function, which represents force as a function of fin deflection for a given set of vehicle operating conditions, to a mapping function which represents the opposite relationship, i.e., fin deflection as function of force of the form where there is only one fin deflection for any given force.

1.2.3 Look Up Method of One-to-One Mapping

An alternative to either the slope-intercept or the transform method of providing one-to-one mapping is a data look-up or search method based on a stall condition determination. In this approach, data from the vehicle response for each of the $C_N$, $C_Y$, $C_A$, $C_m$, $C_l$, and $C_{yn}$ force and moment functions across a range of operating conditions are first analyzed to determine the set of vehicle conditions which correspond to a stall condition. This can be understood by reference to FIG. 8. As shown in FIG. 8, for a given angle of attack $\alpha$ and side slip $\beta$, a fin deflection of $\delta_C$ corresponds to a stall condition. Thus, for a fin deflection greater than $\delta_C$ the fin is stalled, and for a fin deflection less than $\delta_C$ the fin is in a pre staff condition. Thus, for the range of vehicle operating conditions, a database can be constructed which shows $\delta_C$ as a function of operating conditions. Next, data from the vehicle response for each of the $C_N$, $C_Y$, $C_A$, $C_m$, $C_l$, and $C_{yn}$ force and moment functions across a range of operating conditions are divided into pre-stall and post stall categories. Then, based on the stall condition database and the divided force and moment functions, it is possible to provide one-to-one mapping between a desired force or moment and the corresponding fin deflection to achieve that force or moment based on a stall state determination.

Specifically, in order to provide a one-to-one mapping, the stall condition of the vehicle is determined based on the current vehicle operating conditions and the current fin deflection. If the fin is stalled, then only the post stall database of the force and moment functions is used to determine a target fin deflection for a desired force. Similarly if the fin is not stalled, then only the pre stall database of the force and moment functions is used to determine a target fin deflection for a desired force.

With reference to FIG. 10 this approach can be seen to provide one-to-one mapping. As seen in FIG. 10, each of two fin deflections, $\delta_1$ and $\delta_2$, would be suitable to achieve the target normal force $C_{N\ TARGET}$. However, if the fin stall status is determined to be in a pre stall state, and thus if only the portion of curve 60 to the left of $\delta_C$ is considered, then only one fin deflection $\delta_1$ is suitable to achieve the target normal force $C_{N\ TARGET}$. Similarly, if the fin stall status is determined to be in a post stall state, and thus if only the portion of curve 60 to the right of $\delta_C$ is considered, then only one fin deflection $\delta_2$ is suitable to achieve the target normal force $C_{N\ TARGET}$.

The look up method of one-to-one mapping is likely to require greater memory and processing capacity in the autopilot controller than either of the slope-intercept method or the transform method. In view of the continuing decrease in the cost of memory and the continual improvement in processor capacity, the impact of the hardware requirements for the look up method of one-to-one mapping will decrease in significance.

While the prior explanations of the first embodiment of the present invention are mostly in terms of controlling the vehicle along a single axis, or in a single degree of freedom, the preferred embodiment of the present invention contemplates a three axis, fully coupled six-degree-of-freedom implementation. Accordingly, the following section 2.0 presents a second embodiment of the present invention where the fully coupled six-degree-of-freedom, nonlinear vehicle response functions for each of $C_N$, $C_Y$, $C_A$, $C_m$, $C_l$, and $C_{yn}$ are presented and the approach for achieving one-to-one mapping between an inputted command and a fin deflection angle suitable for effecting the command is derived. As will be appreciated by those of skill in the art, while the mathematical expressions are more extensive in the full six-degree-of-freedom implementation, the general principles of the present invention outlined above in regard to the first embodiment still apply.

2 Detailed Description of Preferred Embodiment of Multi-Degree of Freedom, Nonlinear Autopilot The following section presents a detailed description of a preferred embodiment of the present invention as implemented in a multi-axis autopilot. Equation numbers for this section are local to this section. Accordingly, the first equation of this section begins with equation 1. The present embodiment is based on the fully coupled nonlinear equations of motions. As a result, the present embodiment provides for one autopilot control design which is capable of controlling a vehicle in any region of its flight mission trajectory.

Prior to describing the present preferred embodiment, it should be noted that because of the complex structure of the equations of motion's dynamics, i.e., the fact that the equations of motions dynamics do not satisfy either the matching conditions or the generalized matching conditions, traditional nonlinear autopilot design techniques cannot be applied to the six degreee of freedom (6DOF) equations of motion dynamics directly because of the dynamic structure of the 6-DOF equations of motions. However, according to the present invention, it is possible to design a successful nonlinear autopilot for the 6-DOF equations of motion. Two variations on the preferred embodiment are disclosed: one control design scheme yields a static controller (closed form solution) while the other results in a dynamic controller (solution of a nonlinear non-homogeneous ordinary differential equation) whose solution is calculated on line (on the fly).

The second nonlinear control design technique (dynamic) is simple yet powerful. This autopilot design called "Dynamic autopilot controller design" has been simulated for the 6-DOF equations of motion. Before proceeding with the dynamic controller design, a short summary of the advantages and disadvantages of nonlinear autopilot controllers is presented.

2.1 Benefits of Nonlinear Autopilot Controllers

For any autopilot control design, including the present preferred embodiment, there are always trade-offs in the design itself. The trade-offs are usually a compromise between system performance and robustness. The dynamic nonlinear autopilot should be considered for the following reasons:

1. A nonlinear controller can directly (on the fly) compensate for the coupled dynamics as well as the nonlinearity associated with the vehicle aerodynamics. There is no need for storing large gain scheduling tables. The gains of the nonlinear autopilot are of nonlinear and varying type, and are functions of the system error. The nonlinear gains are valid for all of the flight mission trajectory (after minor tweaking), thus there is no need to break the flight mission trajectory into separate phases.

2. Since the controller is provided with the nonlinear vehicle aerodynamics as feedback signals, the nonlinear autopilot can detect when a specific vehicle reaches or passes its stall condition/region and can compensate for such a condition by driving the system states away from the stalling region and thus recovering the vehicle. This is accomplished by feeding the controller the full nonlinear force/moment aerodynamic equations in which more fin deflection does not necessarily mean larger external forces/moments. That is, the autopilot controller will know, through feedback signals and the fact that nonlinear aerodynamic databases are being used in the feedback loop, that excessive fin deflection(s) actually reduces the external forces/moments on the vehicle body. In comparison, a linear autopilot design cannot compensate when a vehicle is in a stall region because a linear autopilot design assumes that more fin deflection translates into larger external forces/moments (linear slope) for all increasing values of angle of attack $\alpha$. Again, utilizing a nonlinear controller can aid in obtaining high precision tracking and end game accuracy, especially if a vehicle needs to operate in proximity to the stall region.

3. In one approach, the nonlinear autopilot controller design is derived using a systematic procedure including few steps and without the need to decouple the equations of motions into inner/outer loops. This of course will decrease the control design time required to develop the nonlinear autopilot controller.

2.2 Dynamic Autopilot Controller Design

A nonlinear autopilot controller can be designed using the fully coupled nonlinear equations of motion. The equation that relates angle of attack $\alpha$ and vertical velocity W is given by;

$$\alpha = \tan^{-1}\frac{W}{U},$$

where U is vehicle velocity along the X-axis. Differentiating the above equation yields $$\dot{\alpha} = \frac{U\dot{W} - W\dot{U}}{U^2 + W^2}, \tag{1}$$

where $$\begin{bmatrix} \dot{U} \\ \dot{V} \\ \dot{W} \end{bmatrix} = \begin{bmatrix} \frac{1}{m}F_X - QW + RV \\ \frac{1}{m}F_Y + PW - RU \\ \frac{1}{m}F_Z + QU - PV \end{bmatrix}.$$

Variables $F_X$, $F_Y$, and $F_Z$ are the resultant external forces. Substituting the above in equatons (1), results in:

$$\dot{\alpha} = \left(\frac{U}{U^2+W^2}\right)\frac{F_Z}{m} + \left(\frac{W}{U^2+W^2}\right)\frac{F_X}{m} + \tag{2}$$

$$Q - \left(\frac{UV}{U^2+W^2}\right)P + \left(\frac{WV}{U^2+W^2}\right)R.$$

The following are relationships between ($\alpha$, $\beta$) and vehicle velocities:

$$\cos\alpha = \frac{U}{\sqrt{U^2+W^2}},$$

$$\sin\alpha = \frac{W}{\sqrt{U^2+W^2}},$$

$$\tan\beta = \frac{V}{\sqrt{U^2+W^2}},$$

$$V_T\cos\beta = \sqrt{U^2+W^2},$$

where $$V_T = \sqrt{U^2+V^2+W^2}.$$

Combining the above terms into a form that can be used in equation (2), provides:

$$\frac{U}{U^2+W^2} = \frac{\cos\alpha}{V_T\cos\beta},$$

$$\frac{W}{U^2+W^2} = \frac{\sin\alpha}{V_T\cos\beta},$$

$$\frac{UV}{U^2+W^2} = \cos\alpha\tan\beta,$$

$$\frac{VW}{U^2+W^2} = \sin\alpha\tan\beta.$$

Finally, substituting the above relationships in equation (2) yields;

$$\dot{\alpha} = \left(\frac{\cos\alpha}{V_T\cos\beta}\right)\frac{F_Z}{m} + \left(\frac{\sin\alpha}{V_T\cos\beta}\right)\frac{F_X}{m} + \tag{3}$$

$$Q - P\cos\alpha\tan\beta - R\sin\alpha\tan\beta.$$

Next, the dynamics for side slip angle , can be derived by differentiating:

$$\beta = \sin^{-1}\frac{V}{V_T}.$$

to obtain:

$$\dot{\beta} = \frac{1}{\sqrt{U^2+W^2}}\dot{V} - \left(\frac{1}{\sqrt{U^2+W^2}}\right)\left(\frac{V}{V_T}\right)\dot{V}_T, \tag{4}$$

where $$\dot{V}_T = \frac{1}{V_T}(U\dot{U} + V\dot{V} + W\dot{W}).$$

Substituting dynamics $\dot{U}$, $\dot{V}$, and $\dot{W}$ in equation (4), results in:

$$\dot{\beta} = -\frac{1}{\sqrt{U^2+W^2}}\left(\frac{V}{V_T^2}\right)\left[\frac{F_X}{m}U - QUW + RUV + \frac{F_Y}{m}V - \right. \tag{5}$$

$$\left. RUV + PVW + \frac{F_Z}{m}W - PVW + QUW\right] +$$

$$\frac{1}{\sqrt{U^2+W^2}}\left[\frac{F_Y}{m} + PW - RU\right]$$

$$= \left(\frac{\sqrt{U^2+W^2}}{V_T}\right)\left(\frac{F_Y}{V_Tm}\right) - \left(\frac{U}{\sqrt{U^2+W^2}}\right)\left(\frac{V}{V_T}\right)\left(\frac{F_X}{V_Tm}\right) -$$

$$\frac{V}{V_T}\left(\frac{W}{\sqrt{U^2+W^2}}\right)\left(\frac{F_Z}{V_Tm}\right) - \left(\frac{U}{\sqrt{U^2+W^2}}\right)R +$$

$$\left(\frac{W}{\sqrt{U^2+W^2}}\right)P.$$

Again, using the following relationships between $\beta$ and vehicle velocities:

$$\sin\beta = \frac{V}{V_T}, \cos\beta = \frac{\sqrt{U^2+W^2}}{V_T},$$

and substituting the above relationships into equation (5), results in:

$$\dot{\beta} = \cos\beta\left(\frac{F_Y}{mV_T}\right) - \cos\alpha\sin\beta\left(\frac{F_X}{mV_T}\right) - \tag{6}$$

$$\sin\alpha\sin\beta\left(\frac{F_Z}{mV_T}\right) - R\cos\alpha + P\sin\alpha$$

NOTE: A singularity occurs in equation (3) when side slip angle $|\beta|\cong 90°$ or any multiple of $90°$.

With the above dynamic equations in mind, a rigid body vehicle is governed by the following set of nonlinear dynamic equations of motion:

$$\dot{U} = \frac{F_X}{m} + VR - WQ - g\sin\theta = \frac{F_X}{m} + RV_T\sin\beta - UQ\tan\alpha - g\sin\theta \quad (7)$$

$$\dot{\alpha} = \left(\frac{\cos\alpha}{V_T\cos\beta}\right)\frac{F_Z}{m} + \left(\frac{\sin\alpha}{V_T\cos\beta}\right)\frac{F_X}{m} + Q - P\cos\alpha\tan\beta - R\sin\alpha\tan\beta$$

$$\dot{\beta} = \frac{F_Y}{mV_T}\cos\beta - \frac{F_X}{mV_T}\cos\alpha\sin\beta - \frac{F_Z}{mV_T}\sin\alpha\sin\beta - R\cos\alpha + P\sin\alpha$$

$$\dot{\phi} = P + Q\sin\phi\tan\theta + R\cos\phi\tan\theta$$

$$\dot{\theta} = Q\cos\phi - R\sin\phi$$

$$\dot{\psi} = (Q\sin\phi + R\cos\phi)\sec\theta$$

$$\dot{P} = \frac{1}{I_{xx}}\big[(I_{yy} - I_{zz})QR + I_{xz}(\dot{R} + PQ) + I_{xy}(\dot{Q} - PR) + I_{yz}(Q^2 - R^2) -$$

$$\dot{h}_x - Qh_z + Rh_y + L\big]$$

$$\dot{Q} = \frac{1}{I_{yy}}\big[(I_{zz} - I_{xx})PR + I_{xz}(R^2 - P^2) + I_{xy}(\dot{P} + QR) + I_{yz}(\dot{R} - PQ) -$$

$$\dot{h}_y + Ph_z - Rh_x + M\big]$$

$$\dot{R} = \frac{1}{I_{zz}}\big[(I_{xx} - I_{yy})PQ + I_{xz}(\dot{P} - QR) + I_{xy}(P^2 - Q^2) + I_{yz}(\dot{Q} + PR) -$$

$$\dot{h}_z - Ph_y + Qh_x + N\big]$$

$$h_x = \cos\theta_e\cos\psi_e h_e$$

$$h_y = \cos\theta_e\sin\psi_e h_e$$

$$h_z = -\sin\theta_e h_e$$

$$h_e = I_{LR}\Omega_{LR} + I_{HR}\Omega_{HR}$$

where g is gravity, m is the vehicle mass, ($h_x$, $h_y$, $h_z$) are gyroscopic couplings, $F_X$ defined below is the net force due to engine throttle (thrust-drag) acting along the X-axis of the vehicle, $\theta_e$ and $\psi_e$ are orientation of the vehicle engine with respect to the body axes, $I_{LR}$ and $I_{HR}$ are the low speed rotor and high speed rotor products of inertia respectively and where:

$$M = \bar{q}SD'\left(C_{m_{\delta_q}}(\alpha, \beta, \delta_q) + \frac{D'}{2U}C_{m_q}Q + C_{m0}(\alpha, \beta)\right), \quad (8)$$

$$L = \bar{q}SD\left(C_{l_{\delta_p}}(\alpha, \beta, \delta_p) + C_{l0}(\alpha, \beta) + \frac{D}{2U}[C_{l_p}P + C_{l_r}R]\right),$$

$$N = \bar{q}SD\left(C_{n_{\delta_r}}(\alpha, \beta, \delta_r) + C_{n0}(\alpha, \beta) + \frac{D}{2U}[C_{n_p}P + C_{n_r}R]\right),$$

$$F_X = F_{Thrust} - F_A(\alpha, \beta, \delta) = F_{Thrust} - \frac{\bar{q}S}{mV_T}C_A(\alpha, \beta, \delta),$$

$$F_Z(\alpha, \beta, \delta_q) = F_{Z0}(\alpha, \beta, 0) + F_{Z_{\delta_q}}(\alpha, \beta, \delta_q),$$

$$F_Y(\alpha, \beta, \delta_r) = F_{Y0}(\alpha, \beta, 0) + F_{Y_{\delta_r}}(\alpha, \beta, \delta_r),$$

$$\bar{q} = \frac{1}{2}\rho U^2,$$

$$F_{Z_{\delta_q}}(\alpha, \beta, \delta_q) = \bar{q}SC_{Z_{\delta_q}}(\alpha, \beta, \delta_q),$$

$$F_{Y_{\delta_r}}(\alpha, \beta, \delta_r) = \bar{q}SC_{Y_{\delta_r}}(\alpha, \beta, \delta_r),$$

where D' is the chord, D is the span, and functions $F_{Z0}(\alpha,\beta)$ and $F_{Y0}(\alpha, \beta)$ are given by:

$$F_{Z0}(\alpha,\beta) = \bar{q}SC_{Z0}(\alpha,\beta),$$

$$F_{Y0}(\alpha,\beta) = \bar{q}SC_{Y0}(\alpha,\beta).$$

The shape (curve fit) of functions $C_{Z0}(\alpha,\beta)$, $C_{m0}(\alpha, \beta)$, $C_{n0}(\alpha,\beta)$, $C_{l0}(\alpha,\beta)$, and $C_{Y0}(\alpha, \beta)$ are dependent on a specific vehicle's aerodynamics. Parameter $\alpha$(rad) is angle of attack, $\beta$(rad) is the sideslip angle, $\phi$ is roll angle, P(rad/sec) is body roll rate, Q(rad/sec) is body pitch rate, R(rad/sec) is body yaw rate, U(m/sec) is missile speed, $I_{xx}$, $I_{yy}$, $I_{zz}$, $I_{xz}$ $I_{yz}$ $I_{xy}$ are product of inertia terms, and $\rho$ is air density.

First, decoupling the angular equations of motion in order to facilitate future control design, and solving for the body angular acceleration equations, provides:

$$\dot{P} = \frac{1}{\Delta}[(I_{yz}^2 - I_{yy}I_{zz})(A + L) -$$

$$(I_{xz}I_{yz} + I_{xy}I_{zz})(B + M) - (I_{xz}I_{yy} + I_{xy}I_{yz})(C + N)],$$

$$\dot{R} = \frac{1}{\Delta}[-(I_{xy}I_{yz} + I_{yy}I_{xz})(A + L) - (I_{xx}I_{yz} + I_{xy}I_{xz})(B + M) +$$

$$(I_{xz}^2 - I_{xx}I_{yy})(C + N)],$$

$$\dot{Q} = \frac{1}{\Delta}[-(I_{xy}I_{zz} + I_{xz}I_{yz})(A + L) + (I_{xz}^2 - I_{xx}I_{zz})(B + M) -$$

$$(I_{xx}I_{yz} + I_{xy}I_{xz})(C + N)],$$

where $$\Delta = I_{xx}I_{yz}^2 + I_{yy}I_{xz}^2 + I_{zz}I_{xy}^2 + 2I_{xy}I_{xz}I_{yz} - I_{xx}I_{yy}I_{zz},$$

$$A = (I_{yy} - I_{zz})RQ + I_{xz}PQ - I_{xy}PR + I_{yz}(Q^2 - R^2) - \dot{h}_x - Qh_z Rh_y,$$

$$B = I_{xy}QR + (I_{zz} - I_{xx})PR + I_{xz}(R^2 - P^2) - I_{yz}PQ - \dot{h}_y - Rh_x + P_{hz},$$

$$C = (I_{xx} - I_{yy})PQ - I_{xz}QR + I_{xy}(P^2 - Q^2) + I_{yz}PR - \dot{h}_z + Qh_x - Ph_y.$$

For completeness, the elastic equations of motion associated with missile bending modes are presented. However, the elastic dynamics will not be used in the described nonlinear autopilot design. The elastic dynamic equations are given by:

$$\ddot{q}_i + 2\zeta_i\omega_i\dot{q}_i + \omega_i^2 q_i = \frac{F_i}{\chi_i}, \quad (9)$$

where $$F_i = \int_0^L \sum F_z\varphi_i dl, \quad \chi_i = \int_0^L m\varphi_i^2 dl,$$

where L is the missile length, $w_i$ is the natural frequency of the ith mode, $\xi_i$ is the structural damping factor of the ith mode, $F_z$ are the normal forces, $\phi_i$ are the normalized relative deflections, m is the missile mass, and $q_i$ are the bending/torsional mode generalized coordinate displacement. The above equation description could be rewritten without the integral and divided over location on the missile body.

This nonlinear robust autopilot control design is valid for missile systems (6DOF) with minimum as well as non-minimum phase characteristics. First, the throttle controller design will be presented, then the 5-DOF motion is broken into three separate motions: vertical, horizontal, and roll.

2.3 Throttle Controller

This subsection is important if the vehicle under study has the capability of varying its speed (state U). For this case, one needs to design a static controller that will drive the vehicle's speed to any desired speed via the first equation of dynamics (7). That is, design force $F_X$ (or equivalently a thrust) such that U converges to a desired speed, say $U_{cmd}$. The dynamic equation is $$\dot{U} = \frac{F_X}{m} + RV_T\sin\beta - UQ\tan\alpha - g\sin\theta.$$

Constructing the error model by defining $e = U - U_{cmd}$, results in:

$$\dot{e} = \frac{F_X}{m} + RV_T\sin\beta - UQ\tan\alpha - g\sin\theta - \dot{U}_{cmd}.$$

Since the error should converge to zero asymptotically, set $$\dot{e} = -k_7 e$$

where $k_7 > 0$. Substituting in the above equation, results in the following form for the static controller:

$$F_X = m(-k_7 e + g\sin\theta + UQ\tan\alpha - RV_T\sin\beta + \dot{U}_{cmd})$$

The above force is the force along the body x-axis. One needs to keep in mind that the force should be transformed to some engine thrust with some non-zero mounting angle(s) from the centerline.

2.4 Vertical Channel (2DOF)

First, design a controller that allows angle a to track a desired commanded angle $\alpha_{cmd}$. Later, one can track a commanded acceleration $Az_{md}$ by actually converting $Az_{cmd}$ to an equivalent $\alpha_{cmd}$ by using either the transfer function between the angle and the acceleration command, an equation that relates them, or a table look-up. Vehicle dynamic equations in the pitch plane are governed by:

$$\dot{\alpha} = \left(\frac{\cos\alpha}{V_T\cos\beta}\right)\frac{F_Z}{m} + \left(\frac{\sin\alpha}{V_T\cos\beta}\right)\frac{F_X}{m} + Q - P\cos\alpha\tan\beta - R\sin\alpha\tan\beta \quad (10)$$

$$\dot{Q} = \frac{1}{\Delta}[-(I_{xy}I_{zz} + I_{xz}I_{yz})(A + L) +$$
$$(I_{xz}^2 - I_{xx}I_{zz})(B + M) - (I_{xx}I_{yz} + I_{xy}I_{xz})(C + N)].$$

State transformation:

Since it is desired to track a commanded input angle $\alpha$, a simple linear transformation is needed in order to facilitate this process. The state transform $$z_1 = \alpha - \alpha_{cmd},$$

where $\alpha_{cmd}$ is some desired commanded angle $\alpha$, can be selected. Differentiating provides:

$$\dot{z}_1 = \frac{1}{mV_T\cos\beta}(F_Z\cos\alpha + F_X\sin\alpha) + Q - P\cos\alpha\tan\beta - R\sin\alpha\tan\beta - \dot{\alpha}_{cmd}.$$

As state $z_1$ should converge to zero asymptotically, define new state $z_2$ as follows:

$$z_2 = \dot{z}_1 + k_1 z_1,$$

for some gain $k_1 > 0$. In order to drive $z_1$ to zero, one must make state $z_2$ converge to zero. With this in mind, setting up the differential equation for state $z_2$ provides:

$$\dot{z}_2 = \frac{1}{mV_T\cos\beta}\left[\dot{F}_Z\cos\alpha - F_Z\dot{\alpha}\sin\alpha + \dot{F}_X\sin\alpha + F_X\dot{\alpha}\cos\alpha\right] +$$
$$(F_Z\cos\alpha + F_X\sin\alpha)\left(\frac{\dot{\beta}\sin\beta}{mV_T\cos^2\beta} - \frac{\dot{m}}{m^2V_T\cos\beta} - \frac{\dot{V}_T}{mV_T^2\cos\beta}\right) +$$
$$k_1\left[\frac{1}{mV_T\cos\beta}(F_Z\cos\alpha + F_X\sin\alpha) + Q - P\cos\alpha\tan\beta - R\sin\alpha\tan\beta\right] -$$
$$k_1\dot{\alpha}_{cmd} - \ddot{\alpha}_{cmd} + \dot{Q} + \dot{P}\cos\alpha\tan\beta + P\dot{\alpha}\sin\alpha\tan\beta -$$
$$P\dot{\beta}\cos\alpha\sec^2\beta - \dot{R}\sin\alpha\tan\beta - R\dot{\alpha}\cos\alpha\tan\beta - R\dot{\beta}\sin\alpha\sec^2\beta$$

In order to drive state $Z_2$ to zero asymptotically, a simple choice is to to have
$\dot{z}_2 = -k_2 z_2$, where gain $k_2 > 0$.
Therefore:

$$\frac{1}{mV_T\cos\beta}\left[\dot{F}_Z\cos\alpha - F_Z\dot{\alpha}\sin\alpha + \dot{F}_X\sin\alpha + F_X\dot{\alpha}\cos\alpha\right] - \quad (11)$$
$$(k_1 + k_2)\dot{\alpha}_{cmd} - \ddot{\alpha}_{cmd} +$$
$$(F_Z\cos\alpha + F_X\sin\alpha)\left(\frac{\dot{\beta}\sin\beta}{mV_T\cos^2\beta} - \frac{\dot{m}}{m^2V_T\cos\beta} - \frac{\dot{V}_T}{mV_T^2\cos\beta}\right) +$$
$$(k_1 + k_2)\left[\frac{1}{mV_T\cos\beta}(F_Z\cos\alpha + F_X\sin\alpha) + Q - P\cos\alpha\tan\beta -$$
$$R\sin\alpha\tan\beta\right] + \dot{Q} - \dot{P}\cos\alpha\tan\beta + P\dot{\alpha}\sin\alpha\tan\beta - P\dot{\beta}\cos\alpha\sec^2\beta -$$
$$\dot{R}\sin\alpha\tan\beta - R\dot{\alpha}\cos\alpha\tan\beta - R\dot{\beta}\sin\alpha\sec^2\beta + k_1 k_2 z_1 = 0.$$

Substituting force $F_Z(\alpha, \beta, \delta_q)$ in equation (11) and regouping, obtains:

$$\frac{\cos\alpha}{mV_T\cos\beta}\dot{F}_{Z_{\delta_q}} = -\frac{1}{mV_T\cos\beta}\bigg[(k_1 + k_2)\cos\alpha - \quad (12)$$
$$\dot{\alpha}\sin\alpha + \cos\alpha\left(\dot{\beta}\tan\beta - \frac{\dot{m}}{m} - \frac{\dot{V}_T}{V_T}\right)\bigg]F_{Z_{\delta_q}} -$$
$$\frac{1}{mV_T\cos\beta}\left[\dot{F}_{Z0}\cos\alpha - F_{Z0}\dot{\alpha}\sin\alpha + \dot{F}_X\sin\alpha + F_X\dot{\alpha}\cos\alpha\right] -$$
$$\frac{1}{mV_T\cos\beta}(F_{Z0}\cos\alpha + F_X\sin\alpha)\left(\dot{\beta}\tan\beta - \frac{\dot{m}}{m} - \frac{\dot{V}_T}{V_T}\right) -$$
$$(k_1 + k_2)\left[\frac{1}{mV_T\cos\beta}(F_{Z0}\cos\alpha + F_X\sin\alpha) + Q -$$
$$P\cos\alpha\tan\beta - R\sin\alpha\tan\beta\right] + (k_1 + k_2)\dot{\alpha}_{cmd} +$$
$$\ddot{\alpha}_{cmd} - \dot{Q} + \dot{P}\cos\alpha\tan\beta - k_1 k_2 z_1 + \dot{R}\sin\alpha\tan\beta +$$
$$\sec^2\beta(P\cos\alpha + R\sin\alpha)\dot{\beta} + \tan\beta(R\cos\alpha - P\sin\alpha)\dot{\alpha}.$$

Substitute dynamics $\dot{P}$, $\dot{Q}$, $\dot{R}$, $\dot{\alpha}$, and $\dot{\beta}$ in equation (12) yields:

$$\frac{\cos\alpha}{mV_T\cos\beta}\dot{F}_{Z_{\delta_q}} = \quad (13)$$
$$-\frac{1}{mV_T\cos\beta}\bigg[(k_1 + k_2)\cos\alpha - \bigg\{\left(\frac{\cos\alpha}{V_T\cos\beta}\right)\frac{F_{Z0}}{m} + \left(\frac{\sin\alpha}{V_T\cos\beta}\right)\frac{F_X}{m} +$$
$$Q - P\cos\alpha\tan\beta - R\sin\alpha\tan\beta\bigg\}\sin\alpha +$$
$$\cos\alpha\bigg(\tan\beta\bigg\{\cos\beta\left(\frac{F_Y}{mV_T}\right) - \cos\alpha\sin\beta\left(\frac{F_X}{mV_T}\right) - \sin\alpha\sin\beta$$
$$\left(\frac{F_{Z0}}{mV_T}\right) - R\cos\alpha + P\sin\alpha\bigg\} - \frac{\dot{m}}{m} - \frac{\dot{V}_T}{V_T}\bigg) +$$
$$\cos\alpha\tan\beta(P\sin\alpha - R\cos\alpha) + \frac{\cos\alpha}{mV_T\cos\beta}(F_X\cos\alpha -$$
$$F_{Z0}\sin\alpha)\bigg]F_{Z_{\delta_q}} + \frac{\sin\alpha\cos\alpha}{(mV_T\cos\beta)^2}(\sin^2\beta - 1)F_{Z_{\delta_q}}^2 -$$
$$\frac{1}{mV_T\cos\beta}\bigg[\dot{F}_{Z0}\cos\alpha + (F_X\cos\alpha - F_{Z0}\sin\alpha)\bigg\{\left(\frac{\cos\alpha}{V_T\cos\beta}\right)\frac{F_{Z0}}{m} +$$
$$\left(\frac{\sin\alpha}{V_T\cos\beta}\right)\frac{F_X}{m} + Q - P\cos\alpha\tan\beta - R\sin\alpha\tan\beta\bigg\} +$$
$$\dot{F}_X\sin\alpha\bigg] - \frac{1}{mV_T\cos\beta}(F_{Z0}\cos\alpha + F_X\sin\alpha)$$

-continued $$\left(\tan\beta\left\{\cos\beta\left(\frac{F_Y}{mV_T}\right) - \cos\alpha\sin\beta\times\left(\frac{F_X}{mV_T}\right)\right\} - \right.$$

$$\sin\alpha\sin\beta\left(\frac{F_Z}{mV_T}\right) - R\cos\alpha + P\sin\alpha\right\} - \frac{\dot{m}}{m} - \frac{\dot{V}_T}{V_T}\right) -$$

$$(k_1 + k_2)\left[\frac{1}{mV_T\cos\beta}(F_{Z0}\cos\alpha + F_X\sin\alpha) + Q - \right.$$

$$P\cos\alpha\tan\beta - R\sin\alpha\tan\beta\right] -$$

$$\frac{1}{\Delta}[-(I_{xy}I_{zz} + I_{xz}I_{yz})(A+L) + (I_{xz}^2 - I_{xx}I_{zz})(B+M) -$$

$$(I_{xx}I_{yz} + I_{xy}I_{xz})(C+N)] +$$

$$\frac{1}{\Delta}[(I_{yz}^2 - I_{yy}I_{zz})(A+L) - (I_{xz}I_{yz} + I_{xy}I_{zz})(B+M) -$$

$$(I_{xx}I_{yy} + I_{xy}I_{yz})(C+N)]\cos\alpha\tan\beta -$$

$$\frac{1}{\Delta}[(I_{xy}I_{yz} + I_{yy}I_{xz})(A+L) + (I_{xx}I_{yz} + I_{xy}I_{xz})(B+M) -$$

$$(I_{xz}^2 - I_{xx}I_{yy})(C+N)]\sin\alpha\tan\beta +$$

$$\sec^2\beta(P\cos\alpha + R\sin\alpha)\left\{\frac{F_Y}{mV_T}\cos\beta - \cos\alpha\sin\beta\left(\frac{F_X}{mV_T}\right) - \right.$$

$$\sin\alpha\sin\beta\left(\frac{F_Z}{mV_T}\right) - R\cos\alpha + P\sin\alpha\right\} +$$

$$\tan\beta(R\cos\alpha - P\sin\alpha)\left\{\left(\frac{\cos\alpha}{V_T\cos\beta}\right)\frac{F_{Z0}}{m} + \left(\frac{\sin\alpha}{V_T\cos\beta}\right)\frac{F_X}{m} + \right.$$

$$Q - P\cos\alpha\tan\beta - R\sin\alpha\tan\beta\right\} +$$

$$(k_1 + k_2)\dot{\alpha}_{cmd} + \ddot{\alpha}_{cmd} - k_1k_2z_1.$$

The solution of force controller differential equation (13) is an amount of force acting on a vehicle for a given angle of attack command (or equivalently an acceleration command). This type of controller, according to equation (13), can be applied to air-borne vehicles that use fin control, thrust vector control, thruster control, or other means to control the vehicle. For vehicles using fins as means of control, when designing a linear autopilot controller, one assumes a linear relationship between force and fin deflection described by:

$$F_{Z_{\delta_q}}(\alpha, \beta, \delta_q) \simeq \bar{q}SC_{Z_{\delta_q}}\delta_q,$$

where the force aerodynamic coefficient $$C_{Z_{\delta_q}}$$

is constant and represents the slope of the force aerodynamic in the linear region (pre-stall region). The drawback of using a linearized force aerodynamic coefficient is that the autopilot controller cannot control a vehicle in the post-stall region or even close to the fin stall point. That is why linear autopilot controllers limit the fin deflection displacement to the linear region of operation where the rate of change of force aerodynamic coefficient $$C_{Z_{\delta_q}}$$

is constant for a range of fin deflection values. In the development of the present embodiment, a nonlinear aerodynamic function is utilized representing force $$F_{Z_{\delta_q}}\left(F_{Z_{\delta_q}}(\alpha, \beta, \delta_q) = \bar{q}SC_{Z_{\delta_q}}(\alpha, \beta, \delta_q)\right)$$

for a given mach number. The challenge of using nonlinear function $$F_{Z_{\delta_q}}(\alpha, \beta, \delta_q)$$

is that for a given $$F_{Z_{\delta_q}}(\alpha, \beta, \delta_q)$$

command signal, there exists more than one fin deflection command $\delta_q$. In other words, mapping $$\delta_{q_{cmd}} = \mathcal{F}\left(F_{Z_{\delta_q}}\right)$$

is not one-to-one, i.e., mapping $\mathfrak{I}(\cdot)$ is not a function. The next section discusses a way, according to the present invention, of solving this problem to yield a one-to-one mapping for $\mathfrak{I}(\cdot)$. But, before proceeding with the next section, it is necessary to adjust differential equation (13) so as to have a fin deflection differential equation since an autopilot controller usually outputs fin deflection commands. So using $$F_{Z_{\delta_q}}(\alpha, \beta, \delta_q) = \bar{q}SC_{Z_{\delta_q}}(\alpha, \beta, \delta_q), \tag{14}$$

and calculating the derivative, yields:

$$\dot{F}_{Z_{\delta_q}}(\alpha, \beta, \delta_q) = \dot{\bar{q}}SC_{Z_{\delta_q}}(\alpha, \beta, \delta_q) + \bar{q}S\dot{C}_{Z_{\delta_q}}(\alpha, \beta, \delta_q) \tag{15}$$

$$= \dot{\bar{q}}SC_{Z_{\delta_q}}(\alpha, \beta, \delta_q) + \bar{q}S\left(\frac{\partial}{\partial\alpha}C_{Z_{\delta_q}}(\cdot)\dot{\alpha} + \right.$$

$$\frac{\partial}{\partial\beta}C_{Z_{\delta_q}}(\cdot)\dot{\beta} + \frac{\partial}{\partial\delta_q}C_{Z_{\delta_q}}(\cdot)\dot{\delta}_q\right).$$

Substituting equations (14) and (15) into force differential equation (13) and re-grouping the terms, yields:

$$\frac{\bar{q}S\cos\alpha}{mV_T\cos\beta}C'_{Z_{\delta_q}}\dot{\delta}_q = \tag{16}$$

$$-\frac{\bar{q}S}{mV_T\cos\beta}\left[(k_1+k_2)\cos\alpha - \left\{\left(\frac{\cos\alpha}{V_T\cos\beta}\right)\frac{F_{Z0}}{m} + \left(\frac{\sin\alpha}{V_T\cos\beta}\right)\frac{F_X}{m} + \right.\right.$$

$$Q - P\cos\alpha\tan\beta - R\sin\alpha\tan\beta\right\}\sin\alpha +$$

$$\cos\alpha\left(\tan\beta\times\left\{\frac{F_Y}{mV_T}\cos\beta - \frac{F_X}{mV_T}\cos\alpha\sin\beta - \frac{F_{Z0}}{mV_T}\right.\right.$$

$$\sin\alpha\sin\beta - R\cos\alpha + P\sin\alpha\right\} + \frac{\dot{\bar{q}}}{\bar{q}} - \frac{\dot{m}}{m} - \frac{\dot{V}_T}{V_T}\right) +$$

$$\cos\alpha\tan\beta(P\sin\alpha - R\cos\alpha) + \frac{\bar{q}S\cos^2\alpha}{mV_T\cos\beta}\frac{\partial}{\partial\alpha}C_{Z_{\delta_q}} +$$

$$\frac{\cos\alpha}{mV_T\cos\beta}(F_X\cos\alpha -$$

$$F_{Z0}\sin\alpha)\right]C_{Z_{\delta_q}} - \frac{\bar{q}^2S^2\sin\alpha\cos\alpha}{(mV_T)^2}C^2_{Z_{\delta_q}} -$$

-continued $$\frac{1}{mV_T\cos\beta}\left[\dot{F}_{Z0}\cos\alpha + \left(\bar{q}S\cos\alpha\frac{\partial}{\partial\alpha}C_{Z_{\delta_q}} + F_X\cos\alpha - F_{Z0}\sin\alpha\right)\right.$$

$$\left\{\left(\frac{\cos\alpha}{V_T\cos\beta}\right)\frac{F_{Z0}}{m} + \left(\frac{\sin\alpha}{V_T\cos\beta}\right)\frac{F_X}{m} + Q - \right.$$

$$\left.P\cos\alpha\tan\beta - R\sin\alpha\tan\beta\right\} + \dot{F}_X\sin\alpha\right] -$$

$$\frac{1}{mV_T\cos\beta}\left(F_{Z0}\cos\alpha + F_X\sin\alpha + \bar{q}S\cos\alpha\cot\beta\frac{\partial}{\partial\beta}C_{Z_{\delta_q}}\right)\times$$

$$\left(\tan\beta\left\{\frac{F_Y}{mV_T}\cos\beta - \frac{F_X}{mV_T}\cos\alpha\sin\beta - \right.\right.$$

$$\left.\left.\frac{F_Z}{mV_T}\sin\alpha\sin\beta - R\cos\alpha + P\sin\alpha\right\} - \frac{\dot{m}}{m} - \frac{\dot{V}_T}{V_T}\right) -$$

$$(k_1 + k_2)\left[\frac{1}{mV_T\cos\beta}(F_{Z0}\cos\alpha + F_X\sin\alpha) + Q - \right.$$

$$\left.P\cos\alpha\tan\beta - R\sin\alpha\tan\beta\right] -$$

$$\frac{1}{\Delta}[-(I_{xy}I_{zz} + I_{xz}I_{yz})(A + L) + (I_{xz}^2 - I_{xx}I_{zz})(B + M) -$$

$$(I_{xx}I_{yz} + I_{xy}I_{xz})(C + N)] +$$

$$\frac{1}{\Delta}[(I_{yz}^2 - I_{yy}I_{zz}) \times (A + L) - (I_{xz}I_{yz} + I_{xy}I_{zz})(B + M) -$$

$$(I_{xx}I_{yy} + I_{xy}I_{yz})(C + N)]\cos\alpha\tan\beta -$$

$$\frac{1}{\Delta}[(I_{xy}I_{yz} + I_{yy}I_{xz})(A + L) + (I_{xx}I_{yz} + I_{xy}I_{xz})(B + M) -$$

$$(I_{xz}^2 - I_{xx}I_{yy})(C + N)]\sin\alpha\tan\beta +$$

$$\sec^2\beta(P\cos\alpha + R\sin\alpha) \times \left\{\cos\beta\left(\frac{F_Y}{mV_T}\right) - \cos\alpha\sin\beta\left(\frac{F_X}{mV_T}\right) - \right.$$

$$\left.\sin\alpha\sin\beta\left(\frac{F_Z}{mV_T}\right) - R\cos\alpha + P\sin\alpha\right\} +$$

$$\tan\beta(R\cos\alpha - P\sin\alpha)\left\{\left(\frac{\cos\alpha}{V_T\cos\beta}\right)\frac{F_{Z0}}{m} + \left(\frac{\sin\alpha}{V_T\cos\beta}\right)\frac{F_X}{m} + \right.$$

$$\left.Q - P\cos\alpha\tan\beta - R\sin\alpha\tan\beta\right\} +$$

$$(k_1 + k_2)\dot{\alpha}_{cmd} + \ddot{\alpha}_{cmd} - k_1 k_2 z_1,$$

where $C'_{Z_{\delta_q}}(\alpha,\beta,\delta_q) \equiv \frac{\partial}{\partial\delta_q}C_{Z_{\delta_q}}(\alpha,\beta,\delta_q).$

2.4.1 Slope-Intercept design format

There are many methods of obtaining a one-to-one mapping for fin aerodynamic function $$C_{Z_{\delta_q}}(\alpha,\beta,\delta_q).$$

One method of obtaining a one-to-one mapping is by applying different types of transformations to the force aerodynamic coefficient function $$\left(C_{Z_{\delta_q}}\right)$$

in order to transform the mapping function $\Im(\cdot)$ into a one-to-one mapping. Another method is to convert $$C_{Z_{\delta_q}}(\alpha,\beta,\delta_q)$$

function into a "slope" function and an "intercept" function. This method resolves the aerodynamic function as follows:

$$C_{Z_{\delta_q}}(\alpha,\beta,\delta_q) = \frac{\partial}{\partial\delta_q}C_{Z_{\delta_q}}(\alpha,\beta,\delta_q)\delta_q + \underline{C}_{Z_{\delta_q}}(\alpha,\beta,\delta_q), \text{ or} \quad (17)$$

$$C_{Z_{\delta_q}}(\alpha,\beta,\delta_q) = C'_{Z_{\delta_q}}(\alpha,\beta,\delta_q) + \underline{C}_{Z_{\delta_q}}(\alpha,\beta,\delta_q),$$

where $$\underline{C}_{Z_{\delta_q}}(\alpha,\beta,\delta_q)$$

denotes the "intercept" of $$C_{Z_{\delta_q}}(\alpha,\beta,\delta_q).$$

Thus, with this in mind, equation (16) becomes:

$$\frac{\bar{q}S\cos\alpha}{mV_T\cos\beta}C'_{Z_{\delta_q}}\delta_q = \quad (18)$$

$$-\frac{\bar{q}S}{mV_T\cos\beta}\left[(k_1+k_2)\cos\alpha - \left\{\left(\frac{\cos\alpha}{V_T\cos\beta}\right)\frac{F_{Z0}}{m} + \left(\frac{\sin\alpha}{V_T\cos\beta}\right)\frac{F_X}{m} + \right.\right.$$

$$\left.Q - P\cos\alpha\tan\beta - R\sin\alpha\tan\beta\right\}\sin\alpha +$$

$$\cos\alpha\left(\tan\beta\left\{\cos\beta\left(\frac{F_Y}{mV_T}\right) - \cos\alpha\sin\beta\left(\frac{F_X}{mV_T}\right) - \sin\alpha\sin\beta\left(\frac{F_{Z0}}{mV_T}\right) - \right.\right.$$

$$\left.\left.R\cos\alpha + P\sin\alpha\right\} + \frac{\dot{\bar{q}}}{\bar{q}} - \frac{\dot{m}}{m} - \frac{\dot{V}_T}{V_T}\right) +$$

$$\cos\alpha\tan\beta(P\sin\alpha - R\cos\alpha) + \frac{\bar{q}S\cos^2\alpha}{mV_T\cos\beta}\frac{\partial}{\partial\alpha}C_{Z_{\delta_q}} +$$

$$\left.\frac{\cos\alpha}{mV_T\cos\beta}(F_X\cos\alpha - F_{Z0}\sin\alpha)\right]$$

$$\left(C'_{Z_{\delta_q}}(\alpha,\beta,\delta_q)\delta_q + \underline{C}_{Z_{\delta_q}}(\alpha,\beta,\delta_q)\right) -$$

$$\frac{\bar{q}^2 S^2 \sin\alpha\cos\alpha}{(mV_T)^2}C^2_{Z_{\delta_q}} -$$

$$\frac{1}{mV_T\cos\beta}\left[\dot{F}_{Z0}\cos\alpha + \left(\bar{q}S\cos\alpha\frac{\partial}{\partial\alpha}C_{Z_{\delta_q}} + F_X\cos\alpha - F_{Z0}\sin\alpha\right)\right.$$

$$\left\{\left(\frac{\cos\alpha}{V_T\cos\beta}\right)\frac{F_{Z0}}{m} + \left(\frac{\sin\alpha}{V_T\cos\beta}\right)\frac{F_X}{m} + Q - \right.$$

$$\left.P\cos\alpha\tan\beta - R\sin\alpha\tan\beta\right\} + \dot{F}_X\sin\alpha\right] -$$

$$\frac{1}{mV_T\cos\beta}\left(F_{Z0}\cos\alpha + F_X\sin\alpha + \bar{q}S\cos\alpha\cot\beta\frac{\partial}{\partial\beta}C_{Z_{\delta_q}}\right)$$

$$\left(\tan\beta\left\{\frac{F_Y}{mV_T}\cos\beta - \frac{F_X}{mV_T}\cos\alpha\sin\beta - \frac{F_Z}{mV_T}\sin\alpha\sin\beta - \right.\right.$$

$$\left.\left.R\cos\alpha + P\sin\alpha\right\} - \frac{\dot{m}}{m} - \frac{\dot{V}_T}{V_T}\right) -$$

$$(k_1+k_2) \times \left[\frac{1}{mV_T\cos\beta}(F_{Z0}\cos\alpha + F_X\sin\alpha) + Q - \right.$$

$$\left.P\cos\alpha\tan\beta - R\sin\alpha\tan\beta\right] -$$

$$\frac{1}{\Delta}[-(I_{xy}I_{zz} + I_{xz}I_{yz})(A+L) + (I_{xz}^2 - I_{xx}I_{zz})(B+M) -$$

$$(I_{xx}I_{yz} + I_{xy}I_{xz})(C+N)] +$$

$$\frac{1}{\Delta}[(I_{yz}^2 - I_{yy}I_{zz})(A+L) - (I_{xz}I_{yz} + I_{xy}I_{xz})(B+M) -$$

$$(I_{xz}I_{yy} + I_{xy}I_{xz})(C+N)]\cos\alpha\tan\beta -$$

$$\frac{1}{\Delta}[(I_{xy}I_{yz}+I_{yy}I_{xz})(A+L)+(I_{xx}I_{yz}+I_{xy}I_{xz})(B+M)-$$
$$(I_{xz}^2-I_{xx}I_{yy})(C+N)]\sin\alpha\tan\beta+$$
$$\sec^2\beta(P\cos\alpha+R\sin\alpha)\times\left\{\frac{F_Y}{mV_T}\cos\beta-\frac{F_X}{mV_T}\cos\alpha\sin\beta-\right.$$
$$\left.\frac{F_Z}{mV_T}\sin\alpha\sin\beta-R\cos\alpha+P\sin\alpha\right\}+$$
$$\tan\beta(R\cos\alpha-P\sin\alpha)\left\{\left(\frac{\cos\alpha}{V_T\cos\beta}\right)\frac{F_{Z0}}{m}+\left(\frac{\sin\alpha}{V_T\cos\beta}\right)\frac{F_X}{m}+\right.$$
$$\left.Q-P\cos\alpha\tan\beta-R\sin\alpha\tan\beta\right\}+$$
$$(k_1+k_2)\dot\alpha_{cmd}+\ddot\alpha_{cmd}-k_1k_2z_1,$$

It is worth noting that the above differential equation works well when $$C'_{Z_{\delta_q}}$$

is away from zero. However, as a vehicle approaches the stall condition, i.e., $$C'_{Z_{\delta_q}}\simeq 0,$$

it causes a singularity in equation (18) which leads to a problem in obtaining the differential equation solution for $\delta_q$. A solution to this problem is to neglect all of the terms in (18) that are multiplied by $$C'_{Z_{\delta_q}}.$$

Therefore, from moment equation M in (8), rewriting $$C_{m_{\delta_q}}(\alpha,\beta,\delta_q)=C'_{m_{\delta_q}}(\alpha,\beta,\delta_q)\delta_q+\underline{C}_{m_{\delta_q}}(\alpha,\beta,\delta_q), \quad (19)$$

where $$C'_{m_{\delta_q}}(\alpha,\beta,\delta_q)$$

is the slope function of $$C_{m_{\delta_q}}(\alpha,\beta,\delta_q) \text{ and } \underline{C}_{m_{\delta_q}}(\alpha,\beta,\delta_q)$$

is the $$C_{m_{\delta_q}}(\alpha,\beta,\delta_q)$$

intercept function; and solving for $\delta_q$; the form of an analytical solution controller (closed form solution) for $$C'_{Z_{\delta_q}}\simeq 0$$

is given by:

$$\Omega\delta_q = \quad (20)$$
$$-\frac{\bar{q}S}{mV_T\cos\beta}\left[(k_1+k_2)\cos\alpha-\left\{\left(\frac{\cos\alpha}{V_T\cos\beta}\right)\frac{F_{Z0}}{m}+\left(\frac{\sin\alpha}{V_T\cos\beta}\right)\frac{F_X}{m}+Q-\right.\right.$$
$$\left.P\cos\alpha\tan\beta-R\sin\alpha\tan\beta\right\}\sin\alpha+$$
$$\cos\alpha\left(\tan\beta\left\{\frac{F_Y}{mV_T}\cos\beta-\frac{F_X}{mV_T}\cos\alpha\sin\beta-\frac{F_{Z0}}{mV_T}\sin\alpha\sin\beta-\right.\right.$$
$$\left.\left.R\cos\alpha+P\sin\alpha\right\}+\frac{\dot{\bar{q}}}{\bar{q}}-\frac{\dot m}{m}-\frac{\dot V_T}{V_T}\right)+$$
$$\cos\alpha\tan\beta(P\sin\alpha-R\cos\alpha)+\frac{\bar{q}S\cos^2\alpha}{mV_T\cos\beta}\frac{\partial}{\partial\alpha}C_{Z_{\delta_q}}+$$
$$\frac{\cos\alpha}{mV_T\cos\beta}(F_X\cos\alpha-F_{Z0}\sin\alpha)\bigg]$$
$$C_{Z_{\delta_q}}(\alpha,\beta,\delta_q)-\frac{\bar{q}^2S^2\sin\alpha\cos\alpha}{(mV_T)^2}$$
$$\bar{C}_{Z_{\delta_q}}^2 -$$
$$\frac{1}{mV_T\cos\beta}\times\left[F_{Z0}\cos\alpha+\left(\bar{q}S\cos\alpha\frac{\partial}{\partial\alpha}C_{Z_{\delta_q}}+\right.\right.$$
$$F_X\cos\alpha-F_{Z0}\sin\alpha\bigg)\times\left\{\left(\frac{\cos\alpha}{V_T\cos\beta}\right)\frac{F_{Z0}}{m}+\left(\frac{\sin\alpha}{V_T\cos\beta}\right)\frac{F_X}{m}+Q-\right.$$
$$\left.P\cos\alpha\tan\beta-R\sin\alpha\tan\beta\right\}+F_X\sin\alpha\bigg]-$$
$$\frac{1}{mV_T\cos\beta}\bigg(F_{Z0}\cos\alpha+F_X\sin\alpha+\bar{q}S\cos\alpha\cot\beta\frac{\partial}{\partial\beta}C_{Z_{\delta_q}}\bigg)\times$$
$$\left(\tan\beta\left\{\cos\beta\left(\frac{F_Y}{mV_T}\right)-\cos\alpha\sin\beta\left(\frac{F_X}{mV_T}\right)-\right.\right.$$
$$\left.\sin\alpha\sin\beta\left(\frac{F_Z}{mV_T}\right)-R\cos\alpha+P\sin\alpha\right\}-\frac{\dot m}{m}-$$
$$\frac{\dot V_T}{V_T}\bigg)-(k_1+k_2)\left[\frac{1}{mV_T\cos\beta}(F_{Z0}\cos\alpha+F_X\sin\alpha)+\right.$$
$$\left.Q-P\cos\alpha\tan\beta-R\sin\alpha\tan\beta\right]-$$
$$\frac{1}{\Delta}[-(I_{xy}I_{zz}+I_{xz}I_{yz})(A+L)+(I_{xz}^2-I_{xx}I_{zz})(B+M_1)-$$
$$(I_{xx}I_{yz}+I_{xy}I_{xz})(C+N)]+$$
$$\frac{1}{\Delta}[(I_{yz}^2-I_{yy}I_{zz})\times(A+L)-(I_{xz}I_{yz}+I_{xy}I_{zz})(B+M_1)-$$
$$(I_{xz}I_{yy}+I_{xy}I_{yz})(C+N)]\cos\alpha\tan\beta-$$
$$\frac{1}{\Delta}[(I_{xy}I_{yz}+I_{yy}I_{xz})(A+L)+(I_{xx}I_{yz}+I_{xy}I_{xz})(B+M_1)-$$
$$(I_{xz}^2-I_{xx}I_{yy})(C+N)]\sin\alpha\tan\beta+$$
$$\sec^2\beta(P\cos\alpha+R\sin\alpha)\times\left\{\frac{F_Y}{mV_T}\cos\beta-\frac{F_X}{mV_T}\cos\alpha\sin\beta-\right.$$
$$\left.\frac{F_Z}{mV_T}\sin\alpha\sin\beta-R\cos\alpha+P\sin\alpha\right\}+$$
$$\tan\beta(R\cos\alpha-P\sin\alpha)\left\{\left(\frac{\cos\alpha}{V_T\cos\beta}\right)\frac{F_{Z0}}{m}+\left(\frac{\sin\alpha}{V_T\cos\beta}\right)\frac{F_X}{m}+Q-\right.$$
$$\left.P\cos\alpha\tan\beta-R\sin\alpha\tan\beta\right\}+(k_1+k_2)\dot\alpha_{cmd}+\ddot\alpha_{cmd}-k_1k_2z_1,$$

where $$\Omega=\frac{\bar{q}SD'}{\Delta}\{(I_{xx}I_{yz}+I_{xy}I_{xz})\sin\alpha\tan\beta+(I_{xz}I_{yz}+I_{xy}I_{zz})\cos\alpha\tan\beta+$$
$$I_{xz}^2-I_{xx}I_{zz}\}C'_{Z_{\delta_q}},$$

-continued $$M_1 = \bar{q}SD'\left(\frac{D'}{2U}C_{m_q}Q + \underline{C}_{m_{\delta_q}}(\alpha, \beta, \delta_q) + C_{m0}(\alpha, \beta)\right).$$

It is necessary to keep in mind that the above analytical solution (static) controller is singular as $$C'_{m_{\delta_q}}$$

approaches zero. Thus, the present invention addresses a need for a mixing algorithm that switches between the static controller of equation (20) and dynamic controller of equation (18) to avoid any control singularity.

The static controller of equation (20) can be substituted for the dynamic controller of equation (18) not only close to fin stall condition $$\left(C'_{Z_{\delta_q}} \simeq 0\right),$$

but for all times if the following holds:

Extracting a $\delta_q$ term from moment equation (8) M in the last line of equation (18) and combining it with the damping term ([·]$\delta_q$) in equation (18), yields the following dynamic controller damping term:

$$\left(\frac{\bar{q}S}{mV_T\cos\beta}\right) \quad (21)$$

$$\bar{C}^2_{Z_{\delta_q}}(\alpha, \beta, \delta_q)\left[(k_1 + k_2)\cos\alpha - \left\{\left(\frac{\cos\alpha}{V_T\cos\beta}\right)\frac{F_{Z0}}{m} + \left(\frac{\sin\alpha}{V_T\cos\beta}\right)\frac{F_X}{m} + \right.\right.$$

$$Q - P\cos\alpha\tan\beta - R\sin\alpha\tan\beta\}\sin\alpha +$$

$$\cos\alpha\left(\tan\beta\left\{\frac{F_Y}{mV_T}\cos\beta - \frac{F_X}{mV_T}\cos\alpha\sin\beta - \frac{F_{Z0}}{mV_T}\sin\alpha\sin\beta - \right.\right.$$

$$R\cos\alpha + P\sin\alpha\} + \frac{\dot{\bar{q}}}{\bar{q}} - \frac{\dot{m}}{m} - \frac{\dot{V}_T}{V_T}\right) +$$

$$\cos\alpha\tan\beta(P\sin\alpha - R\cos\alpha) + \frac{\bar{q}S\cos^2\alpha}{mV_T\cos\beta}\frac{\partial}{\partial\alpha}C_{Z_{\delta_q}} +$$

$$\frac{\cos\alpha}{mV_T\cos\beta}(F_X\cos\alpha - F_{Z0}\sin\alpha) +$$

$$\frac{mD'V_T\cos\beta}{\Delta}\{(I_{xx}I_{yz} + I_{xy}I_{xz})\times(\sin\alpha\tan\beta) +$$

$$(I_{xz}I_{yz} + I_{xy}I_{zz})\cos\alpha\tan\beta + I^2_{xz} - I_{xx}I_{zz}\}\frac{C'_{m_{\delta_q}}}{C'_{Z_{\delta_q}}}\right].$$

If the damping term is large, then the transient response of dynamic controller (18) is very fast and thus can be neglected in an application scenario. In other words, the dynamic controller (18) will reach its steady state value fast (within a few step samples). Assuming that the inertia cross products are neglegible, i.e., $I_{xy}=I_{yz}=I_{xz}\simeq 0$, then it can be shown that the dominant term in equation (21) is $$\frac{mD'V_T\cos\beta}{I_{yy}}\frac{C'_{m_{\delta_q}}(\alpha, \beta, \delta_q)}{C'_{Z_{\delta_q}}(\alpha, \beta, \delta_q)},$$

because of the large magnitude of ratio $$\frac{mD'V_T\cos\beta}{I_{yy}}.$$

This term is equivalent to a "fin moment arm" term. Therefore, the damping term magnitude is directly proportional to the fin moment arm of a vehicle. That is, the larger the fin moment arm of the vehicle, the larger the damping term. Thus one could use the static controller presented in equation (20) in lieu of the dynamic controller described in equation (18) when the damping term is sufficiently large and can be removed.

Relationship between Fin Aerodynamic Coefficients

Usually, a designer is given the fin aerodynamics with respect to $\alpha$, $\beta$, and $\delta_3$ (one of the vehicle fins) and not $\delta_q$ directly. Therefore, one needs to relate equation (17) to an equation that is a function of the seperate fins ($\delta_i$ for a vehicle with i number of fins). In other words, if the fin aerodynamic database has function $$C_{N_{\delta_3}}(\alpha, \beta, \delta_3),$$

then:

$$C_{N_{\delta_3}}(\alpha, \beta, \delta_3) = C'_{N_{\delta_3}}(\alpha, \beta, \delta_3)\delta_3 + \underline{C}_{N_{\delta_q}}(\alpha, \beta, \delta_3),$$

and since $$C_{Z_{\delta_q}}(\alpha, \beta, \delta_q) = -C_{N_{\delta_3}}(\alpha, \beta, \delta_q) = -2C_{N_{\delta_3}}(\alpha, \beta, \delta_3),$$

assuming that $\delta_3 = -\delta_1$ (which corresponds to a particular vehicle configuration).

Yields:

$$C_{Z_{\delta_q}}(\alpha, \beta, \delta_q) = -2\left[C'_{N_{\delta_3}}(\alpha, \beta, \delta_3)\delta_3 + \underline{C}_{N_{\delta_3}}(\alpha, \beta, \delta_3)\right]$$

$$= (-2\delta_3)C'_{N_{\delta_3}}(\alpha, \beta, \delta_3) - 2\underline{C}_{N_{\delta_3}}(\alpha, \beta, \delta_3)$$

$$= C'_{N_{\delta_3}}(\alpha, \beta, \delta_3)\delta_q + \underline{C}_{Z_{\delta_q}}(\alpha, \beta, \delta_3).$$

The pitching moment relationship follows similarly. That is;

$$C_{m_{\delta_q}}(\alpha, \beta, \delta_3) = 2C_{m_{\delta_3}}(\alpha, \beta, \delta_3)$$

$$= 2\left[C'_{m_{\delta_3}}(\alpha, \beta, \delta_3)\delta_3 + \underline{C}_{m_{\delta_3}}(\alpha, \beta, \delta_3)\right]$$

$$= -C'_{m_{\delta_3}}(\alpha, \beta, \delta_3)\delta_q + \underline{C}_{m_{\delta_3}}(\alpha, \beta, \delta_3).$$

The controllers of equation (18) and equation (20) assume perfect state feedback $\alpha$. Since state a is not directly measurable, $\alpha$ as a feedback signal can be estimated using the following estimation algorithms:

1. Measure angle of attack $\alpha$ using $$\hat{\alpha} = \int\left(A_{ZB}/V_T + \frac{\partial F_x}{mV_T} + Q - P\hat{\beta} + g\cos\theta\cos\phi/V_T\right)dt, \quad (22)$$

where $A_{ZB}$ is the vertical body acceleration which is measurable via accelerometer, U is measured using a speed transducer, and P and Q are measurable via gyros. Euler angles $\phi$ and $\theta$ are updated via quaternions and side slip angle $\beta$ will be measured similar to $\hat{\alpha}$.

2. Estimate angle of attack $\alpha$ using $$\hat{\alpha} = \tan^{-1}\left(\frac{W}{U}\right).$$

2.4.2 Tracking a Vertical Acceleration Command: $Az_{cmd}$

In this case, an extra step is needed in order to convert a given acceleration command $Az_{cmd}$ to an equivalent angle $\alpha_{cmd}$. Once variable $\alpha_{cmd}$, is obtained the above control design technique can be utilized for tracking an $Az_{cmd}$. There are two ways of converting an $AZ_{cmd}$ to an $\alpha_{cmd}$. One way is to build a nonlinear equation that relates $Az_{cmd}$ to an $\alpha_{cmd}$. Second, one can use a linearized transfer function given by:

$$\frac{\alpha(deg)}{N_z(g's)}(s) = \frac{\alpha}{\delta_q}(s)\frac{\delta_q}{N_z}(s), \text{ where}$$

$$\frac{\alpha}{\delta_q}(s) = \frac{-Z_{\delta_q}s - Z_{\delta_q}(M_{\dot{\theta}} + M_{\dot{\alpha}}) + M_{\delta_q}U + M_{\dot{\alpha}}Z_{\delta_q}}{Us^2 + [Z_\alpha + U(M_{\dot{\alpha}} + M_{\dot{\theta}})]s + M_\alpha U + M_{\dot{\theta}}Z_\alpha},$$

$$\frac{\delta_q}{N_z}(s) = 32.2 \frac{Us^2 + [Z_\alpha + U(M_{\dot{\alpha}} + M_{\dot{\theta}})]s + M_\alpha U + M_{\dot{\theta}}Z_\alpha}{U[Z_{\delta_q}s^2 + Z_{\delta_q}(M_{\dot{\alpha}} + M_{\dot{\theta}})s + M_{\delta_q}Z_\alpha + M_\alpha Z_{\delta_q}]}.$$

As a result, the transfer function relating angle $\alpha$ to acceleration $N_z$ is given by:

$$\frac{\alpha(deg)}{N_z(g's)}(s) = -32.2 \frac{Z_{\delta_q}s + Z_{\delta_q}(M_{\dot{\theta}} + M_{\dot{\alpha}}) - M_{\delta_q}U - M_{\dot{\alpha}}Z_{\delta_q}}{U[Z_{\delta_q}s^2 + Z_{\delta_q}(M_{\dot{\alpha}} + M_{\dot{\theta}})s + M_{\delta_q}Z_\alpha + M_\alpha Z_{\delta_q}]}.$$

The coefficients of the above transfer function are defined to be:

$$Z_\alpha = \frac{\bar{q}S}{m}C_{N_\alpha}, \quad Z_{\delta_q} = \frac{\bar{q}S}{m}C_{N_{\delta_q}},$$

$$M_\alpha = \frac{\bar{q}SD}{I_{yy}}C_{M_\alpha}, \quad M_{\delta_q} = \frac{\bar{q}SD}{I_{yy}}C_{M_{\delta_q}},$$

$$M_{\dot{\alpha}} = \frac{\bar{q}SD^2}{2UI_{yy}}C_{M_{\dot{\alpha}}}, \quad M_{\dot{\theta}} = \frac{\bar{q}SD^2}{2UI_{yy}}C_{M_{\dot{\theta}}}.$$

The choice of a nonlinear equation versus a transfer function depends on memory size versus processing speed.

In the case where $\alpha_{cmd}$ is calculated using the transfer function approach, a Low Pass Filter can be added in order to help in attenuating high frequency components of the commanded input angle alpha $\alpha_{cmd}$, i.e., smooth out the transient response. The addition of the filter aids in reaching a steady state response $\alpha$ faster, which is desired, since the objective is to convert an $Az_{cmd}$ to some constant (steady state) $\alpha_{cmd}$.

If one needs to track a "square wave type" $\alpha_{cmd}$, where the signal changes value, it is desirable to modify gains $k_1$ and $k_2$ by adding a term that is proportional to signal $\dot{\alpha}_{cmd}$ as follows:

$$k_1 = 10 - 45|\sin(\dot{\alpha}_{cmd}/57.3)|,$$

$$k_2 = 10 - 45|\sin(\dot{\alpha}_{cmd}/57.3)|.$$

The advantage of such a choice for gains $k_1$ and $k_2$ is a reduction in the percentage overshoot of state $\alpha$. The choice of control gains (values 10 and 45) depends on the requirements for the vehicle's performance and there is always a trade-off between fast error convergence and percentage overshoot.

In case signal $\alpha_{cmd}$ is noisy/delayed, one approach is to use the error signal in order to modify the control gains and avoid large signal overshoot. This can be accomplished as follows, let $e = \hat{\alpha} - \alpha_{cmd}$ where $\hat{\alpha}$ is the measured state and could be distorted, then choose the modified gains to be of the form:

$$k_1 = K_1 - c_1|e|,$$

$$k_2 = K_2 - c_2|e|,$$

where $K_i$ are the usual constant gains and nonlinear functions $c_i > 0$ are chosen by the designer in order to yield a "suboptimal" and critical damping trajectory tracking performance. That is, depending on the vehicle dynamics, one should adjust functions $c_i$ to obtain desired system performance: overshoot versus settling time. The larger the $c_i$'s, the smaller the overshoot, but the longer the settling time. It is a trade-off that the designer must be aware of.

2.5 Horizontal Channel

Continuing with the control design in which sideslip angle $\beta$ tracks a desired commanded angle $\beta_{cmd}$, similar to the above discussion, one can demonstrate that one can track a commanded acceleration $Ay_{cmd}$.

Vehicle dynamic equations in the horizontal plane are governed by:

$$\dot{\beta} = \frac{F_Y}{mV_T}\cos\beta - \frac{F_X}{mV_T}\cos\alpha\sin\beta - \frac{F_Z}{mV_T}\sin\alpha\sin\beta - \quad (23)$$

$$R\cos\alpha + P\sin\alpha$$

$$\dot{R} = \frac{1}{\Delta}[-(I_{xy}I_{yz} + I_{yy}I_{xz})(A + L) - (I_{xx}I_{yz} + I_{xy}I_{xz})(B + M) + (I_{xz}^2 - I_{xx}I_{zyy})(C + N)],$$

When it is desired to track a commanded input angle $\beta$, a simple linear transformation is needed in order to facilitate this process. Select the state transform $$z_3 = \beta - \beta_{cmd},$$

where $\beta_{cmd}$ is some desired commanded sideslip angle. Differentiating, yields:

$$\dot{z}_3 = \frac{F_Y}{mV_T}\cos\beta - \frac{F_X}{mV_T}\cos\alpha\sin\beta - \frac{F_Z}{mV_T}\sin\alpha\sin\beta -$$

$$R\cos\alpha + P\sin\alpha - \dot{\beta}_{cmd}.$$

State $z_3$ should converge to zero asymptotically. Thus define new state $z_4$ as follows:

$$z_4 = \dot{z}_3 + k_3 z_3,$$

for some control gain $k_3 > 0$. In order to drive $z_3$ to zero, one must make state $z_4$ converge to zero. Differentiating the above equation yields:

$$\dot{z}_4 = \left(R\sin\alpha + P\cos\alpha + \sin\alpha\sin\beta\left[\frac{F_X}{mV_T}\right] - \quad (24)\right.$$

$$\cos\alpha\sin\beta\left[\frac{F_Z}{mV_T}\right]\dot{\alpha} + \left(k_3 - \sin\beta\left[\frac{F_Y}{mV_T}\right] - \right.$$

$$\left.\cos\alpha\cos\beta\left[\frac{F_X}{mV_T}\right] - \sin\alpha\cos\beta\left[\frac{F_Z}{mV_T}\right]\right)\dot{\beta} +$$

$$(F_X\cos\alpha\sin\beta - F_Y\cos\beta + F_Z\sin\alpha\sin\beta)\left(\frac{\dot{m}}{m^2} + \frac{\dot{V}_T}{V_T^2}\right) +$$

-continued
$$\dot{P}\sin\alpha - \dot{R}\cos\alpha - \frac{1}{mV_T}(\dot{F}_X\cos\alpha\sin\beta - \dot{F}_Y\cos\beta +$$
$$\dot{F}_Z\sin\alpha\sin\beta) - \dot{\beta}_{cmd} - k_3\beta_{cmd}$$

In order to drive state $z_4$ to zero asymptotically, a simple choice is to to have $$\dot{z}_4 = -k_4 z_4, \text{ where gain } k_4 > 0.$$

Therefore:

$$\left(R\sin\alpha + P\cos\alpha + \sin\alpha\sin\beta\left[\frac{F_X}{mV_T}\right] - \cos\alpha\sin\beta\left[\frac{F_Z}{mV_T}\right]\right)\dot{\alpha} + \quad (25)$$

$$\left(k_3 + k_4 - \sin\beta\left[\frac{F_Y}{mV_T}\right] - \cos\alpha\cos\beta\left[\frac{F_X}{mV_T}\right] - \sin\alpha\cos\beta\left[\frac{F_Z}{mV_T}\right]\right)\dot{\beta} +$$

$$(F_X\cos\alpha\sin\beta - F_Y\cos\beta + F_Z\sin\alpha\sin\beta)\left(\frac{\dot{m}}{m^2} + \frac{\dot{V}_T}{V_T^2}\right) + \dot{P}\sin\alpha -$$

$$\dot{R}\cos\alpha - \frac{1}{mV_T}(\dot{F}_X\cos\alpha\sin\beta - \dot{F}_Y\cos\beta + \dot{F}_Z\sin\alpha\sin\beta) +$$

$$k_3 k_4 z_3 - (k_3 + k_4)\dot{\beta}_{cmd} - \ddot{\beta}_{cmd} = 0.$$

Substituting dynamics $\dot{\alpha}$, $\dot{\beta}$, $\dot{P}$, and $\dot{R}$ into equation (25) and regrouping yields:

$$\frac{\cos\beta}{mV_T}\dot{F}_Y = -\frac{1}{mV_T}\Bigg((k_3 + k_4)\cos\beta + (R\cos\alpha - P\sin\alpha)\sin\beta - \quad (26)$$

$$\cos(2\beta)\left\{\cos\alpha\left[\frac{F_X}{mV_T}\right] + \sin\alpha\left[\frac{F_Z}{mV_T}\right]\right\} - \cos\beta\left(\frac{\dot{m}}{m^2} + \frac{\dot{V}_T}{V_T^2}\right)F_Y +$$

$$\frac{\cos\beta\sin\beta}{(mV_T)^2}F_Y^2 + \left(k_3 + k_4 - \cos\alpha\cos\beta\left[\frac{F_X}{mV_T}\right] - \sin\alpha\cos\beta\left[\frac{F_Z}{mV_T}\right]\right) \times$$

$$\left(\cos\alpha\sin\beta\left[\frac{F_X}{mV_T}\right] + \sin\alpha\sin\beta\left[\frac{F_Z}{mV_T}\right] + R\cos\alpha - P\sin\alpha\right) -$$

$$\left(R\sin\alpha + P\cos\alpha + \sin\alpha\sin\beta\left[\frac{F_X}{mV_T}\right] - \cos\alpha\sin\beta\left[\frac{F_Z}{mV_T}\right]\right) \times$$

$$\left(\left(\frac{\cos\alpha}{V_T\cos\beta}\right)\frac{F_Z}{m} + \left(\frac{\sin\alpha}{V_T\cos\beta}\right)\frac{F_X}{m} + Q - P\cos\alpha\tan\beta - R\sin\alpha\tan\beta\right) -$$

$$(F_X\cos\alpha\sin\beta + F_Z\sin\alpha\sin\beta)\left(\frac{\dot{m}}{m^2} + \frac{\dot{V}_T}{V_T^2}\right) -$$

$$\frac{\sin\alpha}{\Delta}[(I_{yz}^2 - I_{yy}I_{zz})(A + L) - (I_{xz}I_{yz} + I_{xy}I_{zz})(B + M) -$$

$$(I_{xz}I_{yy} + I_{xy}I_{yz})(C + N)] + \frac{\cos\alpha}{\Delta}[-(I_{xy}I_{yz} + I_{yy}I_{xz})(A + L) -$$

$$(I_{xx}I_{yz} + I_{xy}I_{xz})(B + M) + (I_{xz}^2 - I_{xx}I_{yy})(C + N)] + \ddot{\beta}_{cmd} +$$

$$(k_3 + k_4)\dot{\beta}_{cmd} + \frac{1}{mV_T}(\dot{F}_X\cos\alpha\sin\beta + \dot{F}_Z\sin\alpha\sin\beta) - k_3 k_4 z_3.$$

Next, using equality $$F_Y(\alpha, \beta, \delta_r) = F_{Y_{\delta_r}}(\alpha, \beta, \delta_r) + F_{Y_0}(\alpha, \beta, 0),$$

in equation (26) yields;

$$\frac{\cos\beta}{mV_T}\dot{F}_{Y_{\delta_r}} = -\frac{1}{mV_T}\Bigg((k_3 + k_4)\cos\beta + (R\cos\alpha - P\sin\alpha)\sin\beta - \quad (27)$$

$$\cos(2\beta)\left\{\cos\alpha\left[\frac{F_X}{mV_T}\right] + \sin\alpha\left[\frac{F_Z}{mV_T}\right]\right\} -$$

$$\cos\beta\left(\frac{\dot{m}}{m^2} + \frac{\dot{V}_T}{V_T^2}\right)F_{Y_{\delta_r}} + \frac{\cos\beta\sin\beta}{(mV_T)^2}F_{Y_{\delta_r}}^2 +$$

$$\frac{\cos\beta\sin\beta}{(mV_T)^2}F_{Y0}^2 - \frac{1}{mV_T}\Bigg((k_3 + k_4)\cos\beta + (R\cos\alpha - P\sin\alpha)\sin\beta -$$

$$\cos(2\beta)\left\{\cos\alpha\left[\frac{F_X}{mV_T}\right] + \sin\alpha\left[\frac{F_Z}{mV_T}\right]\right\} -$$

$$\cos\beta\left(\frac{\dot{m}}{m^2} + \frac{\dot{V}_T}{V_T^2}\right)F_{Y0} + \left(k_3 + k_4 - \right.$$

$$\cos\alpha\cos\beta\left[\frac{F_X}{mV_T}\right] - \sin\alpha\cos\beta\left[\frac{F_Z}{mV_T}\right]\right)$$

$$\left(\cos\alpha\sin\beta\left[\frac{F_X}{mV_T}\right] + \sin\alpha\sin\beta\left[\frac{F_Z}{mV_T}\right] + R\cos\alpha -\right.$$

$$P\sin\alpha\Bigg) - \frac{\cos\beta}{mV_T}\dot{F}_{Y0} - \left(R\sin\alpha + P\cos\alpha +\right.$$

$$\sin\alpha\sin\beta\left[\frac{F_X}{mV_T}\right] - \cos\alpha\sin\beta\left[\frac{F_X}{mV_T}\right]\right) \times$$

$$\left(\left(\frac{\cos\alpha}{V_T\cos\beta}\right)\frac{F_Z}{m} + \left(\frac{\sin\alpha}{V_T\cos\beta}\right)\frac{F_X}{m} + Q -\right.$$

$$P\cos\alpha\tan\beta - R\sin\alpha\tan\beta\Bigg) -$$

$$(F_X\cos\alpha\sin\beta + F_Z\sin\alpha\sin\beta)\left(\frac{\dot{m}}{m^2} + \frac{\dot{V}_T}{V_T^2}\right) -$$

$$\frac{\sin\alpha}{\Delta}[(I_{yz}^2 - I_{yy}I_{zz})(A + L) -$$

$$(I_{xz}I_{yz} + I_{xy}I_{zz})(B + M) - (I_{xz}I_{yy} + I_{xy}I_{yz})(C + N)] +$$

$$\frac{\cos\alpha}{\Delta}[-(I_{xy}I_{yz} + I_{yy}I_{xz})(A + L) - (I_{xx}I_{yz} + I_{xy}I_{xz})(B + M) +$$

$$(I_{xz}^2 - I_{xx}I_{yy})(C + N)] + \ddot{\beta}_{cmd} +$$

$$(k_3 + K_4)\dot{\beta}_{cmd} + \frac{1}{mV_T}(\dot{F}_X\cos\alpha\sin\beta + \dot{F}_Z\sin\alpha\sin\beta) -$$

$$k_3 k_4 z_3.$$

The solution of force controller differential equation (27) is an amount of force acting on a vehicle for a given side slip angle command (or equivalently an acceleration command). The controller of equation (27) can be applied to air-borne vehicles that use fin control, thrust vector control, thruster control, or other means to control the vehicle. For vehicles using fins as means of control, when designing a linear autopilot controller, one assumes a linear relationship between force and. fin deflection described by:

$$F_{Y_{\delta_r}}(\alpha, \beta, \delta_r) \simeq \bar{q} S_{Y_{\delta_q}} \delta_r,$$

where the force aerodynamic coefficient $$C_{Y_{\delta_r}}$$

is constant and represents the slope of the force aerodynamic in the linear region (pre-stall region). The drawback of using a linearized force aerodynamic coefficient is that the autopilot controller cannot control a vehicle in the post-stall region or even close to the fin stall point. That is why linear autopilot controllers limit the fin deflection displacement to the linear region of operation where the rate of change of force aerodynamic coefficient $$C_{Y_{\delta_r}}$$

is constant for a range of fin deflection values. In the development of the Stall and Recovery Control System (SARCS), the nonlinear aerodynamic function representing force $$F_{Y_{\delta_r}}\left(F_{Y_{\delta_r}}(\alpha, \beta, \delta_r) = \bar{q}SC_{Y_{\delta_q}}(\alpha, \beta, \delta_r)\right)$$

for a given mach number are utilized. The challenge of using nonlinear function $$F_{Y_{\delta_r}}(\alpha, \beta, \delta_r)$$

is that for a given $$F_{Y_{\delta_r}}(\alpha, \beta, \delta_r)$$

command signal, there exists more than one fin deflection command $\delta_r$. In other words, mapping $$\delta_{r_{cmd}} = \mathcal{N}(F_{Y_{\delta_r}})$$

is not one-to-one, i.e., mapping $\aleph(\cdot)$ is not a function. The next section discusses a way of solving this problem to yield a one-to-one mapping for $\aleph(\cdot)$. Differential equation (27) can be adjusted so as to have a fin deflection differential equation, since an autopilot controller usually outputs fin deflection commands; So using $$F_{Y_{\delta_r}}(\alpha, \beta, \delta_r) = \bar{q}SC_{Y_{\delta_r}}(\alpha, \beta, \delta_r), \quad (28)$$

and calculating the derivative yields:

$$\dot{F}_{Y_{\delta_r}}(\alpha, \beta, \delta_r) = \dot{\bar{q}}SC_{Y_{\delta_r}}(\alpha, \beta, \delta_r) + \bar{q}S\dot{C}_{Y_{\delta_r}}(\alpha, \beta, \delta_r) \quad (29)$$

$$= \dot{\bar{q}}SC_{Y_{\delta_r}}(\alpha, \beta, \delta_r) + \bar{q}S\left(\frac{\partial}{\partial \alpha}C_{Y_{\delta_r}}(\cdot)\dot{\alpha} + \frac{\partial}{\partial \beta}C_{Y_{\delta_r}}(\cdot)\dot{\beta} + \frac{\partial}{\partial \delta_r}C_{Y_{\delta_r}}(\cdot)\dot{\delta_r}\right).$$

Substituting equations (28) and (29) into force differential equation (27) and re-grouping the terms yields:

$$\frac{\bar{q}S\cos\beta}{mV_T}C'_{Y_{\delta_r}}\dot{\delta}_r = \quad (30)$$

$$-\frac{\bar{q}S}{mV_T}\bigg((k_3 + k_4)\cos\beta + (R\cos\alpha - P\sin\alpha)\sin\beta - \cos(2\beta)$$

$$\left\{\cos\alpha\left[\frac{F_X}{mV_T}\right] + \sin\alpha\left[\frac{F_Z}{mV_T}\right]\right\} - \cos\beta\left(\frac{\dot{m}}{m^2} + \frac{\dot{V}_T}{V_T^2} - \frac{\dot{\bar{q}}}{\bar{q}}\right) +$$

$$\frac{\bar{q}S\cos^2\beta}{mV_T}\frac{\partial}{\partial \beta}C_{Y_{\delta_r}}\bigg)C_{Y_{\delta_r}} + \frac{\bar{q}^2S^2\cos\beta\sin\beta}{(mV_T)^2}C^2_{Y_{\delta_r}} +$$

$$\frac{\cos\beta\sin\beta}{(mV_T)^2}F^2_{Y0} - \frac{1}{mV_T}\bigg((k_3 + k_4)\cos\beta + (R\cos\alpha - P\sin\alpha)\sin\beta -$$

$$\cos(2\beta)\left\{\cos\alpha\left[\frac{F_X}{mV_T}\right] + \sin\alpha\left[\frac{F_Z}{mV_T}\right]\right\} -$$

$$\cos\beta\left(\frac{\dot{m}}{m^2} + \frac{\dot{V}_T}{V_T^2}\right) + \frac{\bar{q}S\cos^2\beta}{mV_T}\frac{\partial}{\partial \beta}C_{Y_{\delta_r}}\bigg)F_{Y0} +$$

$$\left(k_3 + k_4 - \cos\alpha\cos\beta\left[\frac{F_X}{mV_T}\right] - \sin\alpha\cos\beta\left[\frac{F_Z}{mV_T}\right] +$$

$$\frac{\bar{q}S\cos\beta}{mV_T}\frac{\partial}{\partial \beta}C_{Y_{\delta_r}}\right) \times$$

$$\left(\cos\alpha\sin\beta\left[\frac{F_X}{mV_T}\right] + \sin\alpha\sin\beta\left[\frac{F_Z}{mV_T}\right] + R\cos\alpha - P\sin\alpha\right) -$$

$$\frac{\cos\beta}{mV_T}(\dot{\bar{q}}SC_{Y0} + \bar{q}S\dot{C}_{Y0}) -$$

$$\left(R\sin\alpha + P\cos\alpha + \sin\alpha\sin\beta\left[\frac{F_X}{mV_T}\right] -$$

$$\cos\alpha\sin\beta\left[\frac{F_Z}{mV_T}\right] + \frac{\bar{q}S\cos\beta}{mV_T}\frac{\partial}{\partial \alpha}C_{Y_{\delta_r}}\right) \times$$

$$\left(\frac{\cos\alpha}{V_T\cos\beta}\frac{F_Z}{m} + \frac{\sin\alpha}{V_T\cos\beta}\frac{F_X}{m} + Q - P\cos\alpha\tan\beta - R\sin\alpha\tan\beta\right) -$$

$$(F_X\cos\alpha\sin\beta + F_Z\sin\alpha\sin\beta)\left(\frac{\dot{m}}{m^2} + \frac{\dot{V}_T}{V_T^2}\right) -$$

$$\frac{\sin\alpha}{\Delta}[(I^2_{yz} - I_{yy}I_{zz})(A+L) -$$

$$(I_{xz}I_{yz} + I_{xy}I_{zz})(B+M) - (I_{xz}I_{yy} + I_{xy}I_{yz})(C+N)] +$$

$$\frac{\cos\alpha}{\Delta}[-(I_{xy}I_{yz} + I_{yy}I_{xz})(A+L) - (I_{xx}I_{yz} + I_{xy}I_{xz})(B+M) +$$

$$(I^2_{xz} - I_{xx}I_{yy})(C+N)] + \ddot{\beta}_{cmd} + (k_3 + k_4)\dot{\beta}_{cmd} +$$

$$\frac{1}{mV_T}(\dot{F}_X\cos\alpha\sin\beta + \dot{F}_Z\sin\alpha\sin\beta) - k_3k_4z_3.$$

where $C'_{Y_{\delta_r}}(\alpha, \beta, \delta_r) \equiv \frac{\partial}{\partial \delta_r}C_{Y_{\delta_r}}(\alpha, \beta, \delta_r).$ 2.5.1 Slope-Intercept Design Format Similar to the discussion in section 2.4.1, this method resolves the aerodynamic function as follows:

$$C_{Y_{\delta_r}}(\alpha, \beta, \delta_r) = \frac{\partial}{\partial \delta_r}C_{Y_{\delta_r}}(\alpha, \beta, \delta_r) + \underline{C}_{Y_{\delta_r}}(\alpha, \beta, \delta_r),$$

or $$C_{Y_{\delta_r}}(\alpha, \beta, \delta_r) = C'_{Y_{\delta_r}}(\alpha, \beta, \delta_r)\delta_r + \underline{C}_{Y_{\delta_r}}(\alpha, \beta, \delta_r),$$

where $$\underline{C}_{Y_{\delta_r}}(\alpha, \beta, \delta_r)$$

denotes the "intercept" of $$C_{Y_{\delta_r}}(\alpha, \beta, \delta_r).$$

Thus, with this in mind, equation (30) becomes:

$$\frac{\bar{q}S\cos\beta}{mV_T}C'_{Y_{\delta_r}}\dot{\delta}_r = \qquad (31)$$

$$-\frac{\bar{q}S}{mV_T}\Bigg((k_3+k_4)\cos\beta + (R\cos\alpha - P\sin\alpha)\sin\beta - \cos(2\beta)$$

$$\left\{\cos\alpha\left[\frac{F_X}{mV_T}\right] + \sin\alpha\left[\frac{F_Z}{mV_T}\right]\right\} - \cos\beta\left(\frac{\dot{m}}{m^2} + \frac{\dot{V}_T}{V_T^2} - \frac{\dot{\bar{q}}}{\bar{q}}\right) +$$

$$\frac{\bar{q}S\cos^2\beta}{mV_T}\frac{\partial}{\partial\beta}C_{Y_{\delta_r}}\Bigg)\left(C'_{Y_{\delta_r}}\delta_r + \underline{C}_{Y_{\delta_r}}\right) +$$

$$\frac{\bar{q}^2S^2\cos\beta\sin\beta}{(mV_T)^2}C_{Y_{\delta_r}}^2 + \frac{\cos\beta\sin\beta}{(mV_T)^2}F_{YO}^2 -$$

$$\frac{1}{mV_T}\Bigg((k_3+k_4)\cos\beta + (R\cos\alpha - P\sin\alpha)\sin\beta -$$

$$\cos(2\beta)\left\{\cos\alpha\left[\frac{F_X}{mV_T}\right] + \sin\alpha\left[\frac{F_Z}{mV_T}\right]\right\} -$$

$$\cos\beta\left(\frac{\dot{m}}{m^2} + \frac{\dot{V}_T}{V_T^2}\right) + \frac{\bar{q}S\cos^2\beta}{mV_T}\frac{\partial}{\partial\beta}C_{Y_{\delta_r}}\Bigg)F_{YO} +$$

$$\left(k_3+k_4 - \cos\alpha\cos\beta\left[\frac{F_X}{mV_T}\right] - \sin\alpha\cos\beta\left[\frac{F_Z}{mV_T}\right] + \frac{\bar{q}S\cos\beta}{mV_T}\frac{\partial}{\partial\beta}C_{Y_{\delta_r}}\right)$$

$$\left(\cos\alpha\sin\beta\left[\frac{F_X}{mV_T}\right] + \sin\alpha\sin\beta\left[\frac{F_Z}{mV_T}\right] + R\cos\alpha - P\sin\alpha\right) -$$

$$\frac{\cos\beta}{mV_T}\left(\dot{\bar{q}}SC_{YO} + \bar{q}S\dot{C}_{YO}\right) - \Bigg(R\sin\alpha + P\cos\alpha +$$

$$\sin\alpha\sin\beta\left[\frac{F_X}{mV_T}\right] - \cos\alpha\sin\beta\left[\frac{F_Z}{mV_T}\right] + \frac{\bar{q}S\cos\beta}{mV_T}\frac{\partial}{\partial\alpha}C_{Y_{\delta_r}}\Bigg)$$

$$\left(\frac{\cos\alpha}{V_T\cos\beta}\frac{F_Z}{m} + \frac{\sin\alpha}{V_T\cos\beta}\frac{F_X}{m} + Q - P\cos\alpha\tan\beta - R\sin\alpha\tan\beta\right) -$$

$$(F_X\cos\alpha\sin\beta + F_Z\sin\alpha\sin\beta)\left(\frac{\dot{m}}{m^2} + \frac{\dot{V}_T}{V_T^2}\right) -$$

$$\frac{\sin\alpha}{\Delta}[(I_{yz}^2 - I_{yy}I_{zz})(A+L) -$$

$$(I_{xz}I_{yz} + I_{xy}I_{zz})(B+M) - (I_{xz}I_{yy} + I_{xy}I_{yz})(C+N)] +$$

$$\frac{\cos\alpha}{\Delta}[-(I_{xz}I_{yz} + I_{uy}I_{xz})(A+L) - (I_{xx}I_{yz} + I_{xy}I_{xz})(B+M) +$$

$$(I_{xz}^2 - I_{xx}I_{yy})(C+N)] + \dot{\beta}_{cmd} + (k_3+k_4)\beta_{cmd} +$$

$$\frac{1}{mV_T}\left(F_X\cos\alpha\sin\beta + F_Z\sin\alpha\sin\beta\right) - k_3k_4z_3.$$

The above differential equation works well when $$C'_{Y_{\delta_r}}$$

is away from zero. However, as a vehicle approaches stall condition, i.e., $$C'_{Y_{\delta_r}} \simeq 0,$$

it causes a singularity in equation (31) which leads to a problem in obtaining the differential equation solution for $\alpha_r$. A solution to this problem is to neglect all the terms in equation (31) that are multiplied by $$C'_{Y_{\delta_r}}.$$

Therefore, from moment equation N in equation (8), rewriting $$C_{n_{\delta_r}}(\alpha,\beta,\delta_r) = C'_{n_{\delta_r}}(\alpha,\beta,\delta_r)\delta_r + \underline{C}_{n_{\delta_r}}(\alpha,\beta,\delta_r), \qquad (32)$$

where $$C'_{n_{\delta_r}}(\alpha,\beta,\delta_r)$$

is the slope function of $$C_{n_{\delta_r}}(\alpha,\beta,\delta_r) \text{ and } \underline{C}_{n_{\delta_r}}(\alpha,\beta,\delta_r)$$

is the $$C_{n_{\delta_r}}(\alpha,\beta,\delta_r)$$

intercept function; and solving for $\delta_r$; the form of an analytical solution controller (closed form solution) for $$C'_{Y_{\delta_r}} \simeq 0$$

is given by:

$$\Lambda\delta_r = -\frac{\bar{q}S}{mV_T}\Bigg((k_3+k_4)\cos\beta + (R\cos\alpha - P\sin\alpha)\sin\beta - \qquad (33)$$

$$\cos(2\beta)\left\{\cos\alpha\left[\frac{F_X}{mV_T}\right] + \sin\alpha\left[\frac{F_Z}{mV_T}\right]\right\} -$$

$$\cos\beta\left(\frac{\dot{m}}{m^2} + \frac{\dot{V}_T}{V_T^2} - \frac{\dot{\bar{q}}}{\bar{q}}\right) + \frac{\bar{q}S\cos^2\beta}{mV_T}\frac{\partial}{\partial\beta}C_{Y_{\delta_r}}\Bigg)\underline{C}_{Y_{\delta_r}} +$$

$$\frac{\bar{q}^2S^2\cos\beta\sin\beta}{(mV_T)^2}\underline{C}_{Y_{\delta_r}}^2 + \frac{\cos\beta\sin\beta}{(mV_T)^2}F_{YO}^2 -$$

$$\frac{1}{mV_T}\Bigg((k_3+k_4)\cos\beta + (R\cos\alpha - P\sin\alpha)\sin\beta -$$

$$\cos(2\beta)\left\{\cos\alpha\left[\frac{F_X}{mV_T}\right] + \sin\alpha\left[\frac{F_Z}{mV_T}\right]\right\} -$$

$$\cos\beta\left(\frac{\dot{m}}{m^2} + \frac{\dot{V}_T}{V_T^2}\right) + \frac{\bar{q}S\cos^2\beta}{mV_T}\frac{\partial}{\partial\beta}C_{Y_{\delta_r}}\Bigg)F_{YO} +$$

$$\left(k_3+k_4 - \cos\alpha\cos\beta\left[\frac{F_X}{mV_T}\right] - \sin\alpha\cos\beta\left[\frac{F_Z}{mV_T}\right] + \frac{\bar{q}S\cos\beta}{mV_T}\frac{\partial}{\partial\beta}C_{Y_{\delta_r}}\right)$$

$$\left(\cos\alpha\sin\beta\left[\frac{F_X}{mV_T}\right] + \sin\alpha\sin\beta\left[\frac{F_Z}{mV_T}\right] + R\cos\alpha - P\sin\alpha\right) -$$

$$\frac{\cos\beta}{mV_T}\left(\dot{\bar{q}}SC_{YO} + \bar{q}S\dot{C}_{YO}\right) - \Bigg(R\sin\alpha + P\cos\alpha +$$

$$\sin\alpha\sin\beta\left[\frac{F_X}{mV_T}\right] - \cos\alpha\sin\beta\left[\frac{F_Z}{mV_T}\right] + \frac{\bar{q}S\cos\beta}{mV_T}\frac{\partial}{\partial\alpha}\underline{C}_{Y_{\delta_r}}\Bigg)$$

$$\left(\frac{\cos\alpha}{V_T\cos\beta}\frac{F_Z}{m} + \frac{\sin\alpha}{V_T\cos\beta}\frac{F_X}{m} + Q - P\cos\alpha\tan\beta - R\sin\alpha\tan\beta\right) -$$

$$(F_X\cos\alpha\sin\beta + F_Z\sin\alpha\sin\beta)\left(\frac{\dot{m}}{m^2} + \frac{\dot{V}_T}{V_T^2}\right) -$$

$$\frac{\sin\alpha}{\Delta}[(I_{yz}^2 - I_{yy}I_{zz})(A+L) -$$

$$(I_{xz}I_{yz} + I_{xy}I_{zz})(B+M) - (I_{xz}I_{yy} + I_{xy}I_{yz})(C+N_1)] +$$

$$\frac{\cos\alpha}{\Delta}[-(I_{xy}I_{yz} + I_{yy}I_{xz})(A+L) - (I_{xx}I_{yz} + I_{xy}I_{xz})(B+M) +$$

$$(I_{xz}^2 - I_{xx}I_{yy})(C+N_1)] + \ddot{\beta}_{cmd} + (k_3+k_4)\dot{\beta}_{cmd} +$$

-continued $$\frac{1}{mV_T}(\dot{F}_X\cos\alpha\sin\beta + \dot{F}_Z\sin\alpha\sin\beta) - k_3k_4z_3,$$

where $$\Lambda = \frac{\bar{q}SD}{\Delta}((I_{xz}^2 - I_{xx}I_{yy})\cos\alpha - (I_{xz}I_{yy} + I_{xy}I_{yz})\sin\alpha)C'_{n_{\delta_r}}(\alpha, \beta, \delta_r),$$

$$N_1 = \bar{q}SD\Big(C_{n0}(\alpha, \beta) + C_{n_{\delta_r}}(\alpha, \beta, \delta_r) + \frac{D}{2U}[C_{n_p}P + C_{n_r}R]\Big).$$

The above analytical solution (static) controller is singular as $$C'_{n_{\delta_r}}$$

approaches zero. Thus, the present invention addresses the need for a mixing algorithm that switches between the static controller of equation (33) and the dynamic controller of equation (31) to avoid any control singularity. Following similar discussions presented in section 2.2.1, it can shown that the static controller (33) can be substituted for the dynamic controller (31) not only close to fin stall condition $$(C'_{Y_{\delta_r}} \simeq 0),$$

but for all times because of the large damping term which is dominated by term (neglecting inertia cross products $I_{xy}$, $I_{xz}$, and $I_{yz}$)

$$\frac{mDV_T\cos\alpha}{I_{zz}} \frac{C'_{n_{\delta_r}}(\alpha, \beta, \delta_r)}{C'_{Y_{\delta_r}}(\alpha, \beta, \delta_r)}.$$

Controllers of equation(31) and equation (33) assume perfect state feedback β. Since state β is not measurable, β as a feedback signal can be estimated by using the following estimation algorithms:

The side slip angle can be measured using:

$$\hat{\beta} = \int\Big(A_{YB}/V_T - \frac{\hat{\beta}F_x}{mV_T} - R + P\hat{\alpha}\Big)dt, \quad (34)$$

where $A_{YB}$ is the horizontal body acceleration and is measurable via accelerometer, $V_T$ is measured using a speed transducer, and P and R are measurable via gyros.

The side slip angle could be estimated using:

$$\hat{\beta} = -\sin^{-1}\Big(\frac{V_y}{V_T}\Big).$$

2.5.2 Tracking a horizontal acceleration command: $Ay_{cmd}$

Following similar discussion as that of sub-section 2.4.2, one can build a nonlinear equation that relates $AY_{cmd}$ to $\beta_{cmd}$ or construct a transfer function relating $Ay_{cmd}$ to $\beta_{cmd}$ given by:

$$\frac{\beta(deg)}{N_y(g's)}(s) = \frac{\beta}{\delta_r}(s)\frac{\delta_r}{N_y}(s),$$

where $$\frac{\beta}{\delta_r}(s) = \frac{-Z_{\delta_r}s - Z_{\delta_r}(M_{\dot\theta} + M_{\dot\beta}) + M_\beta Z_{\delta_r} + M_{\delta_r}U}{Us^2 + [Z_\beta + U(M_{\dot\beta} + M_{\dot\theta})]s + M_\beta U + M_{\dot\beta}Z_\beta},$$

$$\frac{\delta_r}{N_y}(s) = 32.2\frac{Us^2 + [Z_\beta + U(M_{\dot\beta} + M_{\dot\theta})]s + M_\beta U + M_{\dot\theta}Z_\beta}{U[Z_{\delta_r}s^2 + Z_{\delta_r}(M_{\dot\beta} + M_{\dot\theta})s + M_{\delta_r}Z_\beta + M_\beta Z_{\delta_r}]}.$$

As a result, the transfer function relating angle β to acceleration $N_y$ is given by:

$$\frac{\beta(deg)}{N_y(g's)}(s) = -32.2\frac{Z_{\delta_r}s + Z_{\delta_r}(M_{\dot\theta} + M_{\dot\beta}) - M_{\delta_r}U - M_{\dot\beta}Z_{\delta_r}}{U[Z_{\delta_r}s^2 + Z_{\delta_r}(M_{\dot\beta} + M_{\dot\theta})s + M_{\delta_r}Z_\beta + M_\beta Z_{\delta_r}]}.$$

The coefficients of the above transfer function are defined to be:

$$Z_\beta = \frac{\bar{q}S}{m}C_{N_\beta},$$

$$Z_{\delta_r} = \frac{\bar{q}S}{m}C_{N_{\delta_r}},$$

$$M_\alpha = \frac{-\bar{q}SD}{I_{zz}}C_{M_\beta},$$

$$M_{\delta_r} = \frac{\bar{q}SD}{I_{zz}}C_{M_{\delta_r}},$$

$$M_{\dot\beta} = \frac{-\bar{q}SD^2}{2UI_{zz}}C_{M_{\dot\beta}},$$

$$M_{\dot\theta} = \frac{-\bar{q}SD^2}{2UI_{zz}}C_{M_{\dot\theta}}.$$

Again, the choice for estimating side slip angle β depends on system memory versus processing speed.

2.6 Roll Channel

Finally, with regard to a design of an autopilot controller that tracks a desired roll command $\phi_{cmd}$, the dynamic equations that describe roll motion are given by:

$$\dot\phi = P + Q\sin\phi\tan\theta + R\cos\phi\tan\theta \quad (35)$$

$$\dot\theta = Q\cos\phi - R\sin\phi$$

$$\dot{P} = \frac{1}{\Delta}[(I_{yz}^2 - I_{yy}I_{zz})(A + L) -$$
$$(I_{xz}I_{yz} + I_{xy}I_{zz})(B + M) - (I_{xz}I_{yy} + I_{xy}I_{yz})(C + N)].$$

Once again, the state transformation (error signal) can be defined to be $$z_5 = \phi - \phi_{cmd}.$$

Differentiating the above equation, yields:

$$\dot{z}_5 = P + Q \sin\phi \tan\theta + R \cos\phi \tan\theta - \dot\phi_{cmd}$$

It is desired to have state $z_5$ converge to zero asymptotically. Therefore, another state, say $z_6$, can be defined as follows:

$$z_6 = \dot{z}_5 + k_5z_5,$$

for some constant gain $k_5>0$. In order to have a dynamic equation for $z_6$, differentiating the above equation yields:

$$z_6 = k_5(P + Q \sin\phi \tan\theta + R \cos\phi \tan\theta) + \dot{P}Q \sin\phi \tan\theta$$
$$+ \dot{R}\cos\phi\tan\theta - k_5\dot{\phi}_{cmd} - \ddot{\phi} + \tan\theta(Q\cos\phi - R\sin\phi)\dot{\phi}$$
$$+ \sec^2(\theta)(Q\sin\phi + R\cos\phi)\dot{\theta}. \quad (36)$$

In order to drive state $z_6$ asymptotically to zero, let $$\dot{z}_6 = k_6 z_6, \text{ where } k_6 > 0$$

Therefore:

$$\dot{P} + \dot{R}\cos\phi\tan\theta + \dot{Q}\sin\phi\tan\theta =$$
$$-k_5 k_6 z_5 - (k_5 + k_6)(P + Q\sin\phi\tan\theta + R\cos\phi\tan\theta - \dot{\phi}_{cmd}) +$$
$$\ddot{\phi}_{cmd} - \tan\theta(Q\cos\phi - R\sin\phi)\dot{\phi} - \sec^2\theta(Q\sin\phi + R\cos\phi)\dot{\theta}.$$

Substituting dynamic terms $\dot{P}$, $\dot{Q}$, $\dot{R}$, $\dot{\phi}$, and $\dot{\theta}$ in the above equation yields:

$$\frac{1}{\Delta}(I_{yz}^2 - I_{yy}I_{zz} - (I_{xy}I_{yz} + I_{yy}I_{zz})\cos\phi\tan\phi - \quad (37)$$
$$(I_{xy}I_{zz} + I_{xz}I_{yz})\sin\phi\tan\theta)(A+L) +$$
$$\frac{1}{\Delta}(-(I_{xz}I_{yz} + I_{xy}I_{zz}) - (I_{xx}I_{yz} + I_{xy}I_{xz})\cos\phi\tan\theta +$$
$$(I_{xz}^2 - I_{xx}I_{zz})\sin\phi\tan\theta)(B+M) +$$
$$\frac{1}{\Delta}(-(I_{xz}I_{yy} + I_{xy}I_{yz}) + (I_{xz}^2 - I_{xx}I_{yy})\cos\phi\tan\theta -$$
$$(I_{xx}I_{yz} + I_{xy}I_{xz})\sin\phi\tan\theta)(C+N) =$$
$$-k_5 k_6 z_5 - (k_5 + k_6)(P + Q\sin\phi\tan\theta + R\cos\phi\tan\theta - \dot{\phi}_{cmd}) +$$
$$\ddot{\phi}_{cmd} - \tan\theta(Q\cos\phi - R\sin\phi)(P + Q\sin\phi\tan\theta + R\cos\phi\tan\theta) -$$
$$\sec^2\theta(Q\sin\phi + R\cos\phi)(Q\cos\phi - R\sin\phi).$$

Since equation (37) is a nonlinear algebraic equation for controllers $\delta_p$, $\delta_q$, and $\delta_r$, one needs to regroup equation (37) so that L appear on the left hand side;

$$(I_{yz}^2 - I_{yy}I_{zz} - (I_{xy}I_{yz} + I_{yy}I_{xz})\cos\phi\tan\theta - (I_{xy}I_{zz} + I_{xx}I_{yz})\sin\phi\tan\theta)L = \quad (38)$$
$$+((I_{xz}I_{yz} + I_{xy}I_{zz}) + (I_{xx}I_{yz} - I_{xy}I_{xz})\cos\phi\tan\theta +$$
$$(I_{xz}^2 - I_{xx}I_{zz})\sin\phi\tan\theta) \times (B+M) -$$
$$(-(I_{xz}I_{yy} + I_{xy}I_{yz}) + (I_{xz}^2 - I_{xx}I_{yy})\cos\phi\tan\theta -$$
$$(I_{xx}I_{yz} + I_{xy}I_{xz})\sin\phi\tan\theta)(C+N) -$$
$$(I_{yz}^2 - I_{yy}I_{zz} - (I_{xy}I_{yz} + I_{yy}I_{xz}) \times \cos\phi\tan\theta -$$
$$(I_{xy}I_{zz} + I_{xz}I_{yz})\sin\phi\tan\theta)A - \Delta k_5 k_6 z_5 -$$
$$\Delta(k_5 + k_6)(P + Q\sin\phi\tan\theta + R\cos\phi\tan\theta - \dot{\phi}_{cmd}) + \Delta\ddot{\phi}_{cmd} -$$
$$\Delta\tan\theta(Q\cos\phi - R\sin\phi)(P + Q\sin\phi\tan\theta + R\cos\phi\tan\theta) -$$
$$\Delta\sec^2\theta(Q\sin\phi + R\cos\phi)(Q\cos\phi - R\sin\phi).$$

Now, substituting for term L yields:

$$C_l(\alpha, \beta, \delta_p) = -C_{l0} - \frac{D}{2U}(C_{l_p}P + C_{l_r}R) - \frac{A}{\bar{q}SD} + \quad (39)$$
$$\frac{1}{\bar{q}SDY_L}\{Y_M(B+M) + Y_N(C+N) - \Delta k_5 k_6 z_5 - \Delta(k_5 + k_6)$$

-continued
$$(P + Q\sin\phi\tan\theta + R\cos\phi\tan\theta - \dot{\phi}_{cmd}) + \Delta\ddot{\phi}_{cmd} -$$
$$\Delta\tan\theta(Q\cos\phi - R\sin\phi)(P + Q\sin\phi\tan\phi + R\cos\phi\tan\theta) -$$
$$\Delta\sec^2\theta(Q\sin\phi + R\cos\phi)(Q\cos\phi - R\sin\phi)\},$$

where $$\Gamma_L = (I_{yz}^2 I_{yy}I_{zz} - (I_{xy}I_{yz} + I_{yy}I_{xz})\cos\phi\tan\theta - (I_{xy}I_{zz} + I_{xz}I_{yz})\sin\phi\tan\theta)$$

$$\Gamma_M = -(-(I_{xz}I_{yz} + I_{xy}I_{zz}) - (I_{xx}I_{yz} + I_{xy}I_{xz})\cos\phi\tan\theta + (I_{xz}^2 - I_{zz})\sin\phi\tan\theta)$$

$$\Gamma_N = -(-(I_{xz}I_{yy} + I_{xy}I_{yz}) + (I_{xz}^2 - I_{xx}I_{yy})\cos\phi\tan\theta - (I_{xx}I_{yz} + I_{xy}I_{xz})\sin\phi\tan\theta).$$

2.7 Quaternions

Quaternions are generally used to avoid any singularity when a vehicle's pitch angle approaches 90 degrees. The quaternion dynamic equations are given by:

$$\dot{q}_1 = -\frac{1}{2}(Pq_2 + Qq_3 + Rq_4)$$

$$\dot{q}_2 = \frac{1}{2}(Pq_1 - Qq_4 + Rq_3)$$

$$\dot{q}_3 = \frac{1}{2}(Pq_4 + Qq_1 - Rq_2)$$

$$\dot{q}_4 = \frac{1}{2}(-Pq_3 + Qq_2 + Rq_1).$$

The vehicle Euler angles can be derived from the quaternion states as follows:

$$\psi = \tan^{-1}\left(\frac{2(q_2 q_3 + q_1 q_4)}{q_1^2 + q_2^2 - q_3^2 - q_4^2}\right), \quad (40)$$

$$\theta = \sin^{-1}(2(q_1 q_3 - q_2 q_4)), \quad (41)$$

$$\phi = \tan^{-1}\left(\frac{2(q_1 q_2 + q_3 q_4)}{q_1^2 - q_2^2 - q_3^2 + q_4^2}\right). \quad (42)$$

If one wants to use the quaternions, then one has to add the quaternion equations to a simulation and calculate Euler angles from equations (40), (41), and (42). Next, use these calculated values in the three control equations (18), (30), and (38). One needs to keep in mind that even though for $\theta = \pm 90°$ singularity is avoided, the body roll angle is undefined for this condition. An alternative solution should be exercised in order to have a defined roll angle at $\theta \cong \pm 90°$.

2.8 Uncertainty/Noise compensation

Most physical systems are inherently nonlinear and contain uncertainty (correlated noise) and/or noise (uncorrelated noise). Possible uncertainties/noise are modeling errors, unmodelled dynamics, noise disturbances, magnetic interference, and/or no exact information about the dynamics (states) of the nonlinear system under study. Thus, it is sometimes important to compensate for such uncertainty/noise in order to achieve desirable system performance, and in worst case scenario avoid instability behavior. Uncertainty and/or noise compensation is usually done using the following three simple steps.

A designer must be able to identify and approximate the magnitude and sign of the uncertainty/noise that is being injected into the dynamic system. The uncertainty part could be due to GIC (sensors) errors, i.e., uncertainty in state feedback signals. Noise could be due to magnetic interference or other uncorellated noise.

In this step, the designer should develop bounding functions for both the uncertainty and/or noise present in the system. The bounding functions (positive) are chosen such that their magnitude is greater or equal to the uncertainty/noise magnitude. For instance, if a dynamic system has been identified to have uncertainty $\Delta F(\alpha)=0.2 \sin(2t)+0.4\alpha-0.3\alpha^2$ then a bounding function $\rho(\alpha)$ is chosen to be $$\rho(\alpha) \geq 0.2+0.4|\alpha|+0.3|\alpha|^2.$$

The above choice for $\rho(\alpha)$ insures that $\rho(\alpha) \geq |\Delta F(\alpha)|$.

The last step is to add the bounding function to the controller. This will make sure that the controller is aware that an uncertainty/noise of magnitude $\rho(+)$ is present in the dynamic system. Keep in mind that the sign of the uncertainty is important in order for the controller to identify the direction (positive or negative) of the uncertainty/noise being injected into the dynamic system. With this in mind, the bounding function must be modified as follows:

$$\varrho(\alpha) = \text{sgn}(\alpha)(1-e^{-\epsilon|\alpha|})\rho(\alpha),$$

where $\epsilon > 0$ is a damping parameter chosen by the designer. Note that $\varrho(\alpha)$ can dominate uncertainty $\Delta F(\alpha)$ in both sign and magnitude. As a result, function $\varrho(\alpha)$ should be added to the control equation.

2.9 Fin Mixing Logic (Three fin design)

The fin mixing logic is developed on the assumption that the rudder fin is perfectly vertical and the two elevator fins are equally spaced from the rudder one. Moreover, assuming that actual aero-coefficients are know exactly and referenced to the C.G. (Center of Gravity). While this approach is presented for the preferred embodiment, one of skill in the art will appreciate that other fin arrangements are possible and that the following general approach below may be modified for alternative fin arrangements.

$$\begin{bmatrix} \delta_p \\ \delta_q \\ \delta_r \end{bmatrix} = \begin{bmatrix} c_1 & 1 & c_1 \\ 1 & 0 & -1 \\ c_2 & -1 & c_2 \end{bmatrix} \begin{bmatrix} \delta_1 \\ \delta_2 \\ \delta_3 \end{bmatrix},$$

where $c_1$ and $c_2$ are positive constants that will be determined later. Thus, the fin mixing logic is given by:

$$\begin{bmatrix} \delta_1 \\ \delta_2 \\ \delta_3 \end{bmatrix} = \frac{1}{2(c_1+c_2)} \begin{bmatrix} 1 & c_1+c_2 & 1 \\ 2c_2 & 0 & -2c_1 \\ 1 & -(c_1+c_2) & 1 \end{bmatrix} \begin{bmatrix} \delta_p \\ \delta_q \\ \delta_r \end{bmatrix}.$$

The above fin mixing logic has been adopted in such a way that when a pure yaw command is desired, a small deflection of fins 1 and fin 3 (i.e., a small value of $\delta_1$ and $\delta_3$) (by a factor of $c_2$) is needed in order to minimize any pitching or rolling effects. When commanded a roll, fin 2 is commanded at a different rate then fins 1 and 3 (by a factor of $c_1$). In order to determine constants $c_1$ and $c_2$, we proceed as follows:

1. Pure Yaw Moment ($\delta_r$):

For a pure yawing moment with side force the following set of equations can be employed:

$$L = C_{l_{\delta_1}} \delta_{r_1} + C_{l_{\delta_2}} \delta_{r_2} + C_{l_{\delta_3}} \delta_{r_3} = 0 \tag{43}$$

$$M = C_{m_{\delta_1}} \delta_{r_1} + C_{m_{\delta_2}} \delta_{r_2} + C_{m_{\delta_3}} \delta_{r_3} = 0 \tag{44}$$

$$Z = C_{N_{\delta_1}} \delta_{r_1} + C_{N_{\delta_2}} \delta_{r_2} + C_{N_{\delta_3}} \delta_{r_3} = 0. \tag{45}$$

From equation (45), assuming $$C_{N_{\delta_2}} \delta_{r_2} \simeq 0$$

and keeping in mind that:

$$\delta_{r_1} = -\frac{C_{N_{\delta_3}}}{C_{N_{\delta_1}}} \delta_{r_3} \Rightarrow \delta_1 = \delta_3.$$

Substituting the above equation in (43) yields:

$$\delta_{r_2} = -\frac{1}{C_{l_{\delta_2}}} \left( C_{l_{\delta_3}} + \left[ -\frac{C_{N_{\delta_3}}}{C_{N_{\delta_1}}} \right] C_{l_{\delta_1}} \right) \delta_{r_3}. \tag{46}$$

For a pure yaw motion, one can set $\delta_p = \delta_q = 0$. Thus, the mixing logic yields a relationship between $\delta_2$ and $\delta_3$ given by:

$$\delta_3 = -\frac{1}{2c_1} \delta_2. \tag{47}$$

Equating equations (46) and (47) yields the value of constant $c_1$:

$$c_1 = \frac{C_{l_{\delta_q}} + C_{l_{\delta_3}}}{2 C_{l_{\delta_2}}},$$

where $$C_{N_{\delta_1}} = -C_{N_{\delta_3}}.$$

2. Pure Roll moment ($\delta_p$):

For a pure rolling moment the following set of equations can be employed:

$$M = C_{m_{\delta_1}} \delta_{r_1} + C_{m_{\delta_2}} \delta_{r_2} + C_{m_{\delta_3}} \delta_{r_3} = 0 \tag{48}$$

$$N = C_{n_{\delta_1}} \delta_{r_1} + C_{n_{\delta_2}} \delta_{r_2} + C_{n_{\delta_3}} \delta_{r_3} = 0 \tag{49}$$

$$Z = C_{N_{\delta_1}} \delta_{r_1} + C_{N_{\delta_2}} \delta_{r_2} + C_{N_{\delta_3}} \delta_{r_3} = 0 \tag{50}$$

$$Y = C_{Y_{\delta_1}} \delta_{r_1} + C_{Y_{\delta_2}} \delta_{r_2} + C_{Y_{\delta_3}} \delta_{r_3} = 0. \tag{51}$$

From equation (50), assuming $$C_{N_{\delta_1}} = -C_{N_{\delta_3}}.$$

and keeping in mind that:

$$\delta_{r_1} = -\frac{C_{N_{\delta_3}}}{C_{N_{\delta_1}}} \delta_{r_3} \Rightarrow \delta_1 = \delta_3.$$

Substituting the above equation in (51) yields:

$$\delta_{r_2} = -\frac{1}{C_{Y_{\delta_2}}}\left(C_{Y_{\delta_3}} + \left[-\frac{C_{N_{\delta_3}}}{C_{N_{\delta_1}}}\right]C_{Y_{\delta_1}}\right)\delta_{r_3}. \quad (52)$$

For a pure roll motion, one can set $\delta_r = \delta_q = 0$. Thus, the mixing logic yields a relationship between $\delta_2$ and $\delta_3$ given by:

$$\delta_3 = \frac{1}{2c_2}\delta_2. \quad (53)$$

Equating equations (52) and (53), we obtain the value of constant $c_2$:

$$c_2 = -\frac{C_{Y_{\delta_1}} + C_{Y_{\delta_3}}}{2C_{Y_{\delta_2}}},$$

where again $$M = C_{m_{\delta_1}}\delta_{r_1} + C_{m_{\delta_2}}\delta_{r_2} + C_{m_{\delta_3}}\delta_{r_3} = 0 \quad (48)$$

$$N = C_{n_{\delta_1}}\delta_{r_1} + C_{n_{\delta_2}}\delta_{r_2} + C_{n_{\delta_3}}\delta_{r_3} = 0 \quad (49)$$

$$Z = C_{N_{\delta_1}}\delta_{r_1} + C_{N_{\delta_2}}\delta_{r_2} + C_{N_{\delta_3}}\delta_{r_3} = 0 \quad (50)$$

$$Y = C_{Y_{\delta_1}}\delta_{r_1} + C_{Y_{\delta_2}}\delta_{r_2} + C_{Y_{\delta_3}}\delta_{r_3} = 0. \quad (51)$$

If one uses the above fin mixing logic, the following simplifications and/or modifications can be made:
1. Equation (18) remains unchanged.
2. In equation (30), one can drop term $\delta_p$, that is $$F_{\delta_r}(\alpha, \beta, \delta_r, \delta_p) = F_{\delta_r}(\alpha, \beta, \delta_r)$$

3. In equation (38), rolling moment $C_l(\alpha,\beta,\delta_p, \delta_r)$ can be calculated since fin deflection commands $\delta_q$ and $\delta_r$ are decoupled and term $\delta_r$ can be dropped from $C_l(\alpha,\beta, \delta_p, ",_r)$. In other words, $$C_l(\alpha,\beta, \delta_p, \delta_r) = C_l(\alpha,\beta, \delta_p).$$

The above fin mixing logic can be directly used, with minor modifications, to comply with equations (18), (30), and (39). Since these equations calculate the solution for the fin aerodynamic forces/moments needed to track a commanded input, i.e., $F_{\delta_q}$, $F_{\delta_r}$ and $C_l$, one must first convert these forces/moments due to fin deflections to pure fin deflection values $\delta_1$, $\delta_2$, and $\delta_3$. This could be accomplished by feeding the estimated angle of attack and side slip angles along with $F_{\delta_q}$, $F_{\delta_r}$, and $C_l$, into the table lookups or equations of the surfaces where the outputs are the three fin deflections $\delta_1$, $\delta_2$, and $\delta_3$. Keeping in mind that $C_{N_\delta}(\cdot)$, $C_{m\delta}(\cdot)$, .... are not functions by definition, i.e., for a given value of $$C_{m_{\delta_3}}(\cdot),$$

there are two fin deflection values $\delta_3$. Thus, the convergence to a fin deflection value for a given pitching moment command is local. In other words, the fin deflection will converge to the closer value of the two fin deflection solutions for a given $$C_{m_{\delta_3}}$$

depending on the initial starting point of the fin deflection state (initial condition). If one limits the fin aerodynamics to the linear region (small angle of attack and fin deflection), then the fin aerodynamics become functions with respect to the fin deflections (one to one mapping from $C_{m_{\delta_i}}$ to $\delta_i$).

to $\delta_i$). If the above assumption is exercised, the following argument holds. The fin mixing logic equations should be rewritten as follows:

$$\begin{bmatrix} C_{Y_{\delta_1}} \\ C_{Y_{\delta_2}} \\ C_{Y_{\delta_3}} \end{bmatrix} = \frac{1}{2(c_1 + c_2)}\begin{bmatrix} 1 \\ -2c_1 \\ 1 \end{bmatrix}C_{Y_\delta},$$

$$\begin{bmatrix} C_{N_{\delta_1}} \\ C_{N_{\delta_2}} \\ C_{N_{\delta_3}} \end{bmatrix} = \frac{1}{2(c_1 + c_2)}\begin{bmatrix} c_1 + c_2 \\ 0 \\ c_1 + c_2 \end{bmatrix}C_{N_\delta},$$

$$\begin{bmatrix} C_{l_{\delta_1}} \\ C_{l_{\delta_2}} \\ C_{l_{\delta_3}} \end{bmatrix} = \frac{1}{2(c_1 + c_2)}\begin{bmatrix} 1 \\ 2c_2 \\ 1 \end{bmatrix}C_{l_\delta}.$$

The reason for restructuring these equations is because it is difficult to combine all three table look-ups into one. Moreover, after calculating all nine variables above $$\left(C_{Y_{\delta_i}}, C_{N_{\delta_i}}, \text{ and } C_{l_{\delta_i}} \text{ for } i = 1, 2, 3\right),$$

these variables are passed through the table look-ups along with $\alpha$ and $\beta$ estimates to yield the three fin deflections which are then passed to the actuators.

2.10 Decoupling the Dynamic Control Equations

If one desires to use a fin mixing logic where the three channels remain coupled, the following decoupling technique can be applied to separate or decouple the three channels. However, this decoupling process is applicable if one can replace/simplify the following terms:

$$F_{\delta_q} \simeq F_c\delta_q, \; F_{\delta_r} \simeq v\left(C_{y_{\delta_p}}\delta_p + C_{y_{\delta_r}}\delta_r\right), \; C_l(\alpha, \beta, \delta_p) \simeq C_{l_{\delta_p}}\delta_p.$$

Once a linear approximation of the external forces/moments due to fin deflection are made, one can continue with the decoupling process. Assuming that dynamic control equations for vertical (18) and horizontal (30) channels, and algebraic control equation for roll (38) channel are coupled, the decoupling process will facilitate the implementation of these controller algorithms ($\delta_p$, $\delta_q$, $\delta_r$). By decoupling these three controllers, one can observe the separate behavior of the three controllers as well as the effect of each one of them on the other two channels. The decoupling matrix is giving by:

$$D = \begin{bmatrix} UF_c & 0 & 0 \\ 0 & \nu U C_{y_{\delta_p}} & \nu U C_{y_{\delta_r}} \\ \chi_q & f_{p1} + f_{r1} & f_{p2} + f_{r2} \end{bmatrix},$$

where $$\chi_q = \frac{\bar{q}SD'}{\Delta}(-(I_{xz}I_{yz} + I_{xy}I_{zz}) - (I_{xx}I_{yz} + I_{xy}I_{xz})$$

$$\cos\phi\tan\theta + (I_{xz}^2 - I_{xx}I_{zz})\sin\phi\tan\theta)C_{m_{\delta_q}}$$

$$f_{r1} = \frac{\bar{q}SD}{\Delta}(-(I_{xz}I_{yy} + I_{xy}I_{yz}) + (I_{xz}^2 - I_{xx}I_{yy})$$

$$\cos\phi\tan\theta - (I_{xx}I_{yz} + I_{xy}I_{xz})\sin\phi\tan\theta)C_{n_{\delta_p}}$$

$$f_{r2} = \frac{\bar{q}SD}{\Delta}(-(I_{xz}I_{yy} + I_{xy}I_{yz}) + (I_{xz}^2 - I_{xx}I_{yy})$$

$$\cos\phi\tan\theta - (I_{xx}I_{yz} + I_{xy}I_{xz})\sin\phi\tan\theta)C_{n_{\delta_r}}$$

$$f_{p1} = \frac{\bar{q}SD}{\Delta}(I_{yz}^2 - I_{yy}I_{zz} - (I_{xy}I_{yz} + I_{yy}I_{xz})$$

$$\cos\phi\tan\theta - (I_{xy}I_{zz} + I_{xz}I_{yz})\sin\phi\tan\theta)C_{l_{\delta_p}}$$

$$f_{p2} = \frac{\bar{q}SD}{\Delta}(I_{yz}^2 - I_{yy}I_{zz} - (I_{xy}I_{yz} + I_{yy}I_{xz})$$

$$\cos\phi\tan\theta - (I_{xy}I_{zz} + I_{xz}I_{yz})\sin\phi\tan\theta)C_{l_{\delta_r}}.$$

After defining the decoupling matrix D, the following functions, that will yield the three decoupled fin deflection command equations, can be defined:

$$\xi_1 = \int UF_c \delta_q dt, \quad \xi_2 = \int U\left(\nu C_{y_{\delta_p}} \delta_p + \nu C_{y_{\delta_r}} \delta_r\right) dt,$$

$$\xi_3 = \text{R.H.S of equation (38)}.$$

States $\xi_1$ and $\xi_2$ are the output of the dynamic controller functions that integrate equations (18) and (30), and $\xi_3$ is just the right hand side of algebraic equation (38). The decoupled fin deflection commands $\delta_q$, $\delta_p$, and $\delta_r$ are determined by solving the following simultaneous algebraic equations:

$$\begin{bmatrix} \delta_q \\ \delta_p \\ \delta_r \end{bmatrix} = D^{-1} \begin{bmatrix} \xi_1 \\ \xi_2 \\ \xi_3 \end{bmatrix}, \quad \text{where}$$

$$D^{-1} = \frac{\begin{bmatrix} \nu U C_{y_{\delta_p}}(f_{p2} + f_{r2}) - \nu U C_{y_{\delta_r}}(f_{p1} + f_{r1}) & 0 & 0 \\ \nu U C_{y_{\delta_r}} \chi_q & UF_c(f_{p2} + f_{r2}) & -F_c \nu U^2 C_{y_{\delta_r}} \\ -\nu U C_{y_{\delta_p}} \chi_q & -UF_c(f_{p1} + f_{r1}) & F_c \nu U^2 C_{y_{\delta_p}} \end{bmatrix}}{U^2 F_c \nu C_{y_{\delta_p}}(f_{p2} + f_{r2}) - U^2 F_c \nu C_{y_{\delta_r}}(f_{p1} + f_{r1})}.$$

Finally, the three decoupled nonlinear control equations are given by:

$$\delta_q = \frac{1}{UF_c} \xi_1,$$

$$\delta_p = \frac{\nu C_{y_{\delta_r}} \chi_q}{F_c \Gamma} \xi_1 + \frac{f_{p2} + f_{r2}}{\Gamma} \xi_2 - \frac{\nu U C_{y_{\delta_r}}}{\Gamma} \xi_3,$$

$$\delta_r = \frac{\nu C_{y_{\delta_p}} \chi_q}{F_c \Gamma} \xi_1 - \frac{f_{p1} + f_{r1}}{\Gamma} \xi_2 + \frac{\nu U C_{y_{\delta_p}}}{\Gamma} \xi_3,$$

by letting $$\Gamma = \nu U C_{y_{\delta_p}}(f_{p2} + f_{r2}) - \nu U C_{y_{\delta_r}}(f_{p1} + f_{r1}).$$

In order for equation (54) to exist (well posed), decoupling matrix D must be full rank (D is invertible)

$$\forall \phi, |\theta| < \frac{\pi}{2}.$$

If Euler pitch angle $\theta$ approaches $$\frac{\pi}{2},$$

equation (54) cannot be solved because the third row of matrix D becomes undefined. However, assuming that the vehicle (e.g., a missile) cannot approach a 90 degrees Euler pitch angle, there will not be an ill posed equation.

2.11 Simulation Results

This section evaluates the above autopilot controller in a simulation. The following steps were developed for the simulation model:

Instead of storing large table look-up data for the vehicle's aerodynamic coefficients, the static aerodynamic coefficient surfaces can be curve fitted to yield nonlinear functions that describe these surfaces $$\left(C_{A_{\delta_O}}, C_{N_{\delta_O}}, C_{Y_{\delta_O}}, C_{n_{\delta_O}}, C_{m_{\delta_O}}, C_{l_{\delta_O}}\right).$$

These functions are then used to calculate the values of the aerodynamic coefficients for a given $\alpha$ and $\beta$. This process may reduce the memory and/or the processing time that is usually required when dealing with data table look-up and interpolation algorithms. By having a function that describes a surface, interpolation is no longer needed. One needs to keep in mind that the curve fitted surfaces do have accuracy (54)

errors associated with them. However, the functions describing the aerodynamic coefficient surfaces are very accurate in most cases.

It is desired to have a system performance similar to a first order response, i.e., exponential decay with no or minimal overshoot. Thus, tweaking/adjusting "constant" gains $k_i$ to be of "varying" type gains (functions of the system tracking errors) shall yield a first order system response for all input commands operating in a flight region. The final products are nonlinear gain functions. In order to obtain these equations, one needs to simulate the model for a wide range of $\alpha_{cmd}$, $\beta_{cmd}$, and $\phi_{cmd}$ and for each separate case, modify the appropriate gain such that a first order response is achieved. Then, curve fit the gain vectors to obtain the needed nonlinear equations. Once the equations are available, the designer could add a factor multiplied by the gains in order to increase or decrease the total gain magnitude for each channel if needed. This may be desirable in order to achieve smooth tracking response. Keep in mind that this gain tweaking process will need revision if vehicle specifications such as vehicle mass, product/moment of inertia, wing/fin(s) surface areas, etc . . . change. In order to take into account dynamic pressure changes, nonlinear equations are developed and fitted that vary with varying $\bar{q}$.

Since the theoretical autopilot design technique relies on angles $\alpha$ and $\beta$ as state feedback signals, and since vehicle sensors measure angular rates and accelerations, one must convert, say a given measured vertical acceleration to an equivalent angle $\alpha$ using equation (22) as previously discussed. In addition, since the guidance law usually sends acceleration commands to the autopilot, it is necessary to convert these commands to equivalent angle commands ($Az_{cmd} \to \alpha_{cmd}$, $Ay_{cmd} \to \beta_{cmd}$). The conversion process yields a function that relates the input to the output. For instance; one can develop a table that relates a vertical acceleration command to its equivalent angle of attack command (horizontal acceleration command to a side slip angle command) while taking into account changes for dynamic pressure $\bar{q}$ and mass m. That is;

$\alpha_{cmd} = F(\bar{q}, m, Az_{cmd})$, $\beta_{cmd} = F(\bar{q}, m, Ay_{cmd}, Az_{cmd})$.

A reverse design is used to develop these functions. For a given $\alpha_{cmd}$, $\bar{q}$, and m, one can calculate the value of $Az_{cmd}$. Thus, a 3-D table can be constructed that has independent variables $Az_{cmd}$ and $\bar{q}$ and dependent variable $\alpha_{cmd}$. Next, for each vehicle mass value we have a surface. Then, a linear interpolation is used to interpolate data between $\alpha_{cmd}$ surfaces for a given vehicle mass value. Similar approach follows for the horizontal channel with the addition of a function that takes into account $Az_{cmd}$ which could affect $\beta_{cmd}$ by as much as 11%. As a result, we have a surface function that converts the given guidance acceleration commands $Az_{cmd}$ and $Ay_{cmd}$ to equivalent $\alpha_{cmd}$ and $\beta_{cmd}$, respectively. Keep in mind that this process has to be redone every time vehicle specifications changes, i.e., if product/moment of inertia, aerodata coefficients, or wing/fins surface area, etc . . . change.

2.12 Real Time Algorithm Execution

The model discussed in the above section is continuous. It is very important to consider discretizing the model before executing it in real time. Thus, choosing a correct sampling rate is critical to insure stability of the overall controller since the controller(s) are the solution of complex differential equation(s). This brings to mind an interesting topic regarding complex differential equations running in discrete mode, i.e., "stiff equations". Stiff differential equations frequently arise in physical systems especially with the autopilot controller proposed in the manuscript. This phenomena occurs when the differential equations have greatly differing time constants. Within the system or controller, different terms decay at different rates. In other words, stiffness occurs when a dependent variable has two or more very different scales of independent variables. With this in mind, it is important to choose a sampling rate that maintain overall control stability while the controller differential equations are being integrated.

If one decides to explicitly integrate the controller differential equations, one should be careful with choosing a appropriate sampling rate for the controller model. For example, if equation (18) is rewritten as:

$$\dot{F}_{\delta_q} = -\mu F_{\delta_q} + O(\alpha, \beta, P, Q, R, \phi, \theta, \psi, U, m, I_{ij}, \dots), \quad (55)$$

where $O(\cdot)$ are the non-homogeneous terms and $\mu$ is the decay term associated with $F_{\delta_q}$. A sampling rate value (f) must be chosen such that $$\Delta t = \frac{1}{f} < \frac{2}{\mu}. \quad (56)$$

More specifically, in the damping term $\mu$, the following terms dominate:

$$\frac{UDm}{I_{yy}} \frac{C_{m_{\delta_q}}}{C_{N_{\delta_q}}} \quad \text{for vertical channel controller,}$$

$$\frac{UDm}{I_{zz}} \frac{C_{n_{\delta_r}}}{C_{Y_{\delta_r}}}, \quad \text{for horizontal channel controller.}$$

However, keep in mind that larger gain values $k_i$ may require higher sampling rate. One can see that the sampling rate is inversely proportional to the fin moment arm. If one chooses to integrate the controller differential equations implicitely, then one can reduce the step size needed for the integrator. Keep in mind that even though the integration process is stable for smaller sampling rate, accuracy is given up in converging towards equilibrium.

2.13 Sampling Rate Reduction Method

In this section, method(s) are discussed that will aid in reducing the sampling rate required while maintaining smooth explicit integration. From the above discussion regarding the necessary condition for the sampling rate, equation (56), one can lower the sampling rate needed by simply reducing the value of $\mu$ in the control dynamic equation. One technique is to multiply damping term $\mu$ by a constant, say $\lambda$, where the new dynamic equation becomes:

$$\dot{F}_{\delta_q} = -\lambda \mu F_{\delta_q} + O(\alpha, \beta, P, Q, R, \phi, \theta, \psi, U, m, I_{ij}, \dots).$$

By appropriately choosing $\lambda$, one can control the sampling rate of the above at differential equation. If a lower sampling rate is preferred, then one must choose $\lambda$ to be $0 < \lambda < 1$. This translates to:

$$\Delta t < \frac{2}{\lambda \mu}.$$

Even though constant $\lambda$ can be theoretically chosen anywhere in the interval (0,1), practically, the designer should test the low limit for $\lambda$ where the controller differential equations for a model under study are still smooth and did not deteriorate due to a small value of $\lambda$.

Remember that by multiplying dampling rate $\mu$ by constant $\lambda$, you have changed the form of the differential equation. Thus, one must reverse this change. Reversing the effect of adding $\lambda$ can be done by adding the following compensator filter $$T(s) = \frac{s + \lambda \mu}{s + \mu},$$

where the input to the filter is the modified differential equation solution and the output of the filter should yield the original solution of differential equation (55).

As a result, by adding the compensator filter to the output of the modified control differential equation, one can reverse the process of multiplying $\mu$ by $\lambda$. The above filter design is explained via the following simple example:

Assume that the original control differential equation is given by:

$$\dot{y} = -\mu y,$$

which requires a sampling rate $$freq > \frac{\mu}{2}.$$

Say, we want to reduce the sampling rate by a constant $0 < \lambda < 1$, that is $$freq > \frac{\lambda \mu}{2}.$$

Changing the sampling rate to $$freq > \frac{\lambda \mu}{2}$$

translates into having a modified control differential equation given by:

$$\dot{y}_m = -\lambda \mu y_m,$$

where subscript m stands for "modified". The modified control differential equation yields solution $y_m(t)$ which is different from $y(t)$. By inputing $y_m(t)$ through the compensator filter T(s), one retrieves solution $y(t)$ at the filter output. Transfer function T(s) is developed as follows:

$$y_m(s) = \frac{y_0}{s + \lambda \mu}, \qquad y(s) = \frac{y_0}{s + \mu},$$

where $y_0$ is the initial condition. Then $$T(s) = \frac{y(s)}{y_m(s)} = \frac{s + \lambda \mu}{s + \mu}.$$

The performance of the above described second embodiment is illustrated by simulation results shown in FIGS. 15–18. FIGS. 15A–15F illustrate the response of a particular vehicle to a commanded bank-to-turn maneuver. FIG. 15A illustrates a vertical channel guidance command $\alpha_{CMD}$ (solid line) and the vehicle response of the previously described autopilot controller over a period of time from 0 to 20 seconds. In FIG. 15A, it can be seen that the simulated response (dashed line) tracks the command line very closely. FIG. 15B illustrates a horizontal guidance command $\beta_{CMD}$ (solid line) and the simulated response of the previously described autopilot controller over the period of time from 0 to 20 seconds. FIG. 15C illustrates a roll channel guidance command $\phi_{CMD}$ (solid line) and the simulated response (dashed line) over the period of time from 0 to 20 seconds. FIG. 15D illustrates the longitudinal velocity of the vehicle along the x-axis over the period of time from 0 to 20 seconds. FIG. 15E illustrates an acceleration command corresponding to the z-axis ($A_{Z\ CMD}$—solid line) and the simulated response (dashed line) over the period of time from 0 to 20 seconds. In FIG. 15E, it can be seen that the simulated response (Az body sensor) tracks the command (Az body cmd) well, but exhibits a deviation during the time period of about 1 to 10 seconds. During this time period, the simulated body acceleration corresponding to the z-axis (Az body sensor) actually decreases from about −20 m/sec^2 to about −16 m/sec^2 and then returns to about −20 m/sec^2. This decrease in z-axis acceleration can be attributed to the fact that the vehicle is approaching, entering and returning from the body post-stall region of operation. FIG. 15F illustrates the simulated response of the acceleration of the vehicle along the y-axis over the period of time from 0 to 20 seconds.

Figure 16:
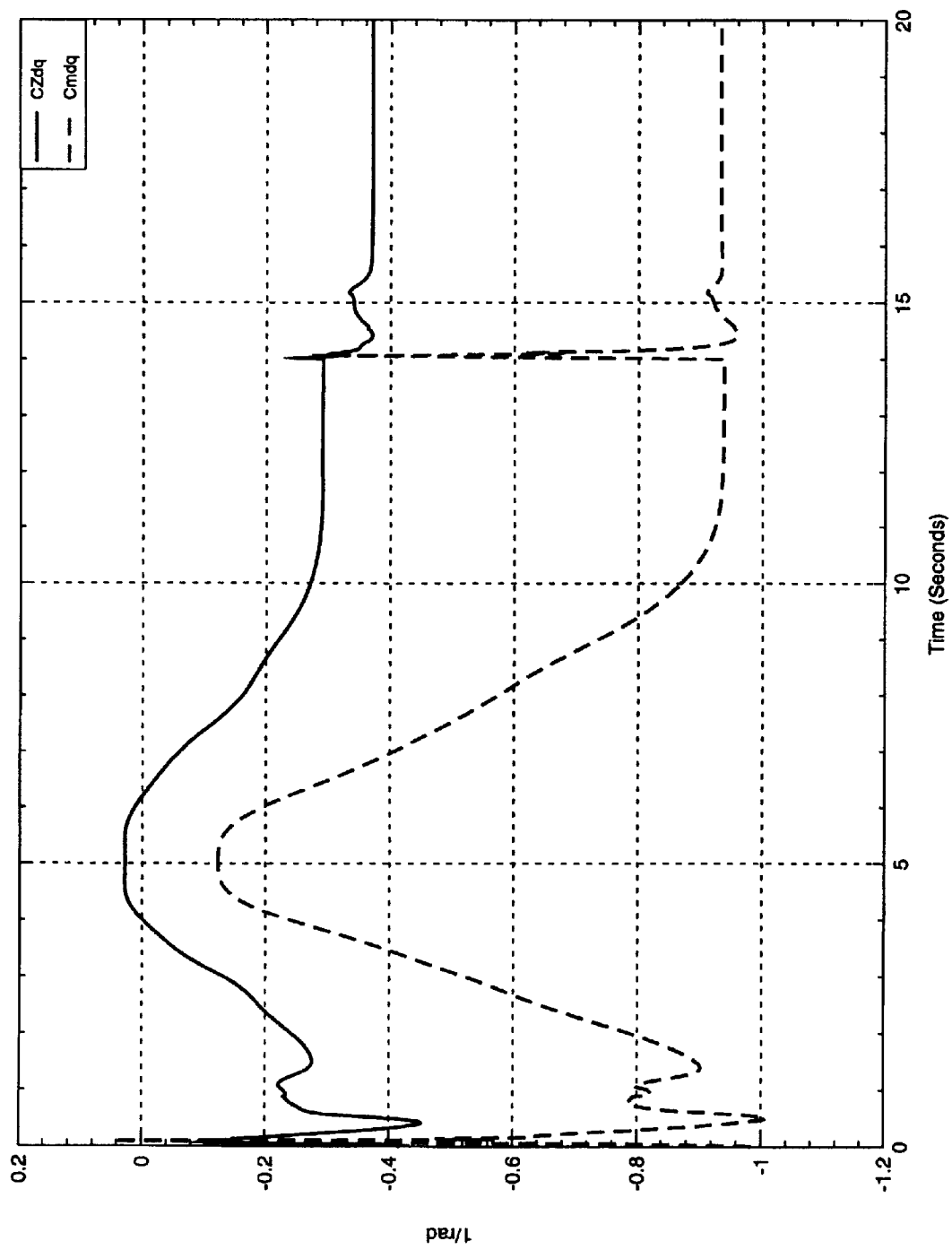
FIG. 16 illustrates the slope of the simulated response function $C_Z$ and $C_m$ for a particular vehicle for a commanded bank-to-turn maneuver.

FIG. 16 illustrates the simulated autopilot's determination of the slope of the $C_Z$ curve with respect to control surface deployment (CZdq) and the autopilot's determination of the slope of the Cm curve with respect to control surface deployment (Cmdq) during a commanded bank-to-turn maneuver from 0 to 20 seconds. It should be noted that a $C_Z$ curve for a vehicle is typically the inverse of a $C_N$ curve for the vehicle. Accordingly, a positive slope for a $C_Z$ curve corresponds to a negative slope on a $C_N$ curve. Accordingly, a positive slope for a $C_Z$ curve indicates a stall condition. In FIG. 16, it can be seen that the slope of the $C_z$ curve with respect to control surface deployment (CZdq) remains negative for the majority of the commanded bank-to-turn maneuver. However, during the time period from about 4 seconds to about 6 seconds, the slope of the $C_Z$ curve with respect to control surface deployment (CZdq) is positive (i.e., above zero). Accordingly, during this time period, the vehicle is operating in the fin post-stall region. Additionally, it should be noted that the slope of the $C_m$ curve with respect to control surface deployment (Cmdq) remains in the negative region (below zero) during the entire commanded bank-to-turn maneuver.

Figure 17B:
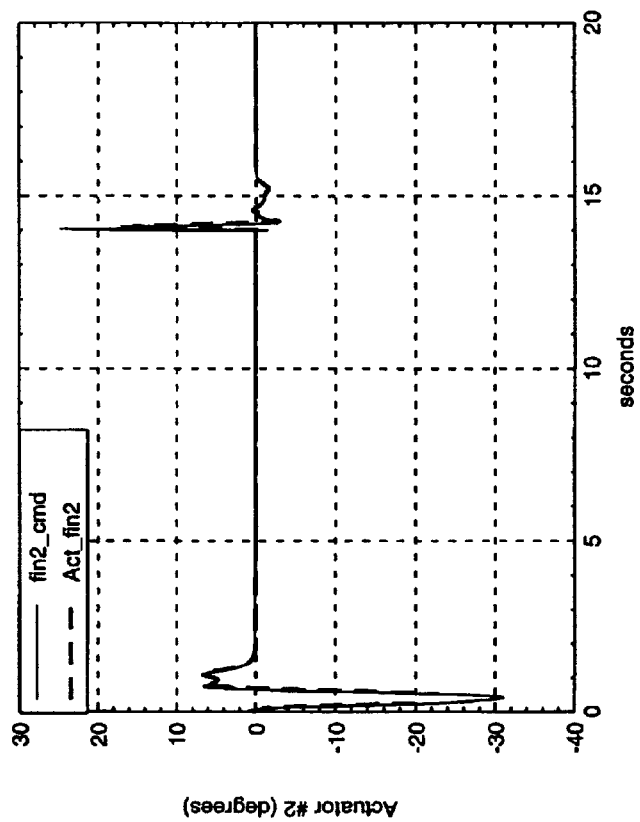
FIGS. 17A–17D illustrate the simulated response of a particular vehicle to a commanded bank-to-turn maneuver.
Figure 17A:
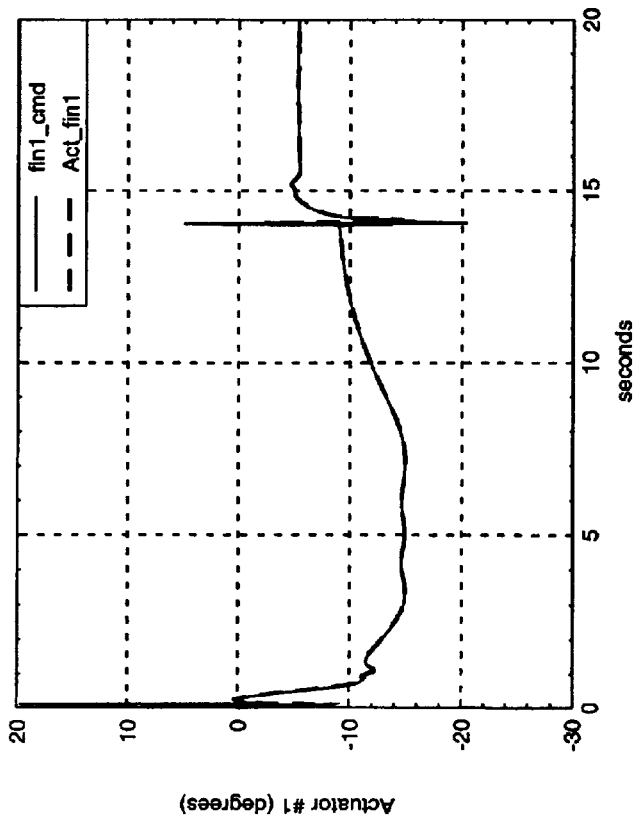
Figure 17D:
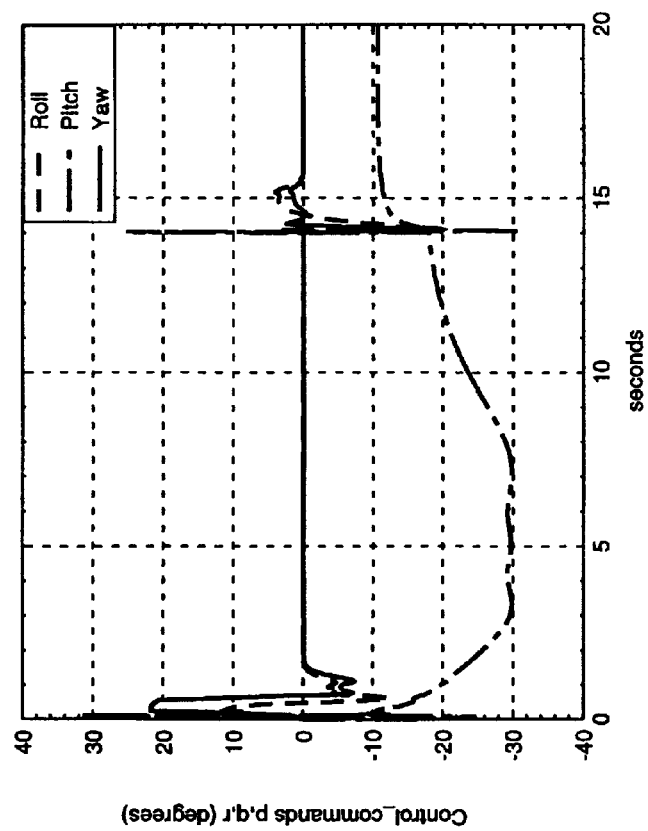
Figure 17C:
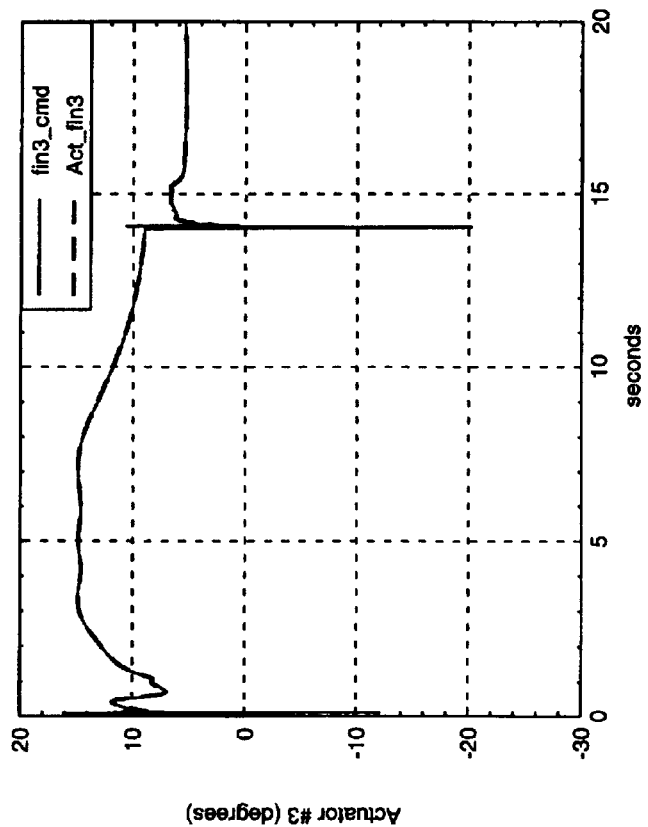

FIGS. 17A–17D illustrate how control surfaces respond to a commanded bank-to-turn maneuver. FIG. 17A illustrates the simulated response of an actuator (actuator #1) that controls a control surface that is parallel to the y-axis of the vehicle. During the time period of the commanded bank-to-turn maneuver (i.e. from 0 to 14 seconds), actuator #1 is commanded to deploy the control surface in a negative angular direction. FIG. 17B illustrates the simulated response of another actuator (actuator #2) that controls a control surface that is parallel to the z-axis of the vehicle. During the time period of the commanded bank-to-turn maneuver (i.e. from 0 to 14 seconds), actuator #2 remain undeployed with the exception of short deployments at the beginning of the commanded maneuver (when t≅0.5 seconds) and near the end of the commanded maneuver (when t≅14.5 seconds). FIG. 17C illustrates the simulated response of an actuator (actuator #3) that controls a control surface that is parallel to the y-axis of the vehicle, but is located on the opposite side of the vehicle from actuator #1. During the time period of the commanded bank-to-turn maneuver (i.e. from 0 to 14 seconds), actuator #3 is commanded to deploy the control surface in a positive angular direction. Finally, FIG. 17D illustrates the control commands P, Q and R corresponding to the three channels of the previously described second embodiment of the autopilot controller.

Figure 18A:
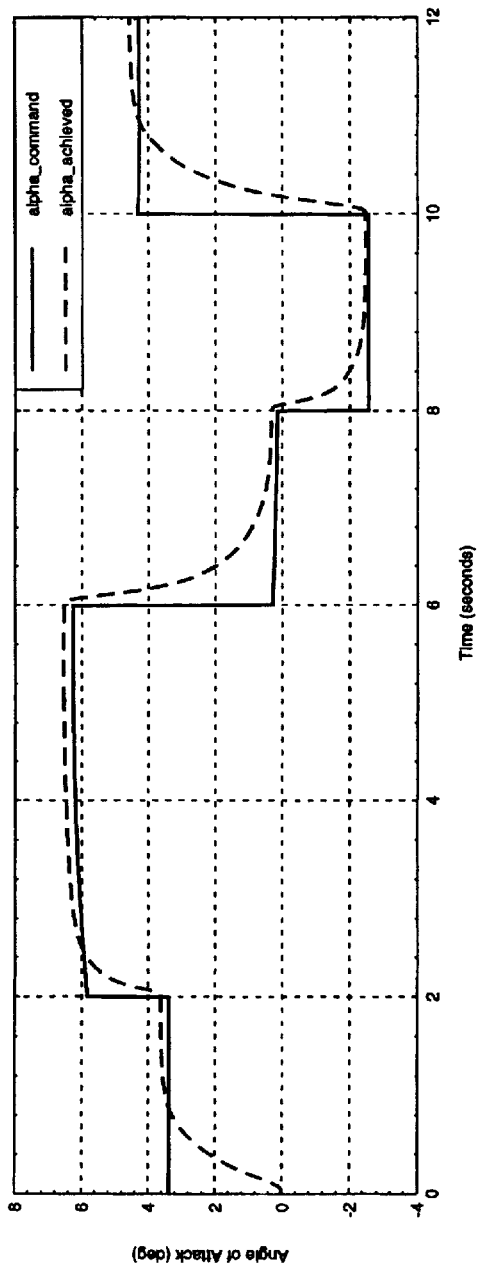
FIGS. 18A–18B illustrate a gain factor which is varied with the magnitude of the error signal.
Figure 18B:
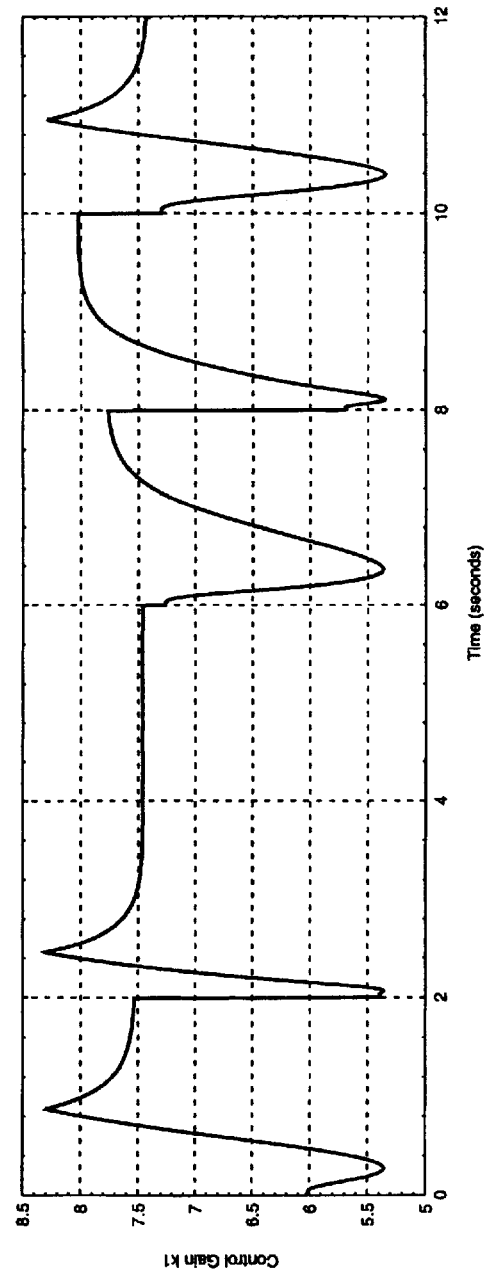

FIGS. 18A–18B illustrate another aspect of the present invention which is varying the gain of the autopilot controller as a function of system error. FIG. 18A illustrates a vertical guidance command $\alpha_{CMD}$ (solid line) and the simulated response (dashed line) of the autopilot controller over a period of time from 0 to 12 seconds. In FIG. 18A, it can be seen that the simulated response (dashed line) is critically damped with respect to both large and small changes in the vertical guidance command $\alpha_{CMD}$ (solid line). In order to achieve critically damped responses for both large and small command changes, the gain of the simulated autopilot controller is adjusted over time. FIG. 18B, illustrates the control gain k1 for the autopilot controller over time. As shown in the figure, the control gain varies instead of being held at a constant value. As discussed in the detailed description of the second embodiment above, one method for adjusting the control gain k1 is to make the control gain k1 a function of the difference between the command (alpha_cmd) and the simulated response (alpha).

3.0 Stall Condition Detector

Another aspect of the present invention is an autopilot controller which is capable of determining a stall condition of the vehicle based on current operating conditions such as angle of the attack α, the side slip angle β and the current control surface position δ. The present invention contemplates at least two approaches to determining the stall condition.

As noted above in regard to the first embodiment of the present invention, the autopilot controller is supplied with data corresponding to at least a portion of the $C_N$, $C_Y$, $C_A$, $C_m$, $C_l$, and $C_{yn}$ force and moment functions so that the partial derivative of the C function with respect to fin deflection can be determined as needed. Alternatively, the autopilot controller is supplied with data in the form of $(\partial C/\partial \delta, C_{intercept})$ pairs, which are a function of the vehicle operating conditions. In either case, the stored data can be processed by suitable instructions by the processor 52 so as to determine $\partial C/\partial \delta$ at the current vehicle operating conditions.

As discussed previously with regard to FIG. 8, at the point where the normal force $C_N$ curve reaches its maximum value, the angle of attack of the fin is so great that the airflow no longer conforms to the surface of the wing and stall occurs. Thus, the stall point is where the slope of the normal force $C_N$ curve is zero. Accordingly, by computing $\partial C/\partial \delta$ for current vehicle operating conditions and by monitoring the value of the thus computed $\partial C/\partial \delta$, the stall condition of the fin can be detected by monitoring the sign of $\partial C/\partial \delta$. That is, when $\partial C/\partial \delta$ is negative, the fin is operating in the post stall region; when $\partial C/\partial \delta$ is positive the fin is operating in the pre stall region. Accordingly, based on the polarity determination of $\partial C/\partial \delta$, the processor 52 and/or the autopilot controller 40 can output a signal indicative of the stall condition determination.

Figure 19:
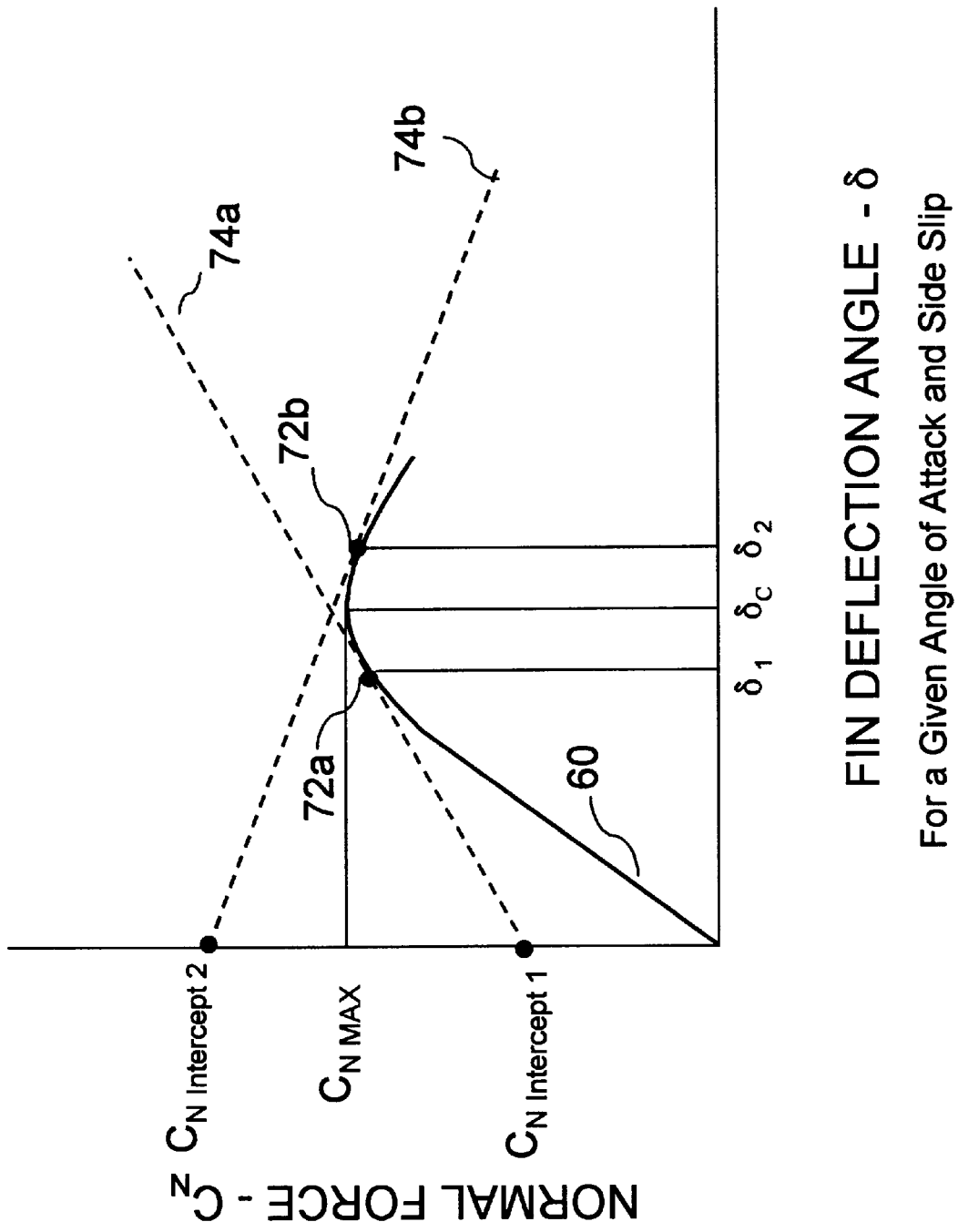
FIG. 19 is an illustration of the use of the force intercept value to determine a stall condition.

A second approach for determining the stall condition of the vehicle is based on examination of the vertical axis intercept for the linear function. In FIG. 19, curve 60 illustrates a plot of the normal force $C_N$ generated at the center of gravity of a vehicle as a function of the angle of deflection δ of the control fin, for a given angle of attack of the vehicle a, a given vehicle mach M, and a given vehicle side slip angle β. It should be noted that curve 60 has a maximum value of $C_{N\,MAX}$ corresponding to fin deflection $\delta_C$. As described above in the slope-intercept method of providing one-to-one mapping, for a first fin deflection $\delta_1$, which corresponds to a pre stall condition, a first linear function 74a can be determined, which is tangent to curve 60 at point 72a and which has a slope equal to the value of $\partial C/\partial \delta$ at point 72a. It should also be noted that the vertical axis intercept $C_{N\,Intercept\,1}$ for linear function 74a is less than $C_{N\,MAX}$. Similarly, for a second fin deflection $\delta_2$, which corresponds to a post stall condition, a second linear function 74b can be determined, which is tangent to curve 60 at point 72b and which has a slope equal to the value of $\partial C/\partial \delta$ at point 72b. In contrast to the linear function 74a, the vertical axis intercept $C_{N\,Intercept\,2}$ for the second linear function 74b is greater than $C_{N\,MAX}$.

Thus, because the value of $C_{N\,MAX}$ corresponding to fin deflection bc for the given conditions will be known as a result of the data which are stored for controlling the vehicle, the present approach for determining the stall condition is to determine the vertical axis intercept at the current vehicle operating condition and to compare the vertical axis intercept at the current vehicle operating condition to the stored value of $C_{N\,MAX}$. Where a linear function tangent to the $C_N$ curve at the current operating point has a vertical axis intercept less than $C_{N\,MAX}$, the current operating condition of the fin is in a pre stall condition. Where a linear function tangent to the $C_N$ curve at the current operating point has a vertical axis intercept greater than $C_{N\,MAX}$, the current operating condition of the fin is in a post stall condition. Accordingly, based on the comparison between the vertical axis intercept at the current vehicle operating condition and the stored value of $C_{N\,MAX}$, the processor 52 and/or the autopilot controller 40 can output a signal indicative of the stall condition determination.

4.0 Stall Recovery System

Figure 20:
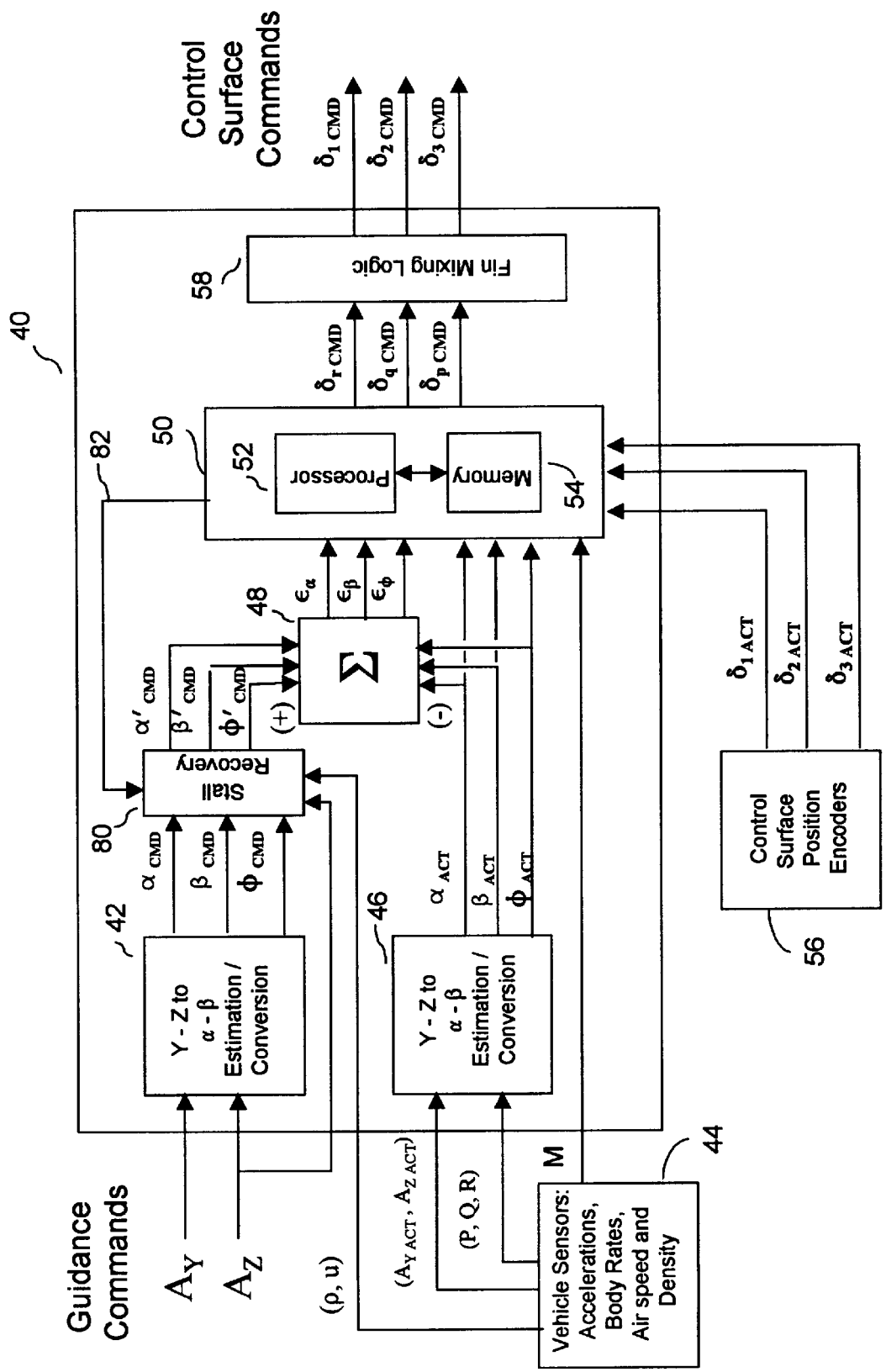
FIG. 20 is a block diagram of an autopilot controller according to the present invention which includes a stall detection and recovery device.

Another aspect of the present invention is an autopilot controller which includes a stall detection and recovery capability. As noted above, an autopilot controller in accordance with the present invention is capable of controlling the vehicle in both pre stall and post stall regions, and can also be capable of detecting a stall condition of the vehicle. Accordingly, a third embodiment of the present invention, which is consistent with the previously described embodiments, is shown in FIG. 20 which includes a stall detection and recovery capability.

As noted above, FIG. 20 shows an embodiment of the present invention, which is similar to the embodiment shown in FIG. 4A, and which includes a stall recovery device 80. Like the embodiment shown in FIG. 4A, guidance commands, such as acceleration commands $A_Y$ and $A_Z$, are inputted to the autopilot controller 40 and can be transformed to angle of attack $\alpha_{CMD}$, side slip $\beta_{CMD}$, and roll $\phi_{CMD}$ commands by the Y-Z to α-β converter 42 for processing in the autopilot controller 40. Signals from sensors 44 on the vehicle, which can include current vehicle acceleration data $A_{Y\,ACT}$ and $A_{Z\,ACT}$, vehicle body rate data P, Q and R, as well as air density ρ and vehicle airspeed u are also inputted to the autopilot controller 40 where they are transformed to angle of attack $\alpha_{ACT}$, side slip $\beta_{ACT}$, and $\phi_{ACT}$ commands by an Y-Z to α-β converter 46. The commanded signals $\alpha_{CMD}$, $\beta_{CMD}$, and $\phi_{CMD}$, as well as the density ρ and airspeed u data, together with stall status signal 82, are inputted to the stall recovery device 80. As will be explained later, in the event of a stall, the stall recovery device 80 modifies the inputted commands so as to cause the vehicle to recover from the stall. The modified commanded signals $\alpha'_{CMD}$, $\beta'_{CMD}$, and $\phi'_{CMD}$ are output from the stall recovery device 80. These signals, as well as the signals corresponding to the current vehicle operating conditions, are compared in differencing device 48, and error signals $\epsilon_\alpha$, $\epsilon_\beta$, and $\epsilon_\phi$ are generated corresponding to the difference between the respective current operating conditions of the vehicle and the corresponding inputted commands.

As discussed above in regard to the embodiment illustrated in FIG. 4A, the processing unit 50 interprets the current vehicle operating conditions and the presently measured amount of error signal, and, based on stored information representing the vehicle aerodynamic response and other factors, computes control deflections $\delta_{r\,CMD}$, $\delta_{q\,CMD}$, and $\delta_{p\,CMD}$ appropriate for effecting the inputted commands $A_Y$ and $A_Z$. It should be noted that for the embodiment illustrated in FIG. 4A, as well as for the embodiment illustrated in FIG. 20, the signals from the sensors 44 on the vehicle, the current vehicle body rate data P, Q and R, as well as the current vehicle operating conditions $\alpha_{ACT}$ and $\beta_{ACT}$, can be referred to singly or in combination as condition signals.

Figure 21:
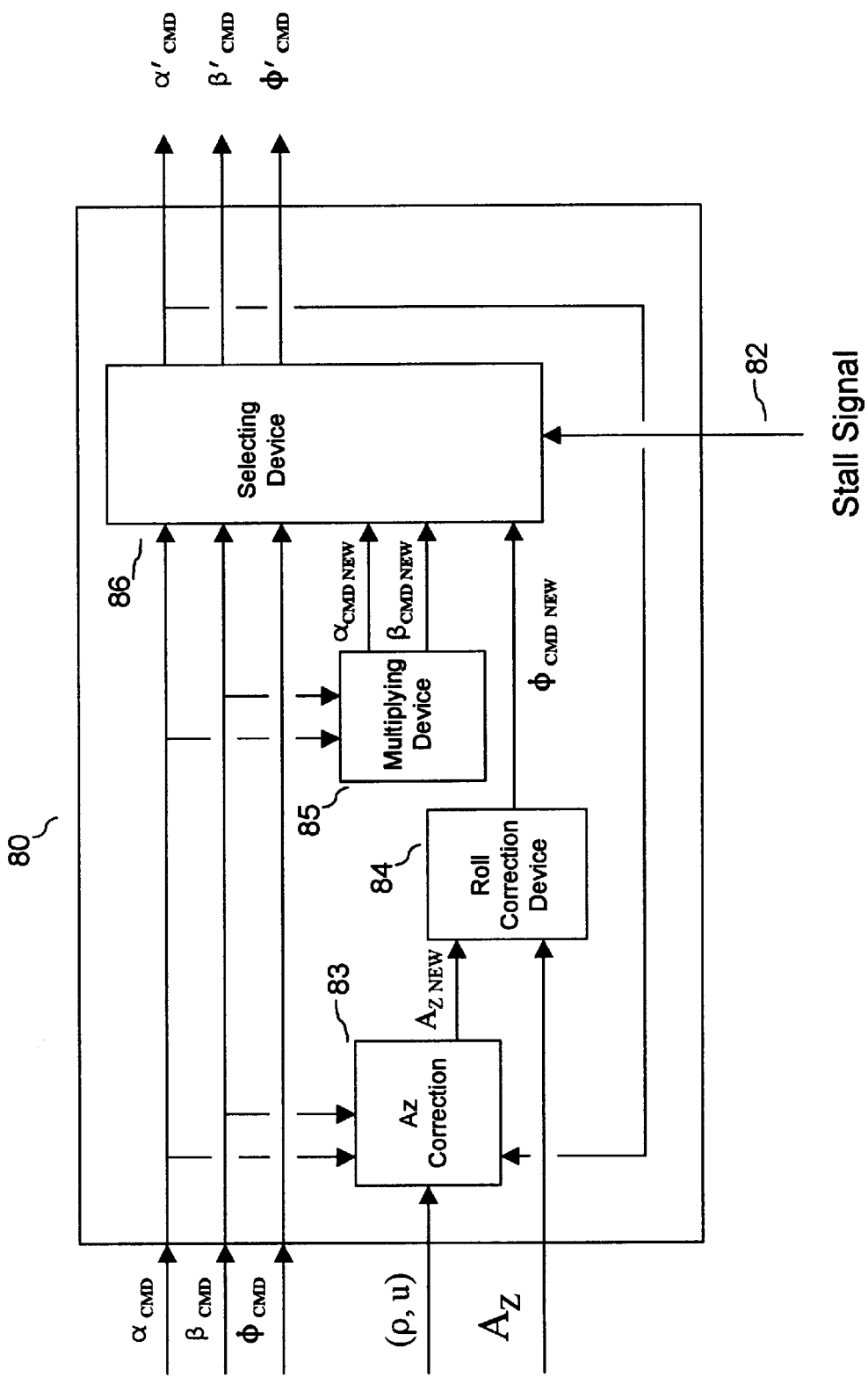
FIG. 21 is a diagram of the stall detection and recovery device of FIG. 20.

The stall recovery device 80 is shown in further detail in FIG. 21. As shown in FIG. 21, the stall recovery device 80 receives the incoming guidance signals, the stall signal 82, and other signals, such as air density $\rho$ and vehicle air speed U. These incoming signals are received by a Az correction device 83 which also receives a modified vertical guidance command $\alpha'_{cmd}$ which will be explained more fully below. The Az correction device 83 transforms the vertical guidance command aCMD into a new acceleration command $A_{Z\ NEW}$, corresponding to the Z axis, which is outputted by the Az correction device 83 and which is received by the roll correction device 84. Roll correction device 84 calculates a new roll channel command $\phi_{CMD\ NEW}$ on the basis of the new acceleration command $A_{Z\ NEW}$ and the original acceleration command $A_Z$ corresponding to the Z axis. Roll correction device 84 generates the new roll channel command $\phi_{CMD\ NEW}$ by performing the following steps. First, a ratio is generated by adding a gravitational constant g to the original acceleration command $A_Z$ corresponding to the Z axis and dividing the sum by the new acceleration command $A_{Z\ NEW}$. This calculation is illustrated by the following equation:

$$\text{Ratio}=(A_Z+g)/A_{Z\ NEW} \qquad (3)$$

Second, a calculation is performed to determine if the ratio is greater than 1.0. If the ratio is greater than zero, then the ratio is reassigned the value of 1.0. Next, a calculation is performed to determine if the ratio is less than −1.0. If the ratio is less than −1.0, then the ratio is reassigned the value of −1.0. Finally, a new roll channel command $\phi_{CMD\ NEW}$ is generated by taking the arc cosine of the ratio. Roll correction device 84 then outputs a signal corresponding to the new roll channel command $\phi_{CMD\ NEW}$.

Next, the multiplying device 85 generates a new vertical guidance command $\alpha_{CMD\ NEW}$ and a new horizontal guidance command $\beta_{CMD\ NEW}$. These new commands are generated by multiplying each of the vertical guidance command and the horizontal guidance command $\alpha_{cmd}$ and $\beta_{cmd}$ by a specified factor. This calculation is illustrated in the following equations.

$$\alpha_{cmd\_new}=\text{factor}*\alpha_{cmd} \qquad (4A)$$

$$\beta_{cmd\_new}=\text{factor}*\beta_{cmd} \qquad (4B)$$

Next, the original guidance commands.($\alpha_{CMD}$, $\beta_{CMD}$, $\phi_{CMD}$) and the new guidance commands ($\alpha_{CMD\ NEW}$, $\beta_{CMD\ NEW}$, $\phi_{CMD\ NEW}$) are provided to a selecting device 86. The selecting device 86 also receives as an input the stall signal 82 which represents the pre stall or post stall condition of the vehicle. When the stall signal 82 indicates that the aircraft is operating at the stall point or in the post stall region, the selecting device outputs the new guidance command signals ($\alpha_{CMD\ NEW}$, $\beta_{CMD\ NEW}$, $\phi_{CMD\ NEW}$) as output signals. On the other hand, when the stall signal 82 indicates that the vehicle is in the pre-stall region, the selecting device outputs the original guidance command signals ($\alpha_{CMD}$, $\beta_{CMD}$, $\phi_{CMD}$) as output signals. The output signals from the selecting device 86 are shown on FIG. 21 as modified vertical channel guidance command $\alpha'_{CMD}$, modified horizontal channel guidance command $\beta'_{CMD}$, and modified roll channel guidance command $\phi'_{CMD}$. The modified vertical channel guidance command $\alpha'_{CMD}$ is provided as a feedback signal to the Az correction device 83 as described earlier.

The stall recovery device 80 can be configured so as to allow temporary operation in the post stall region before modifying the inputted commands to cause the vehicle to recover from the stall. In one embodiment, the stall recovery device 80 can be configured to delay stall recovery for a predetermined period of time to allow temporary operation in the post stall region. In another embodiment, because operation in a post stall region increases the drag produced by the control surface and thus tends to slow the vehicle, the stall recovery device 80 can be configured to delay stall recovery until a predetermined amount of decrease in airspeed is detected thereby allowing temporary operation in the post stall region.

The functions of the stall recovery device can be performed by a computing device such as a microprocessor or digital signal processor. Additionally, the functions of the autopilot controller embodiments previously described, as well as the additional functions of the stall recovery device, can both be performed by the same processor. Accordingly, the autopilot controller architecture shown in FIG. 4B is also appropriate for the case where a stall recovery procedure is included.

5.0 Memory Device and Computer Program

As aspects of the present invention can be implemented in software running on a computing device, the present invention is considered to include not only an autopilot controller per se, but a memory device having stored executable instructions therein for use with an autopilot, as well as a computer program which includes executable instructions suitable to implement the inventive control process when executed by an appropriate processing device.

Figure 22A:
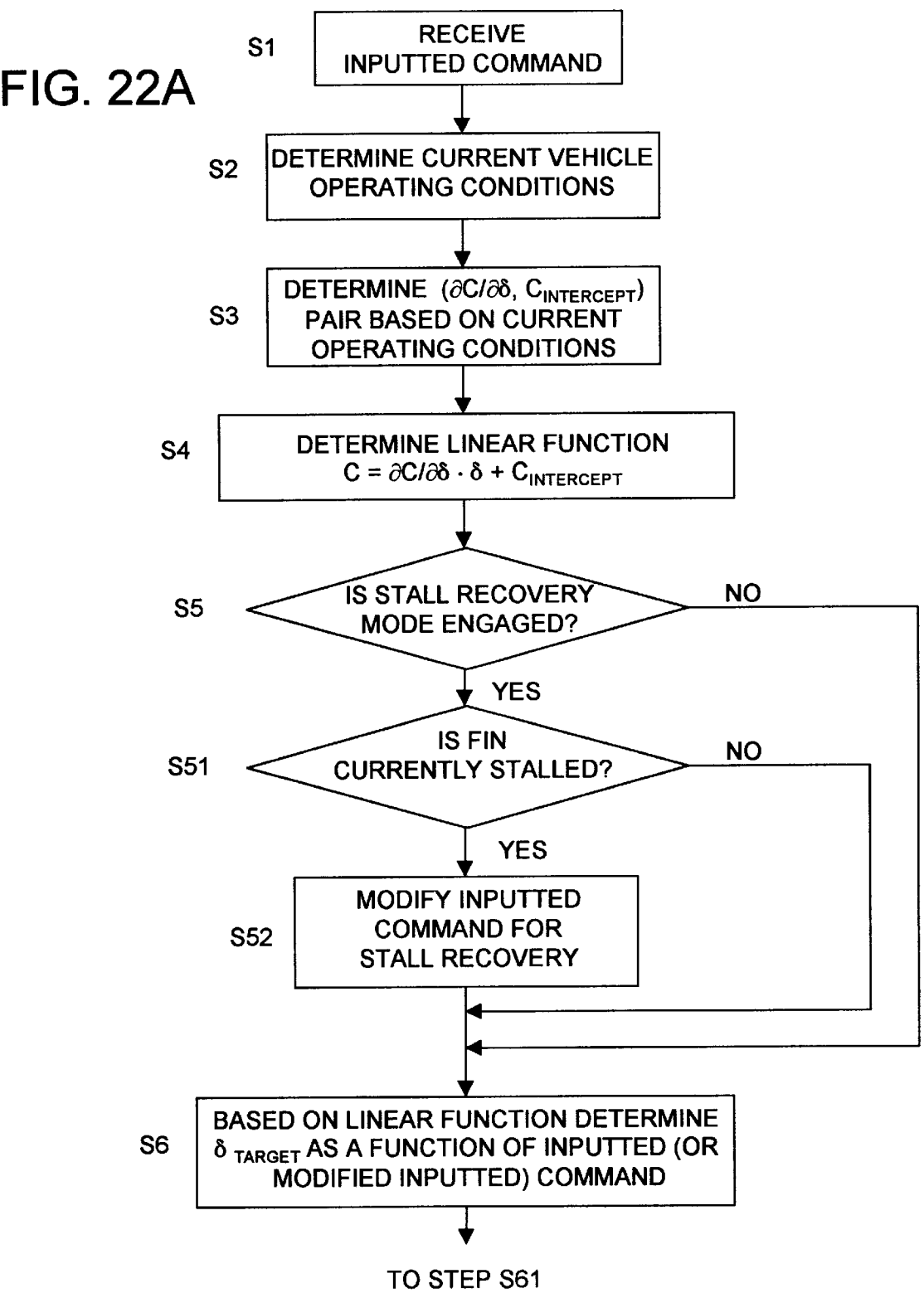
FIGS. 22A–22B are flow charts illustrating the operation of a preferred embodiment of the present invention.
Figure 22B:
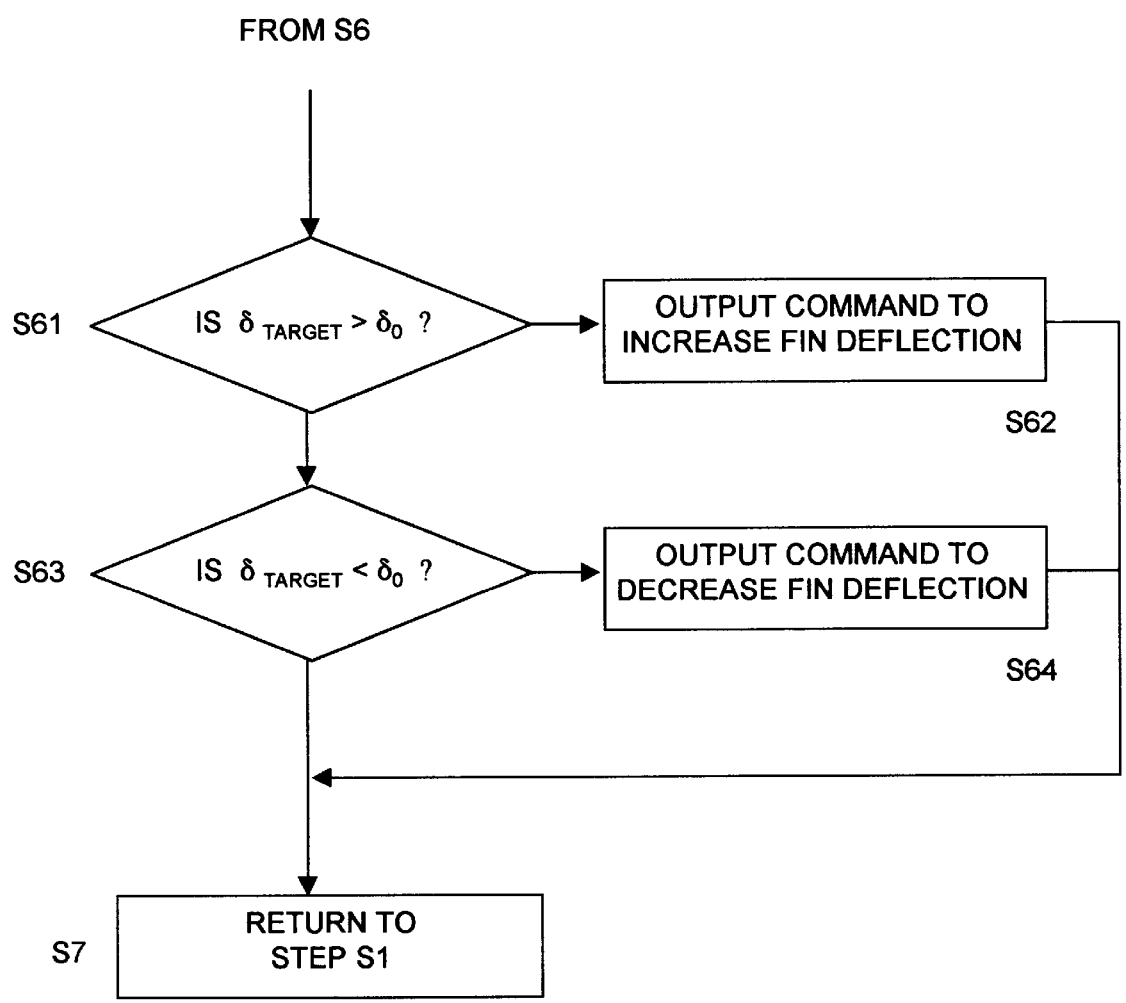

FIGS. 22A and 22B illustrate the steps followed by an implementation of the present embodiment in a computer program in accordance with the above disclosure. FIG. 22A illustrates a first step S1 where an inputted command is received, at which time the current vehicle operating conditions are determined in step S2. Based on the current operating conditions, and based on the stored data corresponding to, or representative of, the $C_N$, $C_Y$, $C_A$, $C_m$, $C_l$, and $C_{yn}$ force and moment functions, the corresponding ($\partial C/\partial \delta$, $C_{intercept}$) pair is then determined in the step S3. Given the ($\partial C/\partial \delta$, $C_{intercept}$) pair corresponding to the current operating conditions, the linear function $C=(\partial C/\partial \delta)\cdot\delta+C_{intercept}$ from which the outputted fin deflection will ultimately be determined is determined in the next step S4. FIG. 22A illustrates an embodiment of the present invention which includes a selectable stall recovery mode. Thus, in the next step S5, the inquiry is made as to whether the stall recovery mode has been set. If the stall recovery mode is not set in step S5 (NO), the flow chart skips to step S6. If the stall recovery mode is set in step S5 (YES), then a second inquiry is made in step S51 as to whether the fin (or other control surface) is presently at the stall point or in a post stall region. If the fin is in the pre stall region, the processing flows to step S6. If the fin is at the stall point or in a post stall region, then at step S52 the originally inputted command is modified so as to effect a stall recovery and the processing continues to step S6 with the inputted command thus modified.

Having determined, based on the stall recovery subroutine, whether the originally inputted command or a modified inputted command is to be used, the processing proceeds to step S6. At step S6, the inputted command or a modified inputted command is compared to the linear function and a target fin deflection $\delta_{target}$ is determined, which is suitable for effecting the commanded maneuver. As shown in FIG. 22B, given the target fin deflection $\delta_{target}$, which is determined in step S6, the fin output commands are determined in steps S61–S64 to increase, decrease or make no change in the fin position, so as to effect the commanded maneuver. Finally, after each iteration of the processing described above in steps S1–S7 is completed, the processing returns to step S1 so that steps S1–S7 are continually repeated in an iterative manner.

6.0 Static Controller

As discussed in sections 1.0 and 2.0 above, one issue with the approach of controlling the vehicle based on the vehicle response characteristics which correspond to the $C_N$ normal force occurs at the point of stall at which point $\partial C_N/\partial \delta$ is zero. Thus, at stall, a singularity occurs in the vehicle dynamic response function. As will be described in this section, another aspect of the current invention is controlling the vehicle at, and near, the stall point by controlling the normal force $C_N$ acting on the vehicle based on the vehicle body pitch moment $C_m$ response characteristics. As the following will more fully explain, use of the body pitch moment characteristics, in lieu of the $C_N$ normal force response characteristics, avoids the problem with a singularity in the $C_N$ response function at the stall point.

Figure 23A:
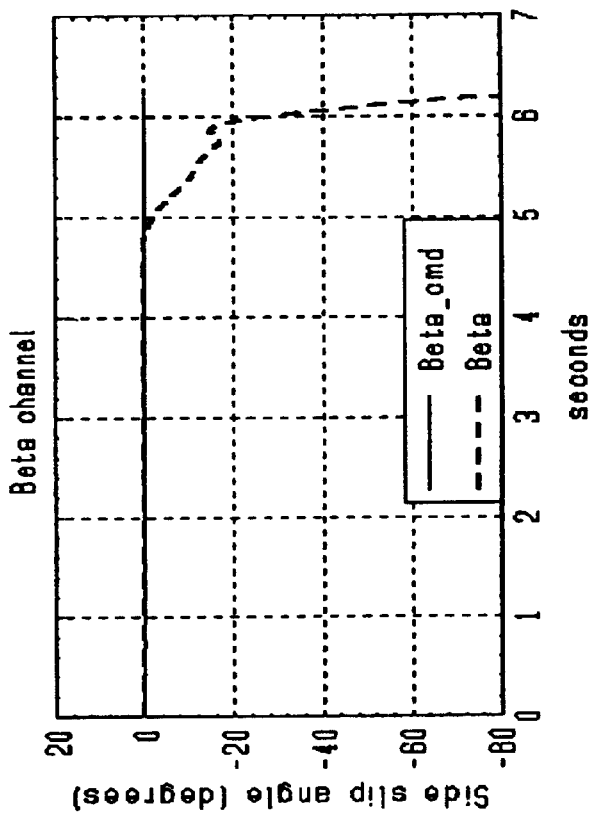
FIGS. 23A–23H illustrate the simulated response of a particular vehicle to a maneuver using a dynamic controller in accordance with the present invention.
Figure 23B:
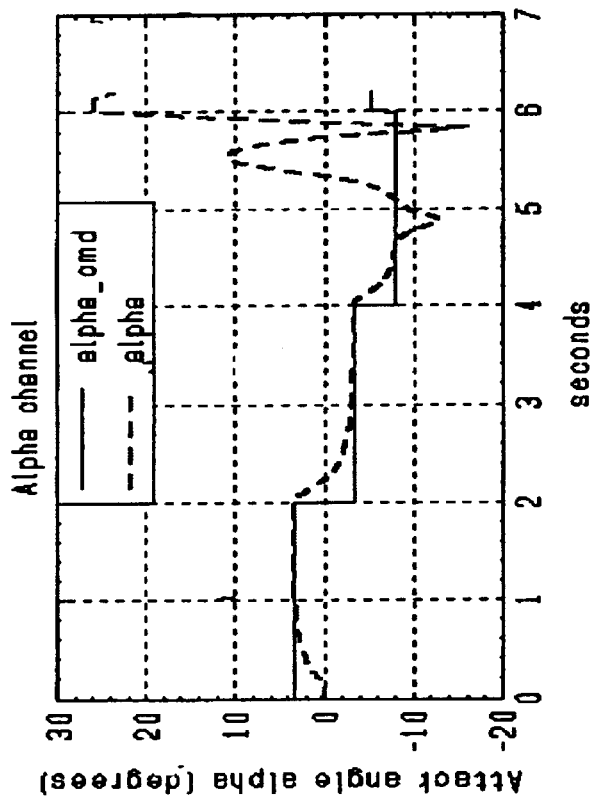
Figure 23D:
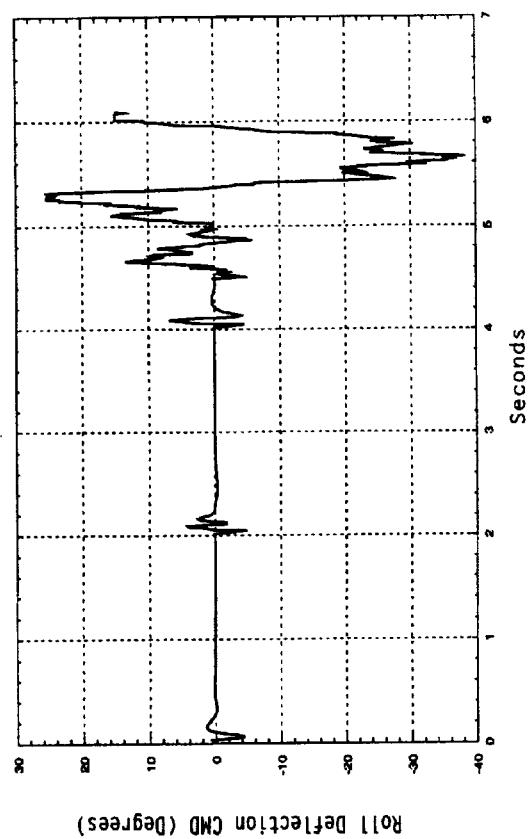
Figure 23C:
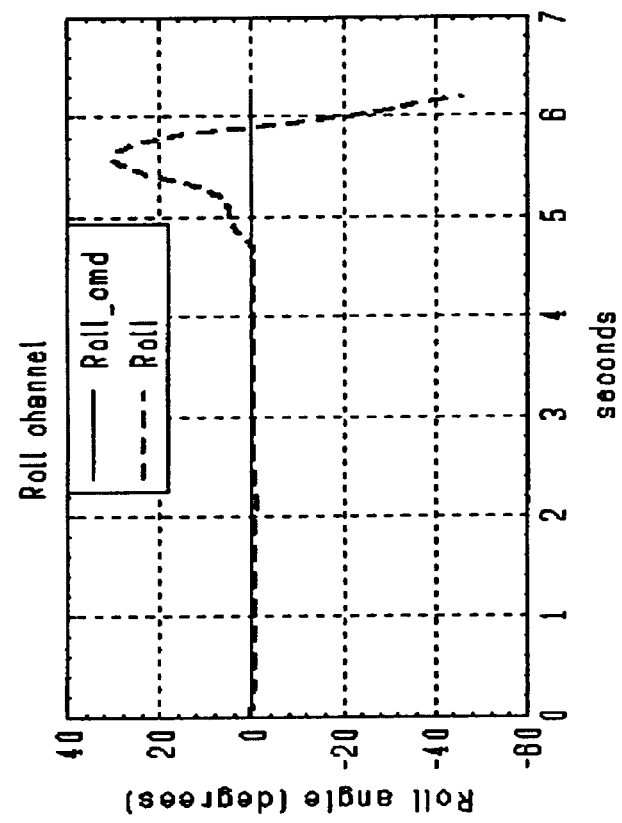
Figure 23F:
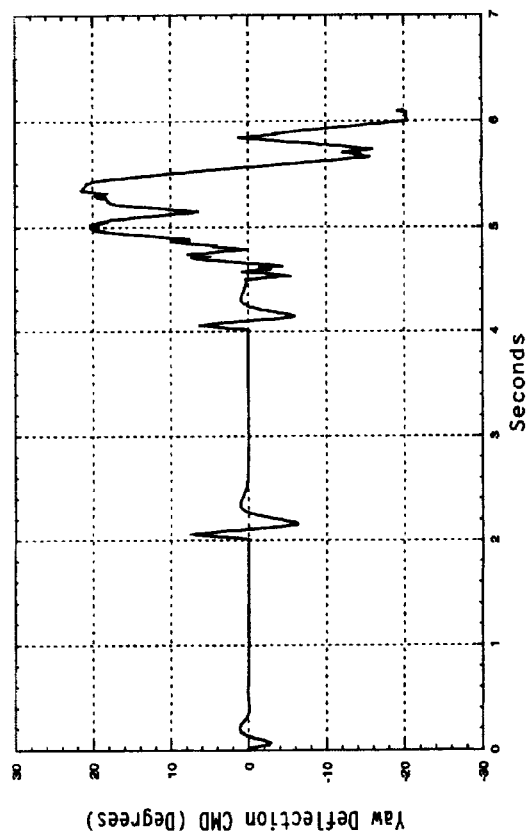
Figure 23E:
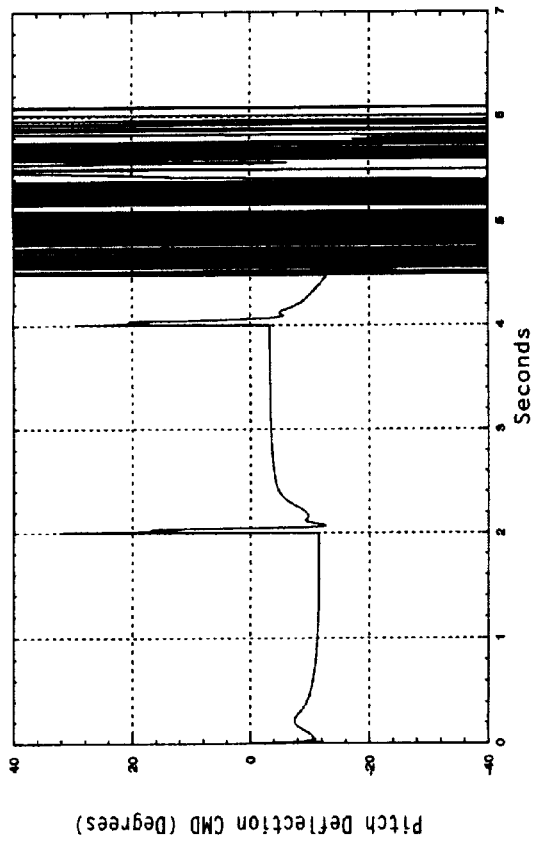
Figure 23H:
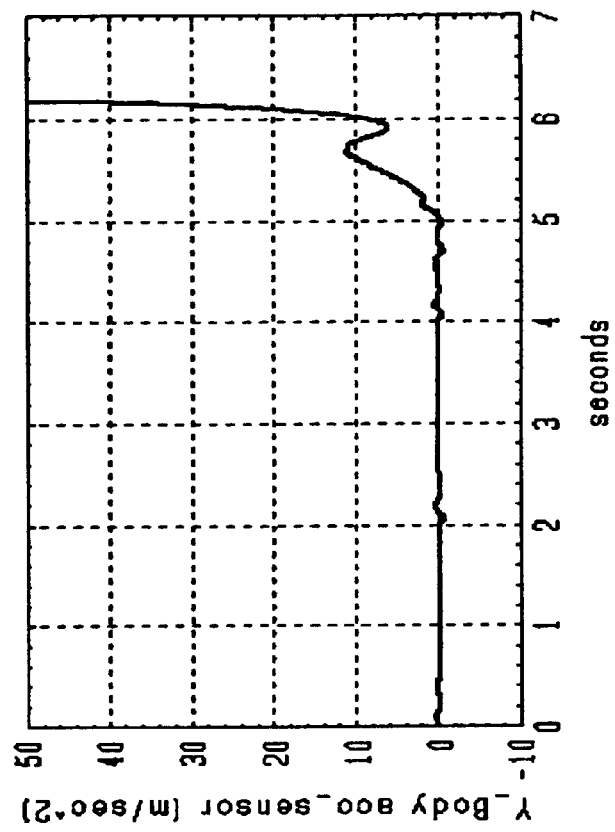
Figure 23G:
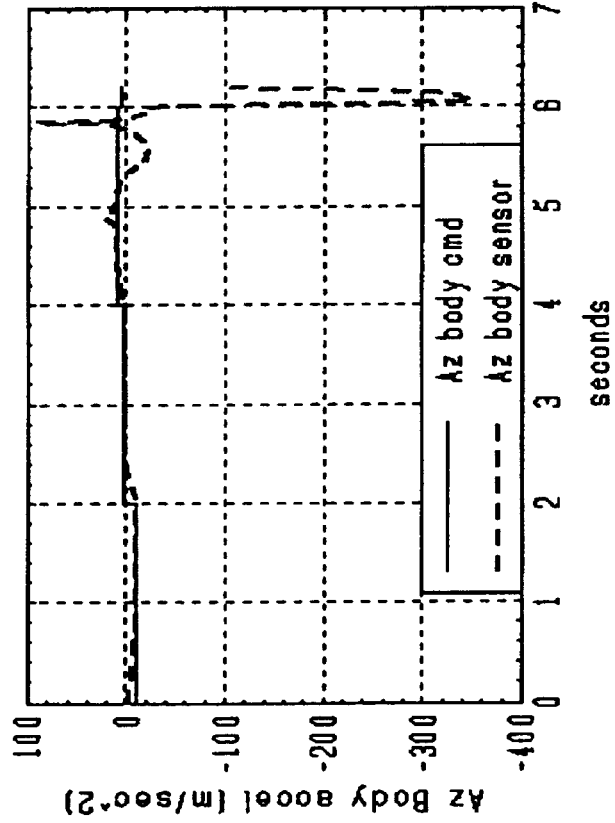

FIGS. 23A–23H illustrate the response of a particular vehicle to a commanded maneuver in a controller which is susceptible to the problem of a singularity in the dynamic response function at the stall point. FIG. 23A illustrates a vertical channel guidance command $\alpha_{CMd}$ (solid line) and the vehicle response of the previously described autopilot controller over a period of time from 0 to 7 seconds. In FIG. 23A, it can be seen that the simulated response (dashed line) tracks the command line very closely except for the period approximately between five and six seconds. FIG. 23B illustrates a horizontal guidance command $\beta_{CMD}$ (solid line) and the simulated response (dashed line) of the previously described autopilot controller over the period of time from 0 to 7 seconds. FIG. 23C illustrates a roll channel guidance command $\phi_{CMD}$ (solid line) and the simulated response (dashed line) over the period of time from 0 to 7 seconds. FIGS. 23D–23F illustrate the roll, pitch and yaw control commands, respectively, (previously referred to as control deflections $\delta_{r\ CMD}$) $\delta_{q\ CMD}$, and $\delta_{p\ CMD}$) during the period of time from 0 to 7 seconds. FIG. 23G illustrates an acceleration command corresponding to the z-axis ($A_{z\ CMD}$—solid line) and the simulated response (dashed line) over the period of time from 0 to 7 seconds. In FIG. 23G, it can be seen that the simulated response (Az body sensor) tracks the command (Az body cmd) well, but exhibits a deviation following the time of about 4.8 seconds. During this time period, the simulated body acceleration corresponding to the z-axis (Az body sensor) jumps from approximately zero up ^2. to about 80 m/sec^2 and then falls to about −340 m/secp This jump in z-axis acceleration can be attributed to the fact that the vehicle is entering a fin stall region of operation. FIG. 23H illustrates the simulated response of the acceleration of the vehicle along the y-axis over the period of time from 0 to 7 seconds.

Figure 24B:
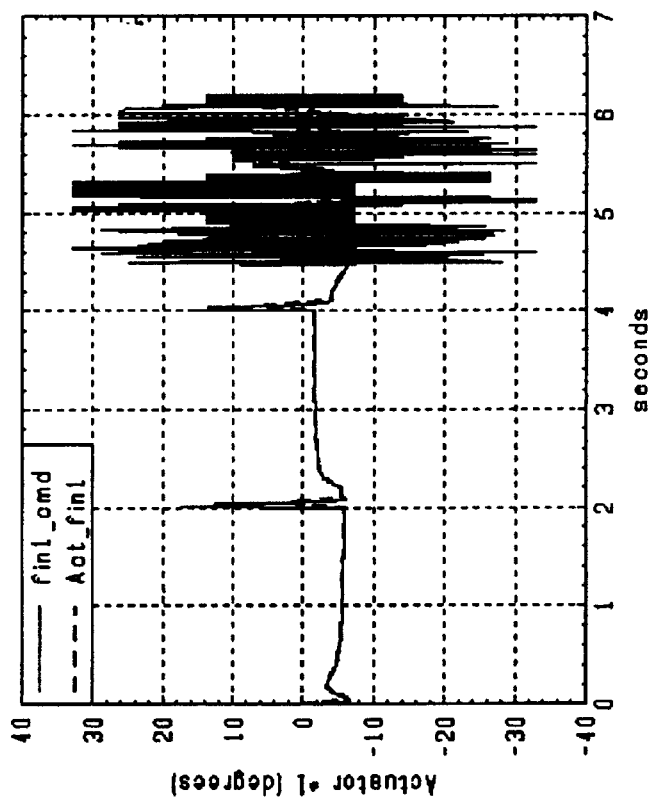
FIGS. 24A–24D illustrate the simulated response of a particular vehicle to a maneuver using a dynamic controller in accordance with the present invention.
Figure 24A:
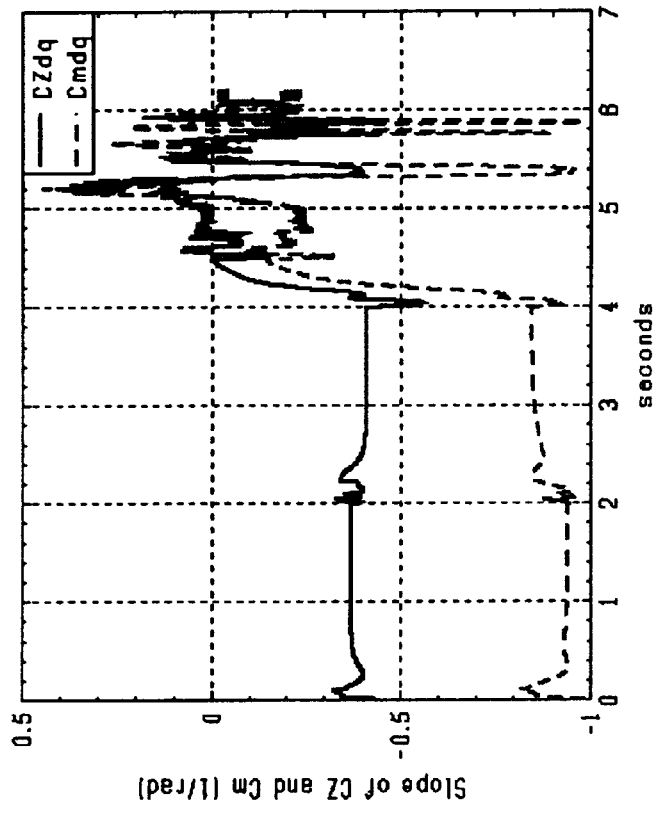

FIG. 24A illustrates the simulation results where the autopilot's determination of the slope of the $C_Z$ curve with respect to control surface deployment (CZdq) and the autopilot's determination of the slope of the $C_m$ curve with respect to control surface deployment (Cmdq) are shown during the same maneuver illustrated in FIGS. 23A–23 H. It should be noted that a $C_Z$ curve for a vehicle is typically the inverse of a $C_N$ curve for the vehicle. Accordingly, a positive slope for a $C_Z$ curve corresponds to a negative slope on a $C_N$ curve. Accordingly, a positive slope for a $C_Z$ curve indicates a stall condition. In FIG. 24A, it can be seen that the slope of the $C_Z$ curve with respect to control surface deployment (CZdq) goes positive for a portion of the maneuver between 4.5 and 6.2 seconds. However, it should be noted that during the time period from about 4.5 seconds to about 5.2 seconds where the slope of the $C_Z$ curve with respect to control surface deployment (CZdq) is positive (i.e., above zero), the slope of the $C_m$ curve with respect to control surface deployment (Cmdq) remains in the negative region (below zero).

Figure 24C:
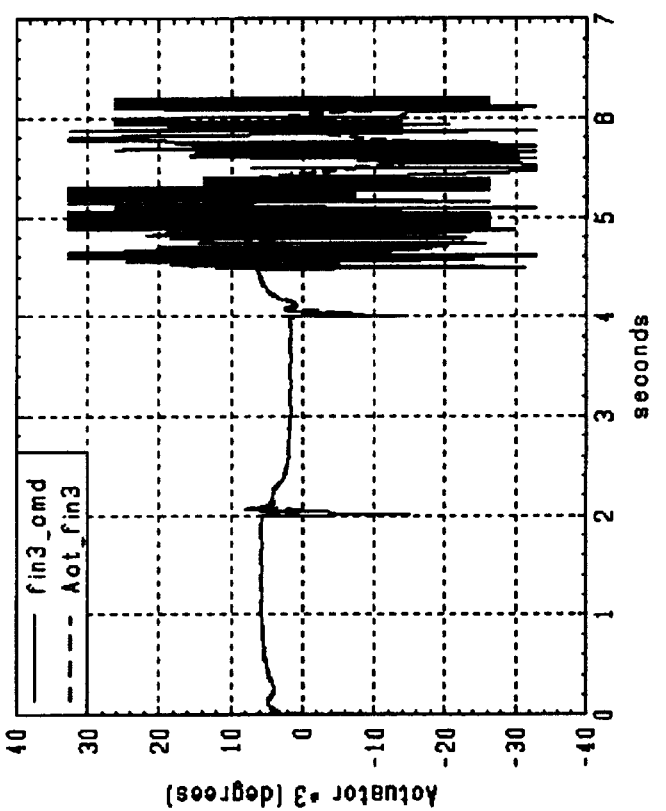
Figure 24D:
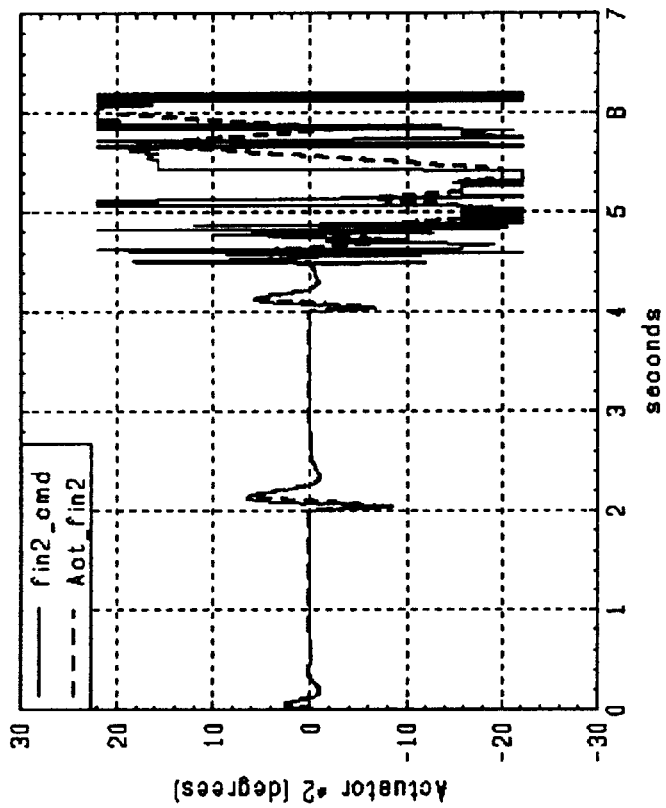

FIGS. 24B–24D illustrate how three control surfaces are actuated for the maneuver described above and illustrated in FIGS. 23A–23H and 24A. FIG. 24B illustrates the simulated response of an actuator (actuator #1) that controls a control surface that is parallel to the y-axis of the vehicle. FIG. 24C illustrates the simulated response of another actuator (actuator #2) that controls a control surface that is parallel to the z-axis of the vehicle. FIG. 24D illustrates the simulated response of an actuator (actuator #3) that controls a control surface that is parallel to the y-axis of the vehicle, but is located on the opposite side of the vehicle from actuator #1. Each of plots 24B–24D includes the outputted fin command (solid line) and the simulated response of the fin actuator (dashed line).

As noted above, at the point of stall, a singularity occurs in the dynamic response function so that the solution of the response function becomes undefined. A result of the singularity can be seen in the outputted fin commands shown in FIGS. 24B–24D. In each of the three plots, as a result of the singularity in the dynamic response function, the outputted fin command become erratic for the time period between about 4.5 and 6.2 seconds during which time the vehicle is at or near stall.

It should be noted, in the illustrated simulation, that the frequency response of the modeled fin actuator is lower than the outputted frequency of the command signal. Accordingly, while the amplitude of the outputted command signal (solid line) varies widely during the time period of about 4.5 to 6.2 seconds, the amplitude of the response of the actuator (dashed line) varies much less dramatically. Accordingly, as illustrated in FIGS. 24B–24D, the fin actuator may act like a low-pass frequency filter for the command signal.

As a result of the fin command oscillations, control of the vehicle may be lost. Accordingly, it is desirable to minimize or eliminate such oscillations in the fin commands.

As discussed in Section 2.0, the dynamic response of the vehicle can be expressed mathematically such as in equation (16) (or such as in equation (18) where the aerodynamic function has been rewritten in slope and intercept format). As noted in Section 2.0, these expressions, and variations on these expressions, can be used to determine a fin deflection suitable for achieving a desired amount of force acting on the vehicle. However, because these expressions include the term $C'_{Z\delta_q}$ (the slope of the fin aerodynamic function) which goes to zero at stall, a singularity problem with the dynamic response function occurs at the point of stall.

Accordingly, as further discussed in Section 2.0, according to another aspect of the present invention, an approach which avoids the problem with the singularity at the point of stall is to use a control approach based on the vehicle body pitch moment response characteristics. In the following discussion, the control approach based on the body pitch moment response characteristics is termed the "static" controller.

The approach of the static controller is to neglect all of the terms in equation (18) which are multiplied by $C'_{Z\delta_q}$ and, by using equation (8) for the moment M, and by substituting a slope-intercept format for the moment-based aerodynamic function, a closed form solution for the fin deflection may be obtained as expressed in equation (20).

The closed form solution of equation (20) provides a relationship between the amount of the current error signal (i.e., the difference between the presently received command and the current condition of the vehicle) and the fin deflection which would be suitable to effect the received command. It should be noted that the closed form solution of equation (20) does not depend on $C'_{Z\delta_q}$ (the slope of the force-based aerodynamic response function). Thus, because $C'_{Z\delta_q}$ has been removed from the expression, the problem with the dynamic response function having a singularity at the point of stall is avoided. Instead of the slope of the force-based aerodynamic response function, the expression of equation (20) includes only the $C_N$ Intercept vehicle characteristics and the Cm moment-related vehicle characteristics, both of which are non-zero at the stall point.

Like the dynamic vehicle response function of equation (18), the static response function of equation (20) does not provide one-to-one mapping between a given force or moment which is received as an inputted command and a corresponding fin deflection which should be outputted for achieving the desired force or moment. Accordingly, even when body pitch moment control is used, one of the one-to-one mapping techniques described above in section 1.2 is still required so that the autopilot controller can have some mechanism for determining which one of the plurality of potentially suitable fin deflection angles should be outputted. Because the approaches for providing one-to-one mapping are described in detail in Section 1.2, a duplicate description at this point is omitted.

As discussed in Section 2.4.1, the performance of the static controller is particularly close to the performance of the dynamic controller when the damping term (which is proportional to the fin moment arm) of the response function is sufficiently large. In this situation, for a given force received as an inputted command, the outputted control command determined by either the dynamic or static approach are nearly equivalent.

Figure 25:
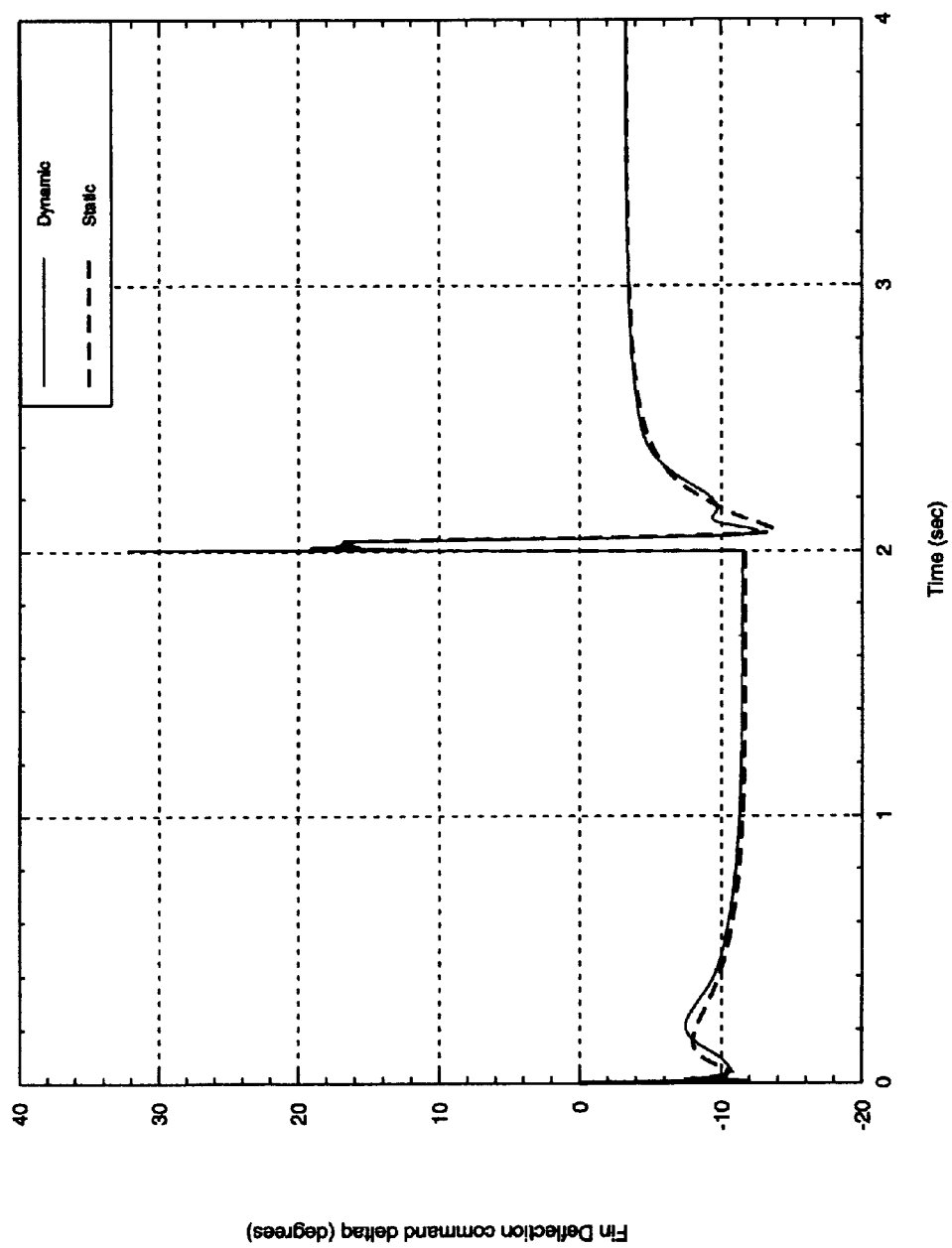
FIG. 25 provides a comparison, for the maneuver illustrated in FIGS. 23A–23F and FIGS. 24A–24D, of the simulated control deflection commands which are outputted by each of a dynamic controller and a static controller in accordance with the present invention.

FIG. 25 is a plot of the outputted fin deflection command for the maneuver depicted in FIGS. 23A–23H and 24A–24D. As is apparent from FIG. 25, the outputted control command based on the dynamic approach (solid line) is nearly equivalent to the outputted control command based on the static approach (dashed line).

As noted previously, the static response function of equation (20) has a singularity where the slope of Cm goes to zero. The point of zero slope of Cm, however, is not coincident with the point of fin stall of the vehicle. Accordingly, any control instability which results from a zero slope of the moment-based expression is away from the point of stall of the vehicle. Thus, the problem described above of oscillations in the fin control commands for the dynamic controller at the point of stall can be avoided.

The static controller is more fully described next in reference to FIGS. 26A–26F. FIGS. 26A–26F illustrate the response of a particular vehicle to the same commanded maneuver depicted in FIGS. 23A–23F but where an autopilot in accordance with the static controller is used.

Figure 26B:
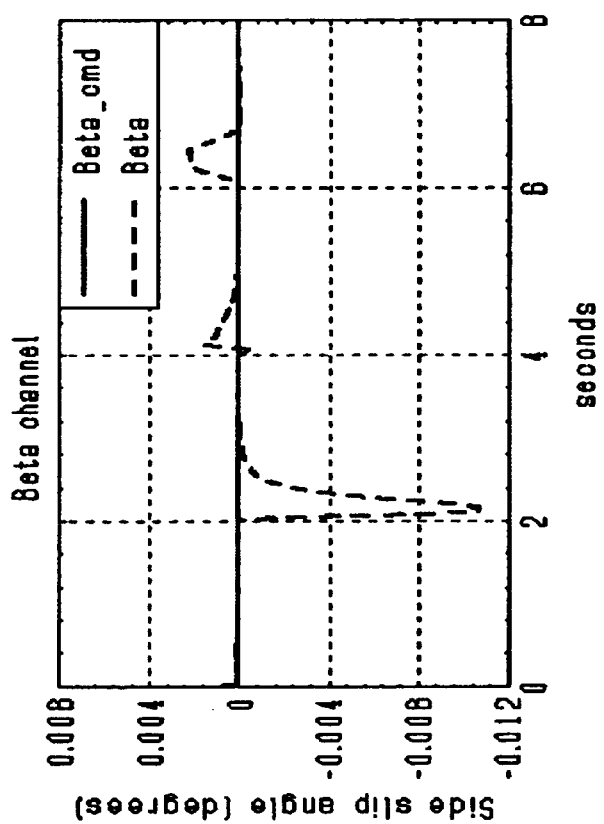
FIGS. 26A–26F illustrate the simulated response of a particular vehicle to a maneuver using a static controller in accordance with the present invention.
Figure 26A:
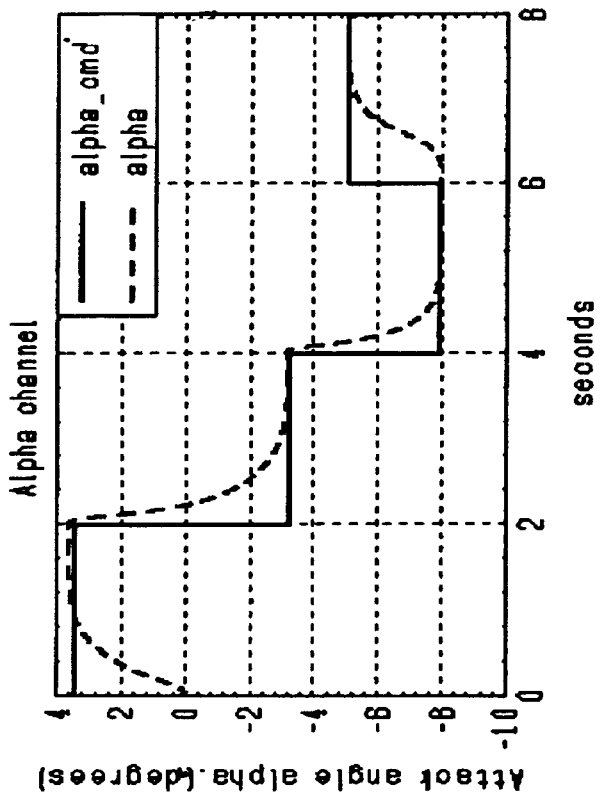
Figure 26D:
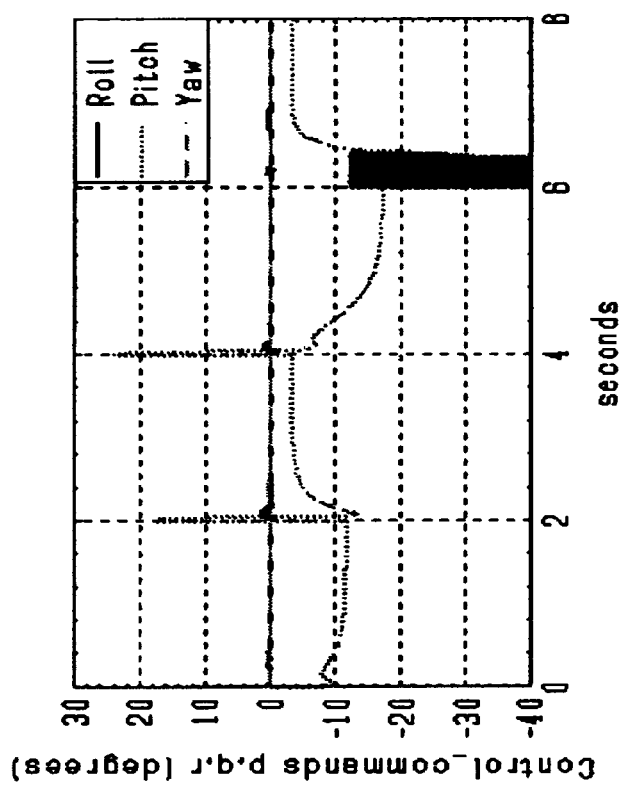
Figure 26C:
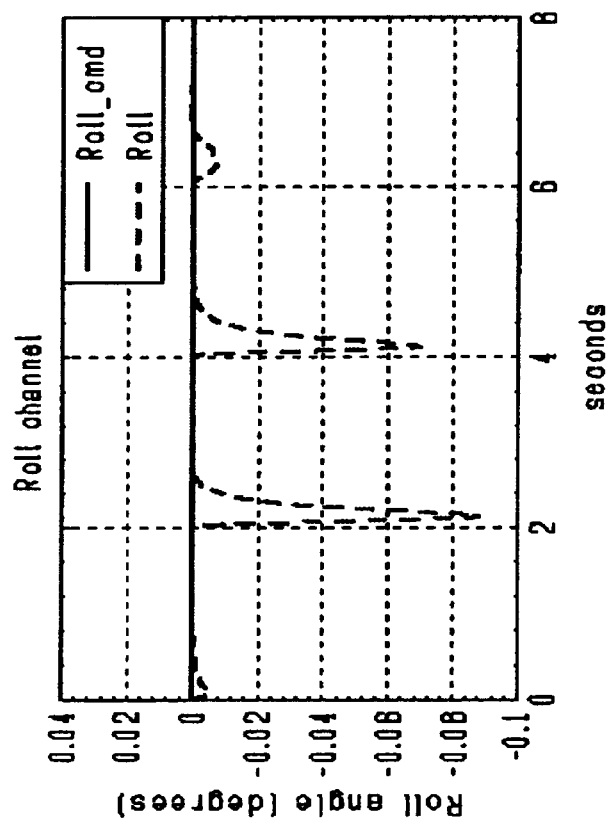
Figure 26E:
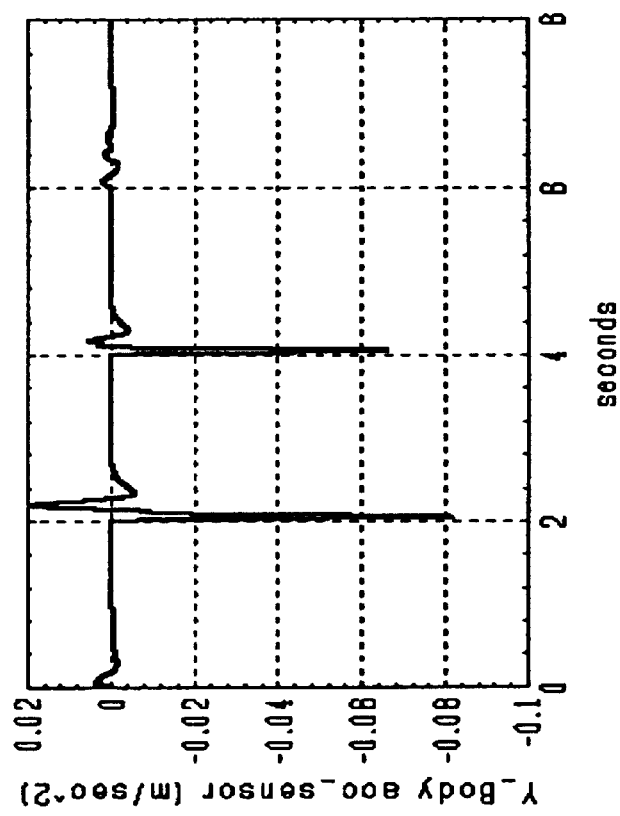
Figure 26F:
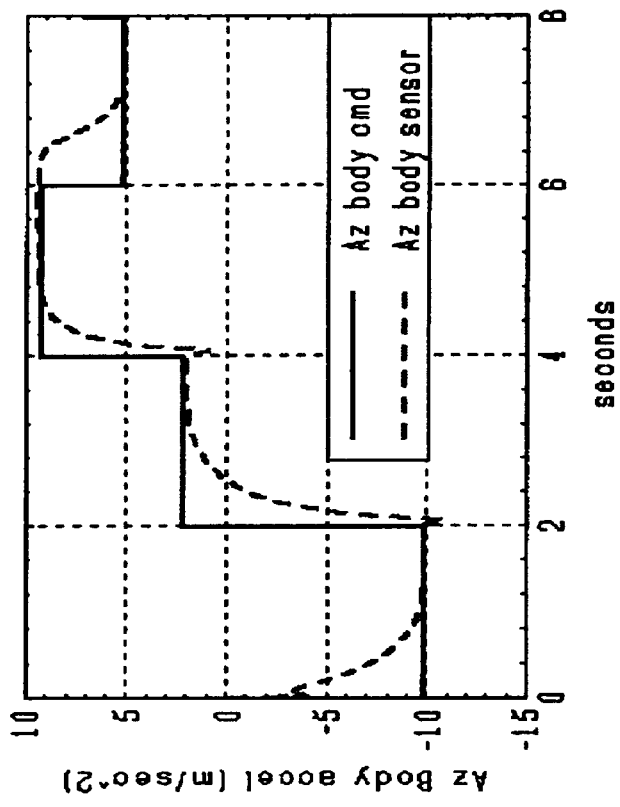

FIG. 26A illustrates a vertical channel guidance command $\alpha_{CMD}$ (solid line) and the vehicle response of the previously described autopilot controller over a period of time from 0 to 8 seconds. In FIG. 26A, it can be seen that the simulated response (dashed line) tracks the command line very closely. FIG. 26B illustrates a horizontal guidance command $\beta_{CMD}$ (solid line) and the simulated response (dashed line) of the previously described autopilot controller over the period of time from 0 to 8 seconds. FIG. 26C illustrates a roll channel guidance command $\phi_{CMD}$ (solid line) and the simulated response (dashed line) over the period of time from 0 to 8 seconds. FIG. 26D illustrates the p, q, and r control commands (previously referred to as control deflections $\delta_{r\ CMD}$, $\delta_{q\ CMD}$, and $\delta_{p\ CMD}$) during the period of time from 0 to 8 seconds. FIG. 26E illustrates an acceleration command corresponding to the z-axis ($A_{Z\ CMD}$—solid line) and the simulated response (dashed line) over the period of time from 0 to 8 seconds. In FIG. 26E, it can be seen that the simulated response (Az body sensor) tracks the command (Az body cmd) well, including during the time period of about 4.0 to 5.0 seconds where, as will be explained later, a fin stall occurs. FIG. 26F illustrates the simulated response of the acceleration of the vehicle along the y-axis over the period of time from 0 to 8 seconds.

Figure 27A:
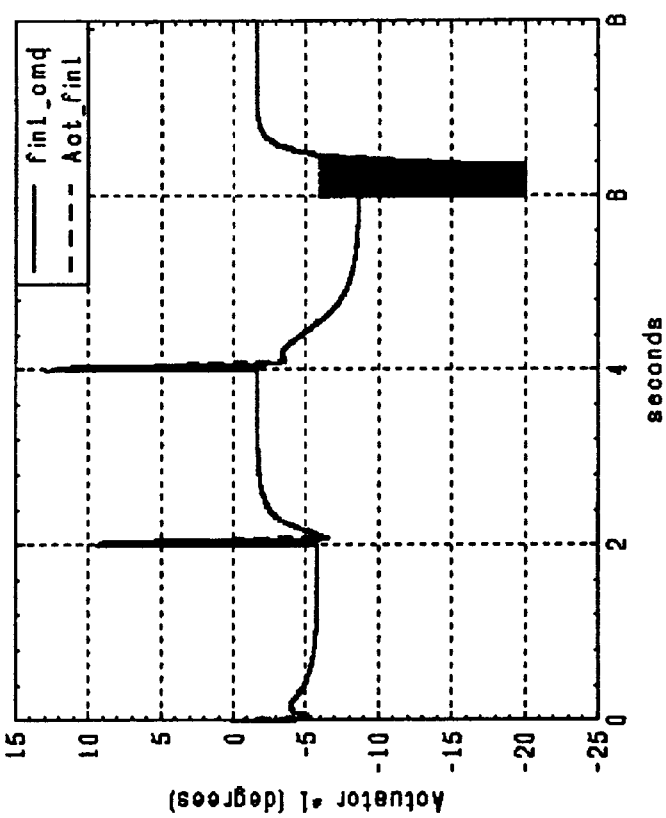
FIGS. 27A–27D illustrate the simulated response of a particular vehicle to a maneuver using a static controller in accordance with the present invention.

FIG. 27A illustrates the simulation results where the autopilot's determination of the slope of the $C_Z$ curve with respect to control surface deployment (CZdq) and the autopilot's determination of the slope of the Cm curve with respect to control surface deployment (Cmdq) are shown during the same maneuver illustrated in FIGS. 26A–26F. As noted previously, a $C_Z$ curve for a vehicle is typically the inverse of a $C_N$ curve for the vehicle. Accordingly, a positive slope for a $C_Z$ curve corresponds to a negative slope on a $C_N$ curve. Accordingly, a positive slope for a $C_Z$ curve indicates a stall condition. In FIG. 27A, it can be seen that the slope of the $C_Z$ curve with respect to control surface deployment (CZdq) goes positive for a portion of the maneuver between 4.8 and 6.4 seconds. However, it should be noted that during this same time period, where the slope of the $C_Z$ curve with respect to control surface deployment (CZdq) is positive (i.e., above zero), the slope of the $C_m$ curve with respect to control surface deployment (Cmdq) remains in the negative region (below zero). Additionally, during the time of approximately 4.8 to 6.4 seconds, the Az body acceleration shown in FIG. 26E does not show the drop off as found in the dynamic controller simulation shown in FIG. 23E. Thus, the simulation shown in FIGS. 26A–26F illustrate that by use of the static controller, the vehicle may be flown through the point of stall without loss of control or control command oscillations.

Figure 27B:
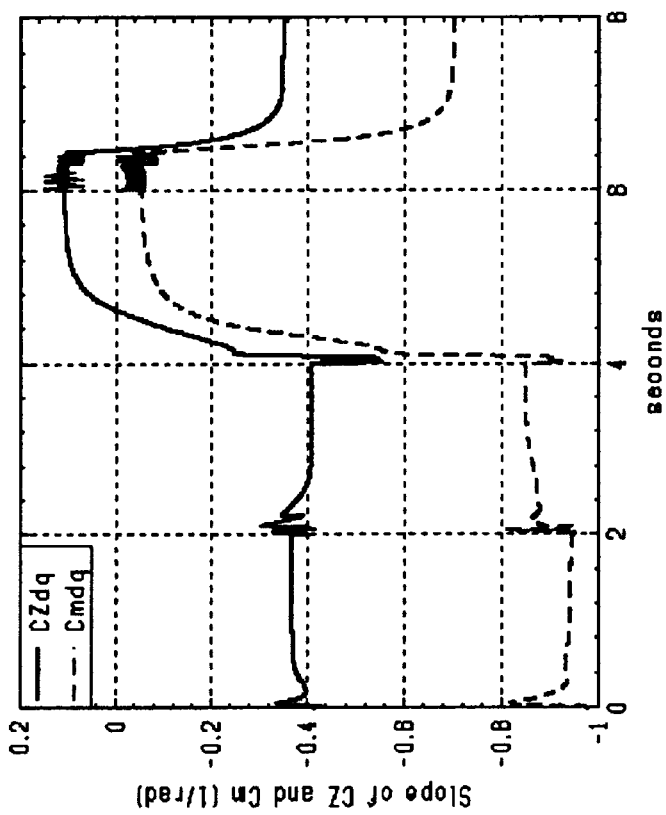
Figure 27C:
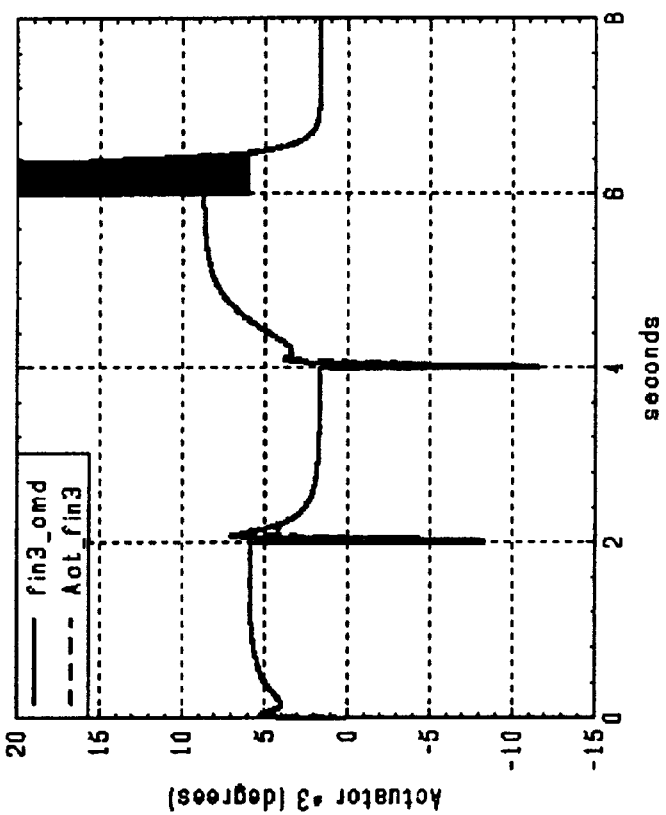
Figure 27D:
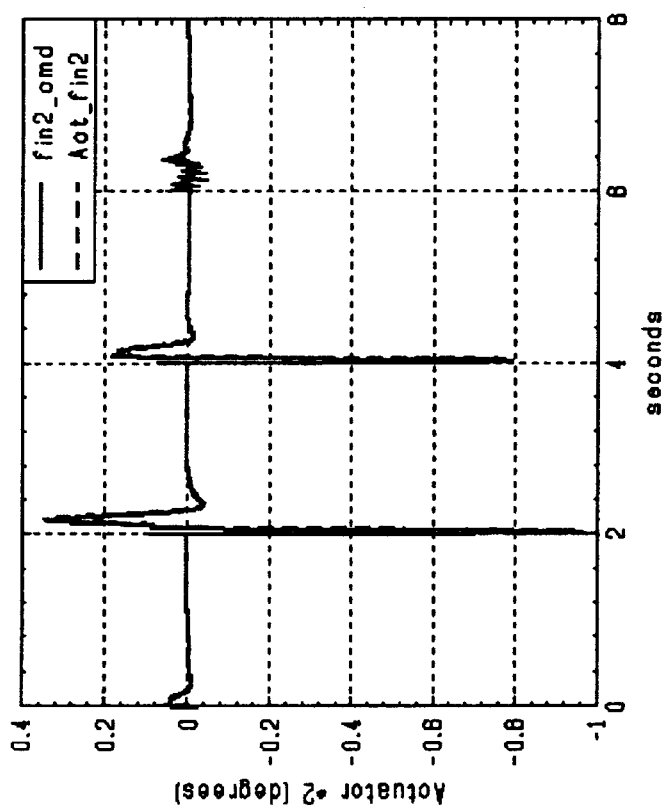

FIGS. 27B–27D illustrate how three control surfaces are actuated for the maneuver described above and illustrated in FIGS. 26A–26F and 27A. FIG. 27B illustrates the simulated response of an actuator (actuator #1) that controls a control surface that is parallel to the y-axis of the vehicle. FIG. 27C illustrates the simulated response of another actuator (actuator #2) that controls a control surface that is parallel to the z-axis of the vehicle. FIG. 27D illustrates the simulated response of an actuator (actuator #3) that controls a control surface that is parallel to the y-axis of the vehicle, but is located on the opposite side of the vehicle from actuator #1. Each of plots 27B–27D includes the outputted fin command (solid line) and the simulated response of the fin actuator (dashed line). Each of FIGS. 27B–27D includes the outputted fin command (solid line) and the simulated response of the fin actuator (dashed line).

Figure 28A:
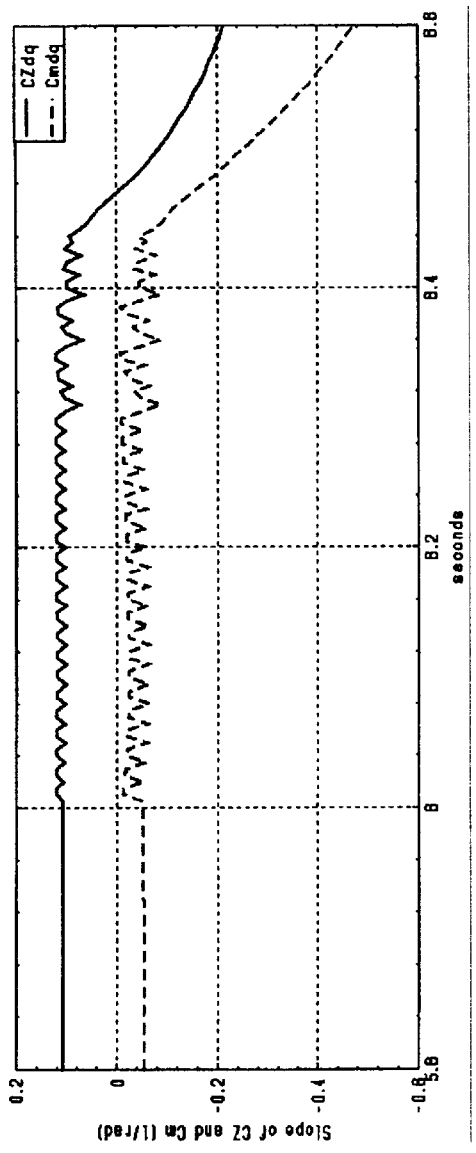
FIGS. 28A–28B illustrate, for a shorter time period, the simulated response of a particular vehicle to a maneuver that is shown in FIGS. 27A–27D.

FIG. 28A illustrates, for a shorter time period, the simulation results depicted in FIG. 27A. Specifically, FIG. 28A illustrates, for an approximately one second time period, the simulation results of the autopilot's determination of the slope of the $C_Z$ curve with respect to control surface deployment (CZdq) and the autopilot's determination of the slope of the $C_m$ curve with respect to control surface deployment (Cmdq) for the same maneuver illustrated in FIGS. 26A–26F.

Figure 28B:
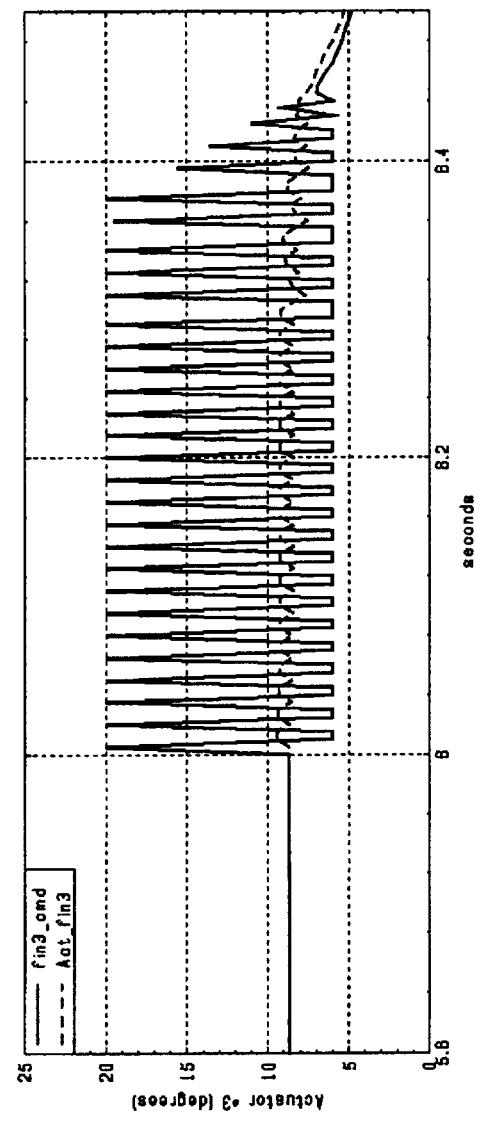

FIG. 28B illustrates, for a shorter time period, the simulation results depicted in FIG. 27D. Specifically, FIG. 28B illustrates, for an approximately one second time period, the simulated response of an actuator (actuator #3) that controls a control surface that is parallel to the y-axis of the vehicle, but is located on the opposite side of the vehicle from actuator #1. As can be seen in FIG. 28B, the amplitude of the response of an actuator (Act_fin3) is lower than the amplitude of the outputted fin command signal (fin3_cmd) due to the frequency response of the fin actuator.

As noted above, at the point of stall, a singularity occurs in the dynamic response function so that the solution of the dynamic response function becomes undefined. Similarly, at a point in the post stall region, a singularity occurs in the static response function so that the solution of the static response function becomes undefined. A result of the singularity in the static response function can be seen in the outputted fin commands shown in FIGS. 27B–27D. In each of the three plots, as a result of the singularity in the static response function, the outputted fin command become erratic for the time period between about 6.0 and 6.4 seconds during which time the vehicle is operating in the post stall region.

According to yet another aspect of the present invention, by selectively mixing the control techniques between the dynamic control in accordance with equation (18) and the static control in accordance with equation (20) depending on the current flight regime of the vehicle, the vehicle can be controlled across the entire range of the pre-stall region, the stall region and the post-stall region without encountering the erratic oscillations in the outputted fin command which result from a singularity in the control response function.

Specifically, as described more fully below, by switching between controlling the vehicle based on the dynamic controller of equation (18) when the vehicle is not near a stall condition and controlling the vehicle based on the static controller of equation (20) when the vehicle is near a stall condition, the singularities which affect each of the dynamic and static controllers can be avoided across the entire range of the pre-stall region, the stall region and the post-stall region.

As described in Section 4.0 above, one aspect of the present invention includes a stall detection and recovery device. The stall detection device employs signals from sensors 44 on the vehicle, which can include current vehicle acceleration data $A_{Y\_ACT}$ and $A_{Z\_ACT}$, vehicle body rate data P, Q and R, as well as air density $\rho$ and vehicle airspeed u are also inputted to the autopilot controller 40 where they are transformed to angle of attack $\alpha_{ACT}$, side slip $\beta_{ACT}$, and $\phi_{ACT}$ commands by an Y-Z to $\alpha$-$\beta$ converter 46. The processing unit 50 interprets the current vehicle operating conditions and, based on stored information representing the vehicle aerodynamic response, determines which of a pre stall condition, a stall condition and a post stall condition is a current condition of the vehicle.

Additionally, because the processing unit 50 is supplied with the vehicle aerodynamic response characteristics across the pre-stall region, the stall region and the post-stall region, the current condition of the vehicle can be assessed to determine not only if the current condition is a pre stall condition, a stall condition or a post stall condition, but if the current condition of the vehicle is close to any other one of these conditions. Thus, it is possible, for instance, for the processing unit 50 to determine that a current condition of the vehicle is a pre stall condition and additionally that the vehicle is near a stall condition.

Thus, based on the detected pre stall condition, stall condition or post stall condition of the vehicle, as well as the proximity of the current vehicle condition to another one of these stall conditions, the processor can selectively employ either the dynamic controller or the static controller for controlling the vehicle. By selectively employing either the dynamic controller or the static controller for controlling the vehicle so as to avoid application of either one in a flight regime where the selected controller will experience a control singularity, erratic oscillations in the outputted fin command resulting from a singularity in the control response function can be avoided altogether.

A preferred mixing approach according to the present invention switches control from the dynamic controller to the static controller before entering the stall region and switches back to the dynamic controller after entering the post stall region. Preferably, the switching is implemented both in forward as well as reverse directions so that as the vehicle moves from the post stall region to the stall region and finally back to the pre stall region the appropriate controller is selected for these flight regimes. Additionally, the switching between the dynamic and static controllers in both directions can be implemented with some hysteresis so that for a given vehicle operating condition, the determination of which controller to apply does not oscillate between the dynamic controller and the static controller.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

That which is claimed is:

1. An autopilot controller suitable for controlling a vehicle, traveling in a fluid medium, in response to a commanded maneuver, said controller being capable of controlling said vehicle in a pre-stall region, a stall region and a post-stall region, said vehicle having a control surface, said controller comprising:

a storage device for storing data corresponding to a model of vehicle response characteristics, said model including vehicle response characteristics for said pre-stall region, said stall region and said post-stall region, said stored data corresponding to an amount of moment generated about a center of gravity of said vehicle as a function of possible vehicle operating conditions and possible deflections for said control surface;

an input device for receiving at least one condition signal, each condition signal being representative of a current vehicle operating condition;

an error signal generating device for generating, based on said at least one condition signal, an error signal indicative of a difference between said commanded maneuver and said at least one condition signal; and a determining device for determining, based on said stored data, said at least one condition signal, and said error signal, a deflection for said control surface which would currently be suitable to effect at least a portion of the commanded maneuver;

wherein said commanded maneuver is a maneuver requiring a change in transverse acceleration of said vehicle, and wherein said determining device determines said deflection for said control surface so as to initially generate a moment about the center of gravity of the vehicle.

2. An autopilot controller in accordance with claim 1, wherein, in the case of a commanded maneuver for which any one of a plurality of deflections for said control surface would currently be suitable to effect at least a portion of the commanded maneuver, said determining device determines only one of said plurality of currently suitable deflections for said control surface to effect at least a portion of the commanded maneuver.

3. An autopilot controller in accordance with claim 1, wherein said model is a coupled, multiple degree-of-freedom, non-linear model.

4. A method for controlling a vehicle, traveling in a fluid medium, in response to a commanded maneuver, said method being suitable for controlling said vehicle in a pre-stall region, a stall region and a post-stall region, said vehicle having a control surface, said method comprising the steps of:

provurfacepre-stall region, said stall region and said post-stall region, said data corresponding to an amount of moment generated about a center of gravity of said vehicle as a function of possible vehicle operating conditions and possible deflections for said control surface;

receiving at least one condition signal, each condition signal being representative of a current vehicle operating condition;

generating, based on said at least one condition signal, an error signal indicative of a difference between said commanded maneuver and said at least one condition signal; and determining, based on said stored data, said at least one condition signal, and said error signal, a deflection for said control surface which would currently be suitable to effect at least a portion of the commanded maneuver;

wherein said commanded maneuver is a maneuver requiring a change in transverse acceleration of said vehicle, and wherein said determining step determines said deflection for said control surface so as to initially generate a moment about the center of gravity of the vehicle.

5. A method in accordance with claim 4, wherein, in the case of a commanded maneuver for which any one of a plurality of deflections for said control surface would currently be suitable to effect at least a portion of the commanded maneuver, said determining step determines only one of said plurality of currently suitable deflections for said control surface to effect at least a portion of the commanded maneuver.

6. An autopilot controller in accordance with claim 4, wherein said model is a coupled, multiple degree-of-freedom, non-linear model.

7. An autopilot controller suitable for controlling a vehicle, traveling in a fluid medium, in response to a commanded maneuver, said controller being capable of controlling said vehicle in a pre-stall region, a stall region and a post-stall region, said vehicle having a control surface, said controller comprising:

a storage device for storing data corresponding to a model of vehicle response characteristics, said model including vehicle response characteristics for said pre-stall region, said stall region and said post-stall region, said stored data corresponding to an amount of force generated at a center of gravity of said vehicle as a function of possible vehicle operating conditions and possible deflections for said control surface, said stored data further corresponding to an amount of moment generated about a center of gravity of said vehicle as a function of possible vehicle operating conditions and possible deflections for said control surface;

an input device for receiving at least one condition signal, each condition signal being representative of a current vehicle operating condition;

an error signal generating device for generating, based on said at least one condition signal, an error signal indicative of a difference between said commanded maneuver and said at least one condition signal;

a stall condition detecting device for detecting, based on said stored data and said at least one condition signal, when a current condition of said vehicle is near a stall condition; and a determining device for determining, based on said stored data, said at least one condition signal, and said error signal, a deflection for said control surface which would currently be suitable to effect at least a portion of the commanded maneuver;

wherein, in the case of a commanded maneuver for which any one of a plurality of deflections for said control surface would currently be suitable to effect at least a portion of the commanded maneuver, said determining device determines only one of said plurality of currently suitable deflections for said control surface to effect at least a portion of the commanded maneuver.

8. An autopilot controller in accordance with claim 7, wherein said at least one condition signal includes signals representative of a current acceleration of said vehicle and a current amount of deflection for said control surface.

9. An autopilot controller in accordance with claim 7, wherein said model is a coupled, multiple degree-of-freedom, non-linear model.

10. An autopilot controller in accordance with claim 7, wherein said determining device determines said deflection for said control surface based on both said stored data corresponding to an amount of force and said stored data corresponding to an amount of moment when the vehicle is not near a stall condition, and said determining device determines said deflection for said control surface based on said stored data corresponding to only an amount of moment when the vehicle is near a stall condition.

11. An autopilot controller in accordance with claim 7, wherein said stall condition detecting device further detects, based on said stored data and said at least one condition signal, which of a pre stall condition, a stall condition and a post stall condition is a current condition of said vehicle; and a stall recovering device, responsive to said stall condition detecting device, for recovering from either one of a stall condition and a post stall condition.

12. An autopilot controller in accordance with claim 7, wherein said commanded maneuver is a maneuver requiring a change in transverse acceleration of said vehicle.

13. A method for controlling a vehicle, traveling in a fluid medium, in response to a commanded maneuver, said method being suitable for controlling said vehicle in a pre-stall region, a stall region and a post-stall region, said vehicle having a control surface, said method comprising the steps of:

providing data corresponding to a model of vehicle response characteristics, said model including vehicle response characteristics for said pre-stall region, said stall region and said post-stall region, said data corresponding to an amount of force generated at a center of gravity of said vehicle as a function of possible vehicle operating conditions and possible deflections for said control surface, said data in further corresponding to an amount of moment generated about a center of gravity of said vehicle as a function of possible vehicle operating conditions and possible deflections for said control surface;

receiving at least one condition signal, each condition signal being representative of a current vehicle operating condition;

generating, based on said at least one condition signal, an error signal indicative of a difference between said commanded maneuver and said at least one condition signal;

ascertaining, based on said stored data and said at least one condition signal, when a current condition of said vehicle is near a stall condition; and determining, based on said stored data, said at least one condition signal, and said error signal, a deflection for said control surface which would currently be suitable to effect at least a portion of the commanded maneuver;

wherein, in the case of a commanded maneuver for which any one of a plurality of deflections for said control surface would currently be suitable to effect at least a portion of the commanded maneuver, said step of determining determines only one of said plurality of currently suitable deflections for said control surface to effect at least a portion of the commanded maneuver.

14. A method in accordance with claim 13, wherein said at least one condition signal includes signals representative of a current acceleration of said vehicle and a current amount of deflection for said control surface.

15. A method in accordance with claim 13, wherein said model is a coupled, multiple degree-of-freedom, non-linear model.

16. An autopilot controller in accordance with claim 13, wherein, when the vehicle is not near a stall condition, said determining step includes determining said deflection for said control surface based on both said data corresponding to an amount of force and said data corresponding to an amount of moment, and, when the vehicle is near a stall condition, said determining step includes determining said deflection for said control surface based on said data corresponding to only an amount of moment.

17. An autopilot controller in accordance with claim 13, wherein said commanded maneuver is a maneuver requiring a change in transverse acceleration of said vehicle.

18. A recording medium, having computer executable instructions stored therein, for controlling a vehicle, traveling in a fluid medium, in response to a commanded maneuver, said method being capable of controlling said vehicle in a pre-stall region, a stall region and a post-stall region, said vehicle having a control surface, said computer executable instructions comprising instructions for:

reading data corresponding to a model of vehicle response characteristics, said model including vehicle response characteristics for said pre-stall region, said stall region and said post-stall region, said data corresponding to an amount of force generated at a center of gravity of said vehicle as a function of possible vehicle operating conditions and possible deflections for said control surface, said data further corresponding to an amount of moment generated about a center of gravity of said vehicle as a function of possible vehicle operating conditions and possible deflections for said control surface;

receiving at least one condition signal, each condition signal being representative of a current vehicle operating condition;

generating, based on said at least one condition signal, an error signal indicative of a difference between said commanded maneuver and said at least one condition signal;

ascertaining, based on said stored data and said at least one condition signal, when a current condition of said vehicle is near a stall condition; and determining, based on said stored data, said at least one condition signal, and said error signal, a deflection for said control surface which would currently be suitable to effect at least a portion of the commanded maneuver;

wherein, in the case of a commanded maneuver for which any one of a plurality of deflections for said control surface would currently be suitable to effect at least a portion of the commanded maneuver, said step of determining determines only one of said plurality of currently suitable deflections for said control surface to effect at least a portion of the commanded maneuver.

19. A computer program product in accordance with claim 18, wherein said commanded maneuver is a maneuver requiring a change in transverse acceleration of said vehicle.

20. An autopilot controller suitable for controlling a vehicle, traveling in a fluid medium, in response to a commanded maneuver, said controller being capable of controlling said vehicle in a pre-stall region, a stall region and a post-stall region, said vehicle having a control surface, said controller comprising:

a storage device for storing data corresponding to a model of vehicle response characteristics, said model including vehicle response characteristics for said pre-stall region, said stall region and said post-stall region;

an input device for receiving at least one condition signal, each condition signal being representative of a current vehicle operating condition;

an error signal generating device for generating, based on said at least one condition signal, an error signal indicative of a difference between said commanded maneuver and said at least one condition signal; and a determining device for determining, based on said stored data, said at least one condition signal, and said error signal, a deflection for said control surface which would currently be suitable to effect at least a portion of the commanded maneuver;

wherein, in the case of a commanded maneuver for which any one of a plurality of deflections for said control surface would currently be suitable to effect at least a portion of the commanded maneuver, said determining device determines only one of said plurality of currently suitable deflections for said control surface to effect at least a portion of the commanded maneuver.

21. An autopilot controller in accordance with claim 20, wherein said at least one condition signal includes signals representative of a current acceleration of said vehicle and a current amount of deflection for said control surface.

22. An autopilot controller in accordance with claim 20, wherein said model is a coupled, multiple degree-of-freedom, non-linear model.

23. An autopilot controller in accordance with claim 22, wherein said model corresponds to an amount of force generated at a center of gravity of said vehicle as a function of possible vehicle operating conditions and possible deflections for said control surface.

24. An autopilot controller in accordance with claim 22, wherein said model corresponds to an amount of moment generated about a center of gravity of said vehicle as a function of possible vehicle operating conditions and possible deflections for said control surface.

25. An autopilot controller in accordance with claim 22, wherein said model corresponds to an amount of force generated at a center of gravity of said vehicle as a function of possible vehicle operating conditions and possible deflections for said control surface and to an amount of moment generated about a center of gravity of said vehicle as a function of possible vehicle operating conditions and possible deflections for said control surface; and wherein said determining device determines said deflection for said control surface based on said stored data corresponding to an amount of moment when the vehicle is near a stall condition and said determining device determines said deflection for said control surface based on said stored data corresponding to an amount of force when the vehicle is not near a stall condition.

26. An autopilot controller in accordance with claim 20, firther comprising:

a stall condition detecting device for detecting, based on said stored data and said at least one condition signal, which of a pre stall condition, a stall condition and a post stall condition is a current condition of said vehicle; and a stall recovering device, responsive to said stall condition detecting device, for recovering from either one of a stall condition and a post stall condition.

27. An autopilot controller in accordance with claim 20, wherein said model includes data representative of ($\partial C/\partial \delta$, $C_{intercept}$) pairs which are a function of possible vehicle operating conditions and possible deflections for a control surface, and wherein said computing device computes said deflection for said control surface in response to a commanded maneuver in accordance with a vehicle response characteristic of the form $C=(\partial C/\partial \delta)\cdot \delta + C_{intercept}$;

where:

$\partial C/\partial \delta$ is a rate of change, with respect to said deflection for said control surface, of force generated at a center of gravity of said vehicle at said current vehicle operating condition; and $C_{intercept}$ is a force intercept for a linear function which is tangent to a C force function at said current vehicle operating condition and which has a slope equal to $\partial C/\partial \delta$.

28. An autopilot controller in accordance with claim 20, wherein said model includes data representative of ($\partial C/\partial \delta$, $C_{intercept}$) pairs which are a function of possible vehicle operating conditions and possible deflections for said control surface, and wherein said computing device computes said deflection for said control surface in response to a commanded maneuver in accordance with a vehicle response characteristic of the form $C=(\partial C/\partial \delta)\cdot \delta + C_{intercept}$;

where:

$\partial C/\partial \delta$ is a rate of change, with respect to said deflection for said control surface, of a moment generated about a center of gravity of said vehicle at said current vehicle operating condition; and $C_{intercept}$ is a moment intercept for a linear function which is tangent to a C moment function at said current vehicle operating condition and which has a slope equal to $\partial C/\partial \delta$.

29. A method for controlling a vehicle, traveling in a fluid medium, in response to a commanded maneuver, said method being capable of controlling said vehicle in a pre-stall region, a stall region and a post-stall region, said vehicle having a control surface, said method comprising the steps of:

providing data corresponding to a model of vehicle response characteristics, said model including vehicle response characteristics for said pre-stall region, said stall region and said post-stall region;

receiving at least one condition signal, each condition signal being representative of a current vehicle operating condition;

generating, based on said at least one condition signal, an error signal indicative of a difference between said commanded maneuver and said at least one condition signal; and determining, based on said stored data, said at least one condition signal, and said error signal, a deflection for said control surface which would currently be suitable to effect at least a portion of the commanded maneuver;

wherein, in the case of a commanded maneuver for which any one of a plurality of deflections for said control surface would currently be suitable to effect at least a portion of the commanded maneuver, said step of determining determines only one of said plurality of currently suitable deflections for said control surface to effect at least a portion of the commanded maneuver.

30. A method in accordance with claim 29, wherein said at least one condition signal includes signals representative of a current acceleration of said vehicle and a current amount of deflection for said control surface.

31. A method in accordance with claim 29, wherein said model is a coupled, multiple degree-of-freedom, non-linear model.

32. A method in accordance with claim 31, wherein said model corresponds to an amount of force generated at a center of gravity of said vehicle as a function of possible vehicle operating conditions and possible deflections for said control surface.

33. A method in accordance with claim 31, wherein said model corresponds to an amount of moment generated about a center of gravity of said vehicle as a function of possible vehicle operating conditions and possible deflections for said control surface.

34. A method in an autopilot controller for generating a one-to-one mapping between an inputted moment command and a outputted control surface deflection command controller based on a model of vehicle response characteristics, including vehicle response characteristics for a pre-stall region, a stall region and a post-stall region, said method comprising the steps of:

providing, based on said model, data representative of ($\partial C/\partial \delta$, $C_{intercept}$) pairs as a function of possible vehicle operating conditions and possible deflections for a control surface, for said pre-stall region, said stall region and said post-stall region, determining at least one current operating condition of said vehicle;

selecting a specific ($\partial C/\partial \delta$, $C_{intercept}$) pair corresponding to said at least one current operating condition of said vehicle; and generating, based on said specific ($\partial C/\partial \delta$, $C_{intercept}$) pair, a relationship of the form $C=(\partial C/\partial \delta)\cdot \delta + C_{intercept}$;

where:

C is a value of a moment corresponding to said moment command;

δ is a value of a deflection for said control surface corresponding to said control surface deflection command;

∂C/∂δ is a rate of change, with respect to said deflection for said control surface, of a function C corresponding to a moment generated about a center of gravity of said vehicle as a function of possible vehicle operating conditions and possible deflections for said control surface, said function C being evaluated at said at least one current operating condition; and $C_{intercept}$ is a moment intercept for a linear function which is tangent to said C function at said current vehicle operating condition and which has a slope equal to ∂C/∂δ.

\* \* \* \* \*

UNITED STATES PATENT AND TRADEMARK OFFICE
CERTIFICATE OF CORRECTION

PATENT NO. : 6,246,929 B1
DATED : June 12, 2001
INVENTOR(S) : Joseph H. Kaloust

It is certified that error appears in the above-identified patent and that said Letters Patent is hereby corrected as shown below:

<u>Column 70,</u>
Line 19, delete "A computer program product", and insert -- A recording medium --.

Signed and Sealed this

Second Day of April, 2002

Attest:

JAMES E. ROGAN
*Attesting Officer*     *Director of the United States Patent and Trademark Office*